(12) United States Patent　　(10) Patent No.:　　US 6,656,617 B2
Aoyama et al.　　　　　　　　　(45) Date of Patent:　　Dec. 2, 2003

(54) FUEL GAS PRODUCTION SYSTEM FOR FUEL CELLS

(75) Inventors: Satoshi Aoyama, Susono (JP); Hiromichi Sato, Atsugi (JP); Toshihide Nakata, Susono (JP); Satoshi Iguchi, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 193 days.

(21) Appl. No.: 09/758,387

(22) Filed: Jan. 12, 2001

(65) Prior Publication Data

US 2001/0018139 A1 Aug. 30, 2001

(30) Foreign Application Priority Data

Jan. 24, 2000 (JP) .................................. 2000-014301
Jan. 24, 2000 (JP) .................................. 2000-014411
Apr. 20, 2000 (JP) .................................. 2000-118849
Aug. 8, 2000 (JP) .................................. 2000-239349

(51) Int. Cl.[7] .............................................. H01M 8/04
(52) U.S. Cl. ..................................... 429/19; 429/17
(58) Field of Search ............................ 429/17, 19, 20; 422/108–110

(56) References Cited

U.S. PATENT DOCUMENTS

| | | | | |
|---|---|---|---|---|
| 5,149,600 A | * | 9/1992 | Yamase | 429/17 |
| 5,284,717 A | * | 2/1994 | Yamase | 429/17 |
| 5,616,430 A | * | 4/1997 | Aoyama | 429/17 |
| 6,165,633 A | * | 12/2000 | Negishi | 429/17 |
| 6,290,913 B1 | * | 9/2001 | Aoyama | 422/110 |
| 6,332,901 B1 | * | 12/2001 | Nagamiya | 48/127.9 |
| 6,416,894 B1 | * | 7/2002 | Aoyama | 429/20 |
| 6,455,008 B1 | * | 9/2002 | Aoyama | 422/108 |
| 6,495,113 B2 | * | 12/2002 | Aoyama | 423/247 |

FOREIGN PATENT DOCUMENTS

| | | | |
|---|---|---|---|
| JP | A 04321502 | 11/1992 | |
| JP | 043210502 | * 11/1992 | C01B/3/56 |
| JP | A 05147902 | 6/1993 | |
| JP | A 06168733 | 6/1994 | |
| JP | A 07057758 | 3/1995 | |
| JP | A 10001302 | 1/1998 | |
| JP | 2955054 | * 10/1999 | H01M/8/06 |

* cited by examiner

Primary Examiner—Mark Ruthkosky
(74) Attorney, Agent, or Firm—Oliff & Berridge, PLC

(57) ABSTRACT

The technique of the present invention enhances the separation efficiency and the production efficiency of hydrogen in a hydrogen production system for fuel cells, while reducing the size of the whole fuel gas production system. In the fuel gas production system of the present invention, a hydrocarbon compound is subjected to multi-step chemical processes including a reforming reaction, a shift reaction, and a CO oxidation to give a hydrogen-rich fuel gas. Gaseous hydrogen produced through the reforming reaction is separated by a hydrogen separation membrane having selective permeability to hydrogen. The residual gas after the separation of hydrogen has a low hydrogen partial pressure and undergoes the shift reaction at the accelerated rate. The hydrogen-rich processed gas obtained through the shift reaction and the CO oxidation joins with the separated hydrogen and is supplied to fuel cells. A purge gas for carrying out the hydrogen is introduced into a separation unit of hydrogen, in order to lower the hydrogen partial pressure and thereby enhance the separation efficiency of hydrogen. The residual gas after the separation of hydrogen undergoes combustion and is subsequently used as the purge gas

43 Claims, 37 Drawing Sheets

Fig. 4

| | | REFORMER UNIT | | SHIFT UNIT | | CO OXIDATION UNIT | |
|---|---|---|---|---|---|---|---|
| SITE OF SEPARATION UNIT | 1 | ○ | | | | | |
| | 2 | | | ○ | | | |
| | 3 | | | | | ○ | |
| | 4 | | ● | | | | |
| | 5 | | | | ● | | |
| | 6 | | | | | | ● |
| | 7 | ○ | | | | | |
| | 8 | | | ○ | | | |
| | 9 | | ● | | | | |
| | 10 | | | | ● | | |

○ INTEGRATED

● INDEPENDENT

FUEL GAS PRODUCTION SYSTEM FOR FUEL CELLS

BACKGROUND OF THE INVENTION

1. Field of the Invention

The present invention relates to a fuel gas production system that produces hydrogen, which is to be fed to fuel cells, from a raw material containing hydrogen atoms. More specifically the present invention pertains to a fuel gas production system having a hydrogen separation mechanism that separates hydrogen in the course of production.

2. Description of the Related Art

Each of the fuel cells has a hydrogen electrode and an oxygen electrode disposed across an electrolyte layer, which hydrogen ions pass through, and generates an electromotive force through the following reactions proceeding at the respective electrodes:

Hydrogen electrode: $H_2 \rightarrow 2H^+ + 2e^-$

Oxygen electrode: $(½)O_2 + 2H^+ + 2e^- \rightarrow H_2O$

A hydrogen-rich fuel gas may be produced by reforming a hydrocarbon compound, such as methanol or natural gas, in a fuel gas production system. The material is decomposed to the hydrogen-rich fuel gas stepwise through plural stages of reactions in the fuel gas production system.

The first stage reaction is called the reforming reaction and is expressed by Equations (1) and (2) given below in the case of a hydrocarbon material $$C_nH_m + nH_2O \rightarrow nCO + (n+m/2)H_2 \quad (1)$$

$$C_nH_m + n/2 O_2 \rightarrow nCO + m/2 H_2 \quad (2)$$

The second stage reaction utilizes steam to oxidize carbon monoxide produced by the reforming reaction while producing hydrogen. This second stage reaction is called the shift reaction and is expressed by Equation (3) given below:

$$CO + H_2O \rightarrow CO_2 + H_2 \quad (3)$$

In some cases, the CO oxidation is subsequently performed as the third stage reaction. The CO oxidation selectively oxidizes carbon monoxide that has not been oxidized by the shift reaction but remains. Carbon monoxide contained in the fuel gas may poison the electrodes and interfere with the stable reactions. The shift reaction and the subsequent CO oxidation sufficiently lower the concentration of carbon monoxide, so as to prevent the potential poisoning of the electrodes.

One application utilizes hydrogen separated from the gaseous mixture, which has been produced through the chemical reactions, as the gaseous mixture. The separation of hydrogen enhances the hydrogen partial pressure in the fuel gas and effectively prevents the gaseous mixture from containing any noxious components.

FIG. 36 schematically illustrates the structure of a prior art fuel cells system including a hydrogen separation mechanism. Supplies of a material and water are respectively fed from a material reservoir 200 and a water reservoir 230 to a reformer unit 216 via an evaporator 212. A reforming reaction proceeds in the reformer unit 216 to produce a gaseous mixture including carbon monoxide. Gaseous hydrogen included in the gaseous mixture permeates a hydrogen separation membrane 218 to a separation unit 220. For the purpose of efficient separation of hydrogen, a gas for carrying out hydrogen (hereinafter referred to as the purge gas) is introduced into the separation unit 220. The purge gas used here is steam obtained by evaporating water led from the water reservoir 230 by an evaporator 232. The separated hydrogen is supplied to fuel cells 228 after removal of the excess water content in a condenser 226. The gaseous mixture after separation of hydrogen (hereinafter referred to as the residual gas) includes carbon monoxide and remaining hydrogen that has not been separated by the hydrogen separation membrane 218. The residual gas is discharged to the outside after carbon monoxide and hydrogen included therein are oxidized in a combustion unit 222.

Any of a variety of condensable gases that have no adverse effects on the fuel cells may be used for the purge gas, in place of steam. A substance that has a small heat of vaporization and is liquid at ordinary temperature is generally suitable for the purge gas. FIG. 37 is a graph showing the relationship between the heat of vaporization and the boiling point. This is cited from the Chemical Handbook. According to the above conditions, paraffin hydrocarbons, dimethyl ether, and acetic acid are suitable for the purge gas.

The prior art fuel gas production system, however, has several problems discussed below.

The prior art technique has an insufficient production efficiency of hydrogen from the material and a relatively low hydrogen partial pressure in the fuel gas. For example, part of the material is not subjected to any reaction but is discharged to the outside. In the fuel gas production system having the hydrogen separation mechanism, hydrogen remaining in the residual gas is often wasted. The low production efficiency of hydrogen leads to an increase in consumption of the material. This results in raising the operation cost, increasing the required capacity of the material reservoir, and thereby expanding the size of the whole fuel cells system. The low hydrogen partial pressure in the fuel gas results in lowering the efficiency of power generation of the fuel cells and thereby expanding the size of the whole fuel cells system.

The prior art fuel gas production system requires the evaporator and the water reservoir for producing the purge gas. This leads to the size expansion and the complicated structure of the fuel gas production system.

In the prior art fuel gas production system, the flow rate of the purge gas is substantially not regulated. The flow rate of the purge gas affects the separation efficiency of hydrogen and the driving efficiency of the fuel cells. Such effects are especially prominent when the driving conditions of the fuel cells change. The insufficient flow rate of the purge gas may cause an insufficient supply or a delayed supply of the fuel gas and a response delay of the hydrogen output.

From the viewpoint of the environmental protection, the recent requirement is to mount such fuel cells on a vehicle. For this purpose, the lowered driving efficiency and the size expansion of the whole fuel cells system are significant problems.

SUMMARY OF THE INVENTION

The object of the present invention is accordingly to enhance the production efficiency of hydrogen and raise the hydrogen partial pressure in a resulting fuel gas in a fuel gas production system, to enable efficient production of a purge gas, and to appropriately regulate the flow rate of the purge gas to improve the driving efficiency and the response of fuel cells.

At least one of the above and the other related objects is actualized by a first fuel gas production system that produces a hydrogen-rich fuel gas, which is to be supplied to fuel cells, from a raw material. The fuel gas production system includes: a chemical reaction device that produces a gaseous mixture containing hydrogen from the raw material through a plurality of chemical processes; a hydrogen separation mechanism that separates hydrogen from the gaseous mixture in at least one place of the chemical reaction device; and a flow path that feeds both the hydrogen separated by the hydrogen separation mechanism and a residual gas after the separation of hydrogen from the gaseous mixture to the fuel cells, so as to ensure a supply of all hydrogen obtained in all the chemical processes in the chemical reaction device to the fuel cells.

Any of a variety of compounds containing hydrogen atoms, for example, hydrocarbons like gasoline, alcohols, ethers, and aldehydes, may be used for the raw material.

The flow path is arranged to supply both the hydrogen separation by the hydrogen separation mechanism and the residual gas to the fuel cells. This arrangement enables not only the separated hydrogen but the remaining hydrogen, which has not been separated from the gaseous mixture by the hydrogen separation mechanism, to be supplied to the fuel cells. Namely the arrangement of the present invention enables most of the hydrogen produced through the plurality of chemical processes to be supplied to the fuel cells. The separation of hydrogen by the hydrogen separation mechanism enhances the hydrogen partial pressure in the resulting fuel gas. The separation also accelerates the reaction proceeding in the chemical reaction device. Introduction of a purge gas improves the separation efficiency of hydrogen and enables efficient extraction of hydrogen from the chemical reaction device, so as to lower the concentration of hydrogen in the chemical reaction device. The reaction in the chemical reaction device is reversible and the rate of the reaction is affected by the concentration of hydrogen. The lowered concentration of hydrogen in the chemical reaction device accordingly enhances the rate of reaction.

In accordance with one preferable application of the fuel gas production system where the chemical reaction device has a plurality of reaction units, the hydrogen separation mechanism may be disposed at a specific side other than a last reaction unit. In this application, the flow path is constructed to ensure a supply of both the hydrogen separated by the hydrogen separation mechanism and hydrogen produced after the hydrogen separation The chemical process of producing hydrogen is the reversible reaction, so that using the residual gas having the low hydrogen partial pressure accelerates the reaction and enhances the production efficiency of hydrogen. This arrangement does not waste the residual gas after the separation of hydrogen but utilizes it for subsequent production of hydrogen. This advantageously saves the material.

In one concrete example where the chemical reaction device includes a reformer unit for a reforming reaction and a shift unit for a shift reaction, the hydrogen separation mechanism is located before the shift unit. This arrangement accelerates the reaction in the shift unit.

The hydrogen separation mechanism may be integrated with or separate from any reaction unit of the chemical reaction device. The hydrogen separation mechanism may be provided at a plurality of sides, for example, in the respective reaction units of the chemical reaction device.

The hydrogen separation mechanism may include a hydrogen separation membrane that has selective permeability to hydrogen. The hydrogen separation membrane is arranged to have opposing two faces, that is, a feeding face and an extraction face. The former receives a supply of the gaseous mixture and the latter extracts selectively permeating hydrogen from the gaseous mixture. In this case, it is desirable to introduce a flow of a purge gas for carrying out the hydrogen to the extraction face.

The rate of hydrogen permeation through the hydrogen separation membrane depends upon the difference in hydrogen partial pressure between the feeding face and the extraction face. The active carriage of hydrogen on the flow of the purge gas lowers the hydrogen partial pressure on the extraction face, so as to increase the difference in hydrogen partial pressure and enhance the rate of hydrogen permeation.

The flow of the purge gas may be introduced under conditions that a hydrogen partial pressure on the feeding face is higher than that on the extraction face thereof and that a total pressure on the feeding face is even or lower than that on the extraction face.

Even when there is a pinhole in the hydrogen separation membrane, the difference in total pressure effectively prevents a carbon monoxide-containing gas from leaking from the feeding face to the extraction face. This arrangement enables advantageous reduction in thickness without any fear of potential troubles caused by the presence of pinholes. In the case where steam is used for the purge gas, the steam permeating from the extraction face to the feeding face due to the difference in total pressure undergoes the reforming reaction and the shift reaction. The structure using the vaporized material hydrocarbon as the purge gas also ensures the similar advantages to those of the structure using the steam as the purge gas.

In order to keep the hydrogen partial pressure at a relatively low level on the extraction face and ensure the efficient separation of hydrogen, it is desirable to regulate the flow rate of the purge gas according to the flow rate of the material gas. The regulation of the flow rate is attained by electronically controlling the on-off state of a valve. In accordance with one preferable embodiment, a gas flow rate regulation mechanism may be provided in the flow path to automatically vary the flow rate of the purge gas while holding a predetermined correlation with the flow rate of the residual gas. There is a fixed correlation between the flow rate of the material gas and the flow rate of the residual gas. By taking advantage of such correlations, the flow rate of the purge gas is regulated according to the flow rate of the material gas by the simple structure. This arrangement advantageously reduces the size and the manufacturing cost of the whole fuel gas production system.

A jet pump may be used for the gas flow rate regulation mechanism. The jet pump has two flow-in systems and one flow-out system. A negative pressure is generated in the jet pump by a flow of a high-pressure fluid into one flow-in system, and another fluid is thereby sucked into the other flow-in system. The fluids of the two systems flow at specific flow rates holding a fixed correlation. In the fuel gas production system of the present invention, the flow of the hydrogen separated by the hydrogen separation mechanism joins with the flow of the residual gas and is then supplied to the fuel cells. The jet pump may be located at this meeting point. The jet pump does not have any mechanical movable part and accordingly has high reliability.

A second fuel gas production system of the present invention has a noxious component reduction unit where the residual gas after the separation of hydrogen undergoes a reduction process, which reduces the concentration of a noxious component that is harmful to the fuel cells. The residual gas after the reduction process is used as the purge gas.

As discussed in the prior art, a condenser and an evaporator are required in the structure using the steam as the purge gas. The structure using the residual gas as the purge gas, on the other hand, enables size reduction or even omission of the condenser and the evaporator. This advantageously reduces the size of the whole fuel gas production system.

The structure using the residual gas as the purge gas enables the hydrogen in the residual gas to be supplied to the fuel cells. This arrangement advantageously ensures the efficient use of hydrogen.

The reduction process may be an oxidation or a catalytic reaction of the residual gas. One typical example of the oxidation is combustion. Typical examples of the catalytic reaction include the selective oxidation of carbon monoxide and the shift reaction. Such reactions of the reduction process effectively lower the concentration of carbon monoxide. The reduction process is, however, not restricted to these examples but may be selected appropriately to reduce the concentration of the noxious component that adversely affects the fuel cells. The reduction process may include a plurality of reactions.

In the fuel gas production system of the present invention, in addition to the residual gas, an off gas of the fuel cells may be used as the purge gas. This arrangement ensures a sufficient flow of the purge gas even when the residual gas does not have a sufficient amount for the purge gas.

In the structure that uses the anode off gas discharged from the anodes as the purge gas, hydrogen in the anode off gas, which has not been utilized for power generation, is supplied again to the fuel cells. This advantageously ensures the efficient use of hydrogen. In the structure that uses the cathode off gas discharged from the cathodes as the purge gas, no content of hydrogen in the cathode off gas advantageously prevents an increase in hydrogen partial pressure on the extraction face and thereby enhances the separation efficiency of hydrogen.

The flow of the off gas may be introduced to any side that allows the use of the off gas as the purge gas, that is, any side on the upper stream side of the extraction face.

The first side of introducing the flow of the off gas is the upper stream side of the chemical reaction device.

The second side of introducing the flow of the off gas is between the feeding face and the noxious component reduction unit.

The third side of introducing the flow of the off gas is between the noxious component reduction unit and the extraction face.

In the structure that introduces the flow of the off gas to the upper stream side of the chemical reaction device (that is, the first side), the components of the off gas undergo the chemical reaction proceeding in the chemical reaction device. For example, in the case where the flow of the cathode off gas is introduced to the first side, a trace amount of remaining oxygen in the cathode off gas is subjected to the reforming reaction (shown by Equation (2) given previously). Oxygen in the purge gas is accordingly consumed in the chemical reaction device. This effectively prevents hydrogen in the resulting fuel gas from being wastefully consumed by the reaction of the hydrogen extracted through the hydrogen separation membrane with the trace amount of oxygen in the purge gas. The cathode off gas has a low hydrogen partial pressure, so that the introduction of the flow of the cathode off gas advantageously enhances the rate of the reaction proceeding in the chemical reaction device. In the case where the flow of the anode off gas is introduced to the first side, on the other hand, water produced through the reaction in the fuel cells is subjected to the reforming reaction (shown by Equation (1) given previously).

The structure that introduces the flow of the off gas to the position between the feeding face and the noxious component reduction unit (that is, the second side) has the following advantages. In the case where the flow of the cathode off gas is introduced to the second side, remaining oxygen in the cathode off gas is subjected to the oxidation of the reduction process. Like the introduction to the first side, the introduction of the cathode off gas to the second side also has the advantages regarding the consumption of oxygen and the hydrogen partial pressure. In the case where the flow of the anode off gas is introduced to the second side, on the other hand, hydrogen in the anode off gas is oxidized to steam and the anode off gas having the lowered hydrogen partial pressure is led into the extraction face This arrangement effectively enhances the separation efficiency of hydrogen.

The structure that introduces the flow of the off gas to the position between the noxious component reduction unit and the extraction face (that is, the third side) has the following advantages. In the case where the flow of the cathode off gas is introduced to the third side, the gas having the low hydrogen partial pressure is used as the purge gas. This arrangement effectively enhances the separation efficiency of hydrogen. In the case where the flow of the anode off gas is introduced to the third side, on the other hand, the remaining hydrogen in the anode off gas is reused in the fuel cells. Another advantage of this structure using either the flow of the cathode off gas or the flow of the anode off gas is that the temperature of the purge gas is sufficiently close to the driving temperature of the fuel cells. The reaction proceeds at extremely high temperatures in the chemical reaction device. The temperature of the fuel gas should thus be lowered by a heat exchange unit, prior to the supply to the fuel cells. The introduction of the off gas to the third side enables extraction of the hydrogen with the purge gas having the temperature sufficiently close to the driving temperature of the fuel cells and thereby makes the temperature of the supply of the fuel gas sufficiently close to the driving temperature of the fuel cells. This arrangement advantageously enables size reduction or even omission of the heat exchange unit.

A third fuel gas production system of the present invention utilizes the flow of the cathode off gas as the purge gas.

The cathode off gas has the hydrogen partial pressure substantially equal to zero and is thus suitable for the purge gas. The enhanced utilization efficiency of oxygen on the cathodes reduces the quantity of oxygen included in the cathode off gas to a trace level and thus substantially prevents the reaction of oxygen with the extracted hydrogen. Another advantage of this arrangement is that the temperature of the purge gas is sufficiently close to the driving temperature of the fuel cells.

A fourth fuel gas production system of the present invention has a circulation mechanism that circulates the flow of the anode off gas to the extraction face as the purge gas. This arrangement enables the remaining hydrogen in the anode off gas to be reused in the fuel cells.

In accordance with another preferable application of the present invention, the purge gas for carrying out the hydrogen may be a processed gas after a reduction process that reduces the concentration of at least one of hydrogen and a specific component, which has high reactivity to hydrogen, included in the gas prior to supply to the fuel cells. The reduction process of hydrogen includes consumption of hydrogen in the fuel cells and combustion of hydrogen. The specific component having high reactivity to hydrogen may be carbon monoxide and oxygen. The reduction process of oxygen includes consumption of oxygen through oxidation or combustion.

It is desirable to regulate the flow rate of the purge gas in any of the second through the fourth fuel gas production systems. In accordance with one preferable application, the relationship between the a load on the fuel cells and the flow rate of the purge gas is stored in advance, and the flow rate of the purge gas is regulated according to the observed a load on the fuel cells. The relationship between the a load on the fuel cells and the flow rate of the purge gas may be stored in any suitable form, for example, in the form of a table or in the form of a function.

The flow rate of the purge gas affects the separation efficiency of hydrogen and thereby the driving efficiency of the fuel cells. Regulation of the flow rate of the purge gas according to the a load on the fuel cells thus enhances the driving efficiency of the fuel cells. The relationship between the a load on the fuel cells and the flow rate of the purge gas is set experimentally or analytically by taking into account the driving efficiency of the fuel cells. The following two points should especially be considered for the setting: the required quantity of hydrogen according to the a load on the fuel cells and the energy loss due to an increase in flow rate of the purge gas. When the fuel cells are in a high loading state, it is desirable to increase the flow rate of the purge gas and enhance the separation efficiency of hydrogen, in order to allow a supply of a large quantity of hydrogen. The increase in flow rate of the purge gas, on the other hand, results in increasing the power required for the introduction of the purge gas and thus enhancing the energy loss. Consideration of these two affecting factors according to the a load on the fuel cells ensures the appropriate setting of the flow rate of the purge gas to attain the optimum energy efficiency. The arrangement of regulating the flow rate of the purge gas is applicable to the structure that uses only the anode off gas as the flow of the purge gas.

In the case where the a load on the fuel cells increases by a rate of change of not less than a predetermined level, it is preferable to significantly increase the flow rate of the purge gas than the usual setting, that is, to correct a preset value, in the process of regulating the flow rate of the purge gas. Here the usual setting means a preset flow rate according to the a load on the fuel cells. The correction of the flow rate may be set in a variety of forms, for example, by a function of the rate of change or as a preset value.

The increased flow rate of the purge gas enhances the flow velocity of the whole fuel gas and thereby improves the dispersibility of the fuel gas in the fuel cells. The improved dispersibility results in enhancing the utilization rate of hydrogen in the fuel cells. The increased flow rate of the purge gas also improves the separation efficiency of hydrogen. This leads to an increase in quantity of hydrogen present in the flow path of carrying the fuel gas from the lower stream side of the hydrogen separation mechanism to the fuel cells. When there is any response delay in the course of producing hydrogen in the chemical reaction device or in the course of separating hydrogen by the hydrogen separation mechanism, the hydrogen present in the flow path works to compensate for the response delay. Because of such functions, in the case of an abrupt increase in a load on the fuel cells, the regulation of the flow rate of the purge gas according to the rate of change in loading state ensures output of the required electric power with the high response.

The arrangement of regulating the flow rate of the purge gas according to the rate of change in a load on the fuel cells may be applied to the structure that flows the purge gas at a fixed flow rate in the standard conditions. The regulation of the flow rate by considering the rate of change in loading state is also applicable to a variety of structures. For example, in the case of an abrupt decrease in a load on the fuel cells, the regulation may lower the flow rate significantly.

One modified structure has an additional gas flow source, in addition to the flow of the purge gas mainly used. In the case of an insufficient flow rate of the purge gas, this additional gas flow source is activated.

This arrangement facilitates the maintenance of the required flow rate of the purge gas according to the a load on the fuel cells. A gas source that does not require any special reservoir, for example, the air, may be used for the additional gas flow source.

The fuel gas production system of the above configuration may feed a supply of the fuel gas to the fuel cells directly, but more preferably via gas-liquid separation mechanism that separates steam from the fuel gas. The anodes of the fuel cells are generally moistened to accelerate the shift of the hydrogen ion. When the excess steam is present, however, there is a possibility that the inside of the electrodes sweats to lower the efficiency of power generation. The arrangement of supplying the fuel gas to the fuel cells after the separation of steam effectively prevents such potential troubles.

In the fuel gas production system discussed above, when an oxygen-containing gas, for example, the air, gaseous oxygen, or the cathode off gas, is used as the flow of the purge gas, it is desirable to increase the quantity of the oxygen-containing gas when the fuel cells have not yet been warmed up. This arrangement accelerates the warm-up of the fuel cells by utilizing the heat of the reaction of oxygen in the oxygen-containing gas with hydrogen in the fuel gas. In the structure of circulating the anode off gas, the circulation may be interrupted during the warm-up operation of the fuel cells. When the oxygen-containing gas is used as the flow of the purge gas, substantially no hydrogen remains in the anode off gas. The circulation of the anode off gas accordingly does not lead to the effective use of hydrogen. This arrangement is actualized by a mechanism of switching over the flow path of the anode off gas between the circulation to the hydrogen separation mechanism and the discharge to the outside.

The principle of the present invention is attained by a variety of applications other than the fuel gas production system discussed above. One possible application is a fuel cells system including the fuel gas production system discussed above. Other possible applications include a method of producing a fuel gas for fuel cells and a method of separating hydrogen from a gaseous mixture as one step in the fuel gas producing method. As mentioned above, the fuel cells may be warmed up by regulating the quantity of the air mixed with the purge gas. From this point of view, the present invention may be directed to a method of warming up fuel cells by utilizing the flow of the fuel gas.

These and other objects, features, aspects, and advantages of the present invention will become more apparent from the following detailed description of the preferred embodiments with the accompanying drawings.

BRIEF DESCRIPTION OF THE DRAWINGS

FIG. 4 is a table showing some examples of applicable arrangements for the fuel gas production system;

DESCRIPTION OF THE PREFERRED EMBODIMENTS

A. First Embodiment

Figure 1:
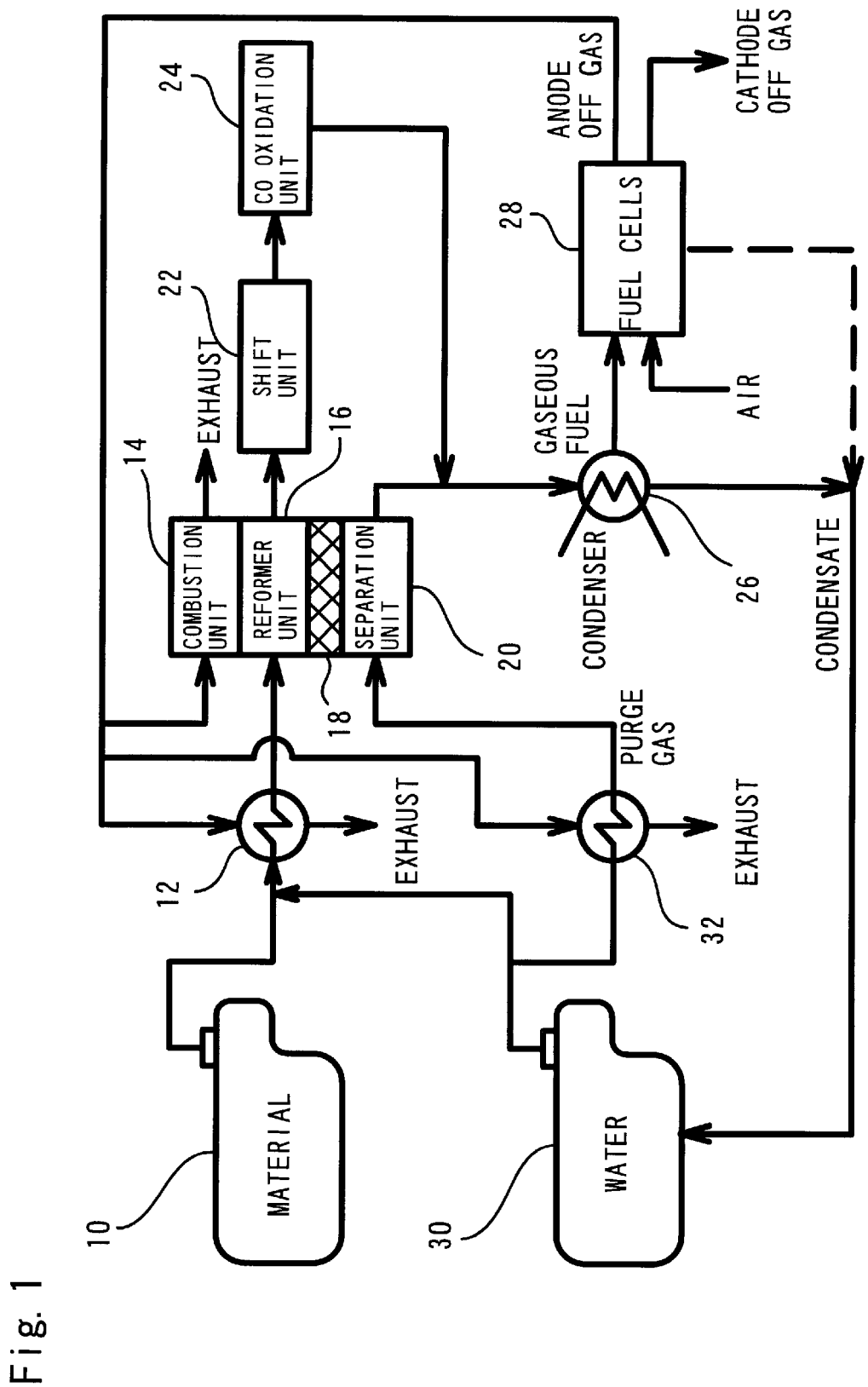
FIG. 1 schematically illustrates the structure of a fuel cells system in a first embodiment of the present invention.

FIG. 1 schematically illustrates the structure of a fuel cells system in a first embodiment of the present invention. The fuel cells system includes a fuel gas production system that decomposes a material stored in a material reservoir 10 to produce a hydrogen-rich fuel gas, and fuel cell 28 that generate an electromotive force through electrochemical reactions of hydrogen include in the produced fuel gas with oxygen in the air.

The fuel cells 28 are polymer electrolyte fuel cells that are relatively small in size and have an excellent power generation efficiency. Any of a variety of other fuel cells, for example, phosphate fuel cells or molten carbonate fuel cells, may alternatively be applied for the fuel cells 28. The fuel cells 28 are obtained by laying a number of unit cells one upon another, where each unit cell includes an electrolyte membrane, a cathode, an anode, and a separator. The electrolyte membrane is a proton-conductive ion exchange membrane composed of a solid polymer material like a fluororesin. The cathode and the anode are both made of carbon cloth, which is manufactured by weaving carbon fibers. The separator is composed of a gas-impermeable electrically conductive material, for example, gas-impermeable dense carbon obtained by compacting carbon powder. Flow conduits of a fuel gas and an oxidizing gas are formed between the cathode and the anode. The compressed air is used for the oxidizing gas, while the fuel gas is produced from the material stored in the material reservoir 10 in the fuel gas production system as discussed below.

The following describes the schematic structure of the fuel gas production system that functions to produce the fuel gas from a raw material. The material may be an alcohol or a hydrocarbon compound. In the fuel gas production system, the material is first led into an evaporator 12 to be vaporized.

The vaporized material or the material gas is fed to a chemical reaction device to undergo a chemical process. In this embodiment, the chemical reaction device includes three reaction units, that is, a reformer unit 16 in which the reforming reaction discussed previously proceeds, a shift unit 22 in which the shift reaction proceeds, and a CO oxidation unit 24 in which an oxidation proceeds to oxidize the remaining carbon monoxide. The flow of the material gas goes through the reformer unit 16, the shift unit 22, and the CO oxidation unit 24 in this sequence.

The reformer unit 16 is filled with a catalyst that is selected according to the material gas to accelerate the reforming reaction. When natural gas is applied for the material gas, a rare metal rhodium may be used for the catalyst of the reforming reaction. When methanol is applied for the material, CuO—ZnO and Cu—ZnO are effective catalysts. The shift unit 22 and the CO oxidation unit 24 are also filled with suitable catalysts that accelerate the respective reactions. Heat is required to accelerate the reaction proceeding in the reformer unit 16. In the structure of this embodiment, a combustion unit 14 is disposed adjacent to the reformer unit 16, in order to supply the heat generated in the combustion unit 14 for the reforming reaction. The fuel subjected to combustion in the combustion unit 14 is an anode off gas discharged from the fuel cells 28, that is, the fuel gas that has passed through the hydrogen electrode and includes remaining hydrogen not utilized for the reaction of power generation. The anode off gas is also led into the evaporator 12 and another evaporator 32.

The fuel gas production system has a mechanism for separating hydrogen from the gaseous mixture. This mechanism is integrated with the reformer unit 16 and includes a hydrogen separation membrane 18 that is interposed between the reformer unit 16 and a separation unit 20. The hydrogen separation membrane 18 is composed of a metal having selective permeability to hydrogen, such as palladium. The simple body of metal palladium may be applied for the hydrogen separation membrane 18. In this embodiment, however, the hydrogen separation membrane 18 is formed by making fine particles of palladium carried in pores of a ceramic porous support body. The following describes the structure of the hydrogen separation membrane 18 of this embodiment in detail.

Figure 2:
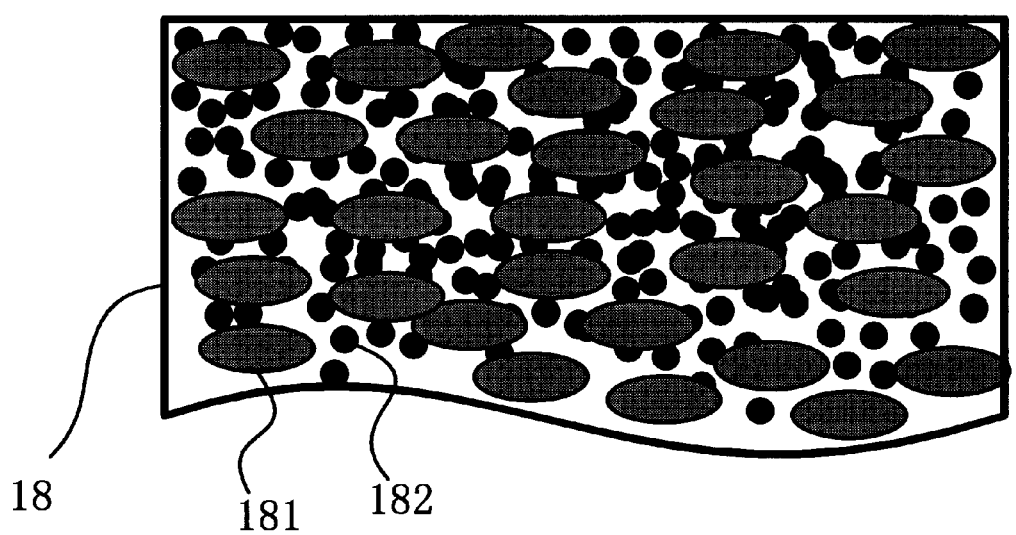
FIG. 2 is a sectional view illustrating a hydrogen separation membrane used in the fuel cells system of FIG. 1.

FIG. 2 is a sectional view illustrating the hydrogen separation membrane 18. The hydrogen separation membrane 18 of this embodiment is a porous support body that has a thickness of 0.1 mm to 5 mm and contains a hydrogen separating metal carried therein. As illustrated in FIG. 2, ceramic fine particles 181 are located at intervals of several hundred angstrom to form pores of the porous support body in the hydrogen separation membrane 18. Palladium fine particles 182 functioning as the hydrogen separating metal are carried in these pores. For convenience of illustration, the palladium fine particles 182 are sparsely dispersed in FIG. 2. In the actual state, however, the palladium fine particles 182 are densely present to block the pores of the porous support body, although it is not necessary to block all the pores. The required density of the palladium fine particles 182 is such a level as to make the gaseous mixture containing hydrogen naturally pass through any pores that are defined by the intervals between the adjoining ceramic fine particles 181 and are blocked with the palladium fine particles 182. A variety of substances having the selective permeability to hydrogen may be applied for the metal carried in the porous support body: for example, alloys of palladium and silver and alloys of lanthanum and nickel. Available examples of the ceramic fine particles include alumina, silicon nitride, and silica. The hydrogen separation membrane 18 may be manufactured by an impregnation process that causes the porous support body formed in advance to be impregnated with a solvent having the palladium fine particles 182 dissolved therein and calcines the impregnated porous support body or by a process that calcines a polymer mixture including the ceramic fine particles to form the porous support body and the palladium fine particles.

The hydrogen produced by the reforming reaction in the reformer unit 16 permeates the hydrogen separation membrane 18 to the separation unit 20, due to the difference in hydrogen partial pressure between the reformer unit 16 and the separation unit 20. The residual gas other than hydrogen does not permeate the hydrogen separation membrane 18 but is led to the shift unit 22. In the arrangement of this embodiment, a flow of steam is introduced as the purge gas into the separation unit 20 to assist extraction of hydrogen. A water reservoir 30 for storing water is provided as part of the fuel gas production system as shown in FIG. 1. A supply of water fed from the water reservoir 30 is vaporized to steam by the evaporator 32 and led to the separation unit 20. The water stored in the water reservoir 30 is also supplied to the evaporator 12 to be utilized for the reforming reaction.

Figure 3:
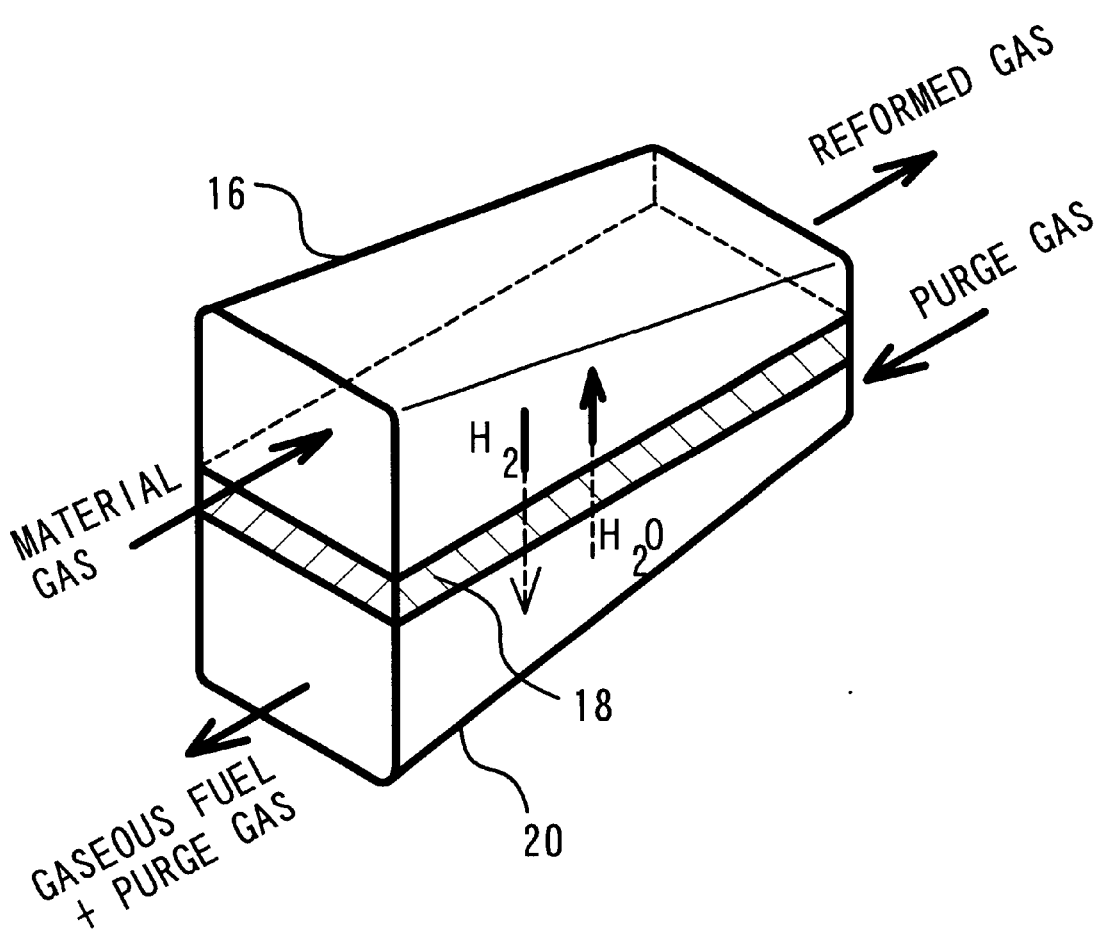
FIG. 3 schematically illustrates a hydrogen separation mechanism in the first embodiment.

FIG. 3 schematically illustrates the hydrogen separation mechanism. The hydrogen separation membrane 18 shown by hatching is interposed between the upper reformer unit 16 and the lower separation unit 20. A flow of the material gas is fed into the reformer unit 16 as shown by the arrow and undergoes the reforming reaction proceeding inside the reformer unit 16. The hydrogen produced in the course of the reforming reaction successively passes through the hydrogen separation membrane 18 to the separation unit 20. The reformed gas discharged downstream is led into the shift unit 22, which is located after the reformer unit 16, and undergoes the shift reaction.

The flow of steam is pressurized and introduced as the purge gas under the condition that the total pressure in the separation unit 20 is higher than the total pressure in the reformer unit 16. Since steam is used as the purge gas, however, the hydrogen partial pressure in the separation unit 20 is lower than the hydrogen partial pressure in the reformer unit 16. Even if there is a pinhole in the hydrogen separation membrane 18, this arrangement effectively prevents carbon monoxide generated in the reformer unit 16 from leaking into the separation unit 20. In the presence of the pinhole, this arrangement also advantageously causes the steam to flow from the separation unit 20 to the reformer unit 16 and undergo the reforming reaction and the shift reaction.

As shown in FIG. 3, the direction of the flow of the material gas is reverse to the direction of the flow of the purge gas in this embodiment. The permeability of the hydrogen separation membrane 18 to hydrogen generally depends upon the difference in hydrogen partial pressure between the feeding face of the reformed gas, that is, the face of the hydrogen separation membrane 18 adjoining to the reformer unit 16, and the extraction face of hydrogen, that is, the face adjoining to the separation unit 20. The lower reach of the material gas in the reformer unit 16 undergoes the higher degree of the reforming reaction and thereby has the higher hydrogen partial pressure, whereas the upper reach of the purge gas has the lower hydrogen partial pressure in the separation unit 20. The opposite flows of the material gas and the purge gas make the lower reach of the material gas flowing through the reformer unit 16 located near to the upper reach of the purge gas flowing through the separation unit 20 and accordingly ensure a significantly large difference in hydrogen partial pressure at this side. This enables hydrogen to be separated at a high efficiency. The arrangement of the hydrogen separation mechanism discussed above is only illustrative. A variety of other settings may be applied for the directions of the flows of the purge gas and the material gas. In one possible modification, the mechanism may not use the purge gas.

Referring back to FIG. 1, the description continues on the schematic structure of the fuel gas production system. A condenser 26 in the system functions to take the remaining steam out of the hydrogen, which has been transmitted from the reformer unit 16 to the separation unit 20, in the form of condensate (water). After the condensation, the hydrogen is supplied as the fuel gas to the fuel cells 28. The residual gas in the reformer unit 16 after the separation of hydrogen is led into the shift unit 22. The reactions expressed by Equations (1) and (2) given previously proceed in the reformer unit 16. The gas led into the shift unit 22 thus includes carbon monoxide and steam as primary components, as well as small quantities of the material gas and hydrogen. The reaction expressed by Equation (3) mainly proceeds in the shift unit 22 to produce hydrogen from carbon monoxide and water. The reforming reaction of the material gas also proceeds partly in the shift unit 22. The gas produced in the shift unit 22 is all led into the CO oxidation unit 24. The reaction proceeding in the CO oxidation unit 24 oxidizes the remaining carbon monoxide, which has not yet been oxidized in the shift unit 22, to carbon dioxide. This process gives a hydrogen-rich gas having a sufficiently reduced concentration of carbon monoxide, which is a noxious substance harmful to the electrodes in the fuel cells 28. The flow of this hydrogen-rich gas joins with the flow of hydrogen previously separated and transmitted to the separation unit 20, passes through the condenser 26 for removal of the remaining steam, and is eventually supplied to the fuel cells 28.

The fuel cells system of the above configuration separates and transmits the hydrogen produced in the reformer unit 16 to the separation unit 20, while feeding the residual gas having a reduced hydrogen partial pressure to the shift unit 22 for the shift reaction. The rate of the shift reaction expressed by Equation (3) depends upon the concentrations of the chemical substance before and after the reaction, for example, the hydrogen partial pressure. In the case of the low hydrogen partial pressure, the reaction is accelerated. The arrangement of the fuel cells system of the embodiment ensures the highly efficient chemical reactions to produce hydrogen from the material and thereby improves the production efficiency of the fuel gas. The arrangement of the embodiment utilizes the hydrogen obtained through the shift reaction and the CO oxidation as well as the hydrogen produced in the reformer unit 16 and subsequently extracted, thus being free from the waste of hydrogen. The efficient production of hydrogen enhances the hydrogen partial pressure in the fuel gas and accelerates the power generation by the fuel cells 28. The hydrogen separation mechanism integrated with the reformer unit 16 advantageously accelerates the reforming reaction proceeding in the reformer unit 16 and further enhances the production efficiency of the fuel gas.

A1. Modifications of First Embodiment

The fuel cells system of the embodiment, especially the fuel gas production system for producing the fuel gas, has the characteristics discussed below:

(a) The fuel gas is produced through a plurality of chemical processes including those proceeding in the reformer unit 16 and the shift unit 22;

(b) The flow path is designed to allow hydrogen in the fuel gas produced through the plurality of chemical processes not to be discharged to the outside nor directly introduced into the evaporators 12 and 32 or the combustion unit 14 but to be supplied to the fuel cells 28; and (c) The fuel gas production system has the hydrogen separation mechanism.

These characteristics of the embodiment enhance the hydrogen partial pressure and improve the production efficiency of the fuel gas.

The embodiment also has the additional characteristic:

(d) The hydrogen separation mechanism is disposed on the upper stream side of the chemical processes. The flow of the material gas is once divided into separate flows of hydrogen and residual gas, and the flow of hydrogen-rich gas resulting from the residual gas joins again with the flow of hydrogen and is supplied to the fuel cells 28.

This arrangement accelerates the reaction of each chemical process and ensures the further improvement in production efficiency of the fuel gas.

A variety of different arrangements other than that of the above embodiment may be applied for the fuel gas production system. FIG. 4 is a table showing some examples of applicable arrangements for the fuel gas production system. Here ten examples with numbers 1 to 10 are shown. In the first through the sixth structures, the chemical reaction device includes three reaction units, that is, the reformer unit, the shift unit, and the CO oxidation unit arranged in this sequence along the flow of the gas. In the seventh through the tenth structures, the chemical reaction device includes two reaction units, that is, the reformer unit and the shift unit arranged in this sequence along the flow of the gas. The classification depends upon the position and the type of the hydrogen separation mechanism. The first structure includes the hydrogen separation mechanism integrated with the reformer unit. This corresponds to the structure of the embodiment shown in FIG. 1.

Figure 5:
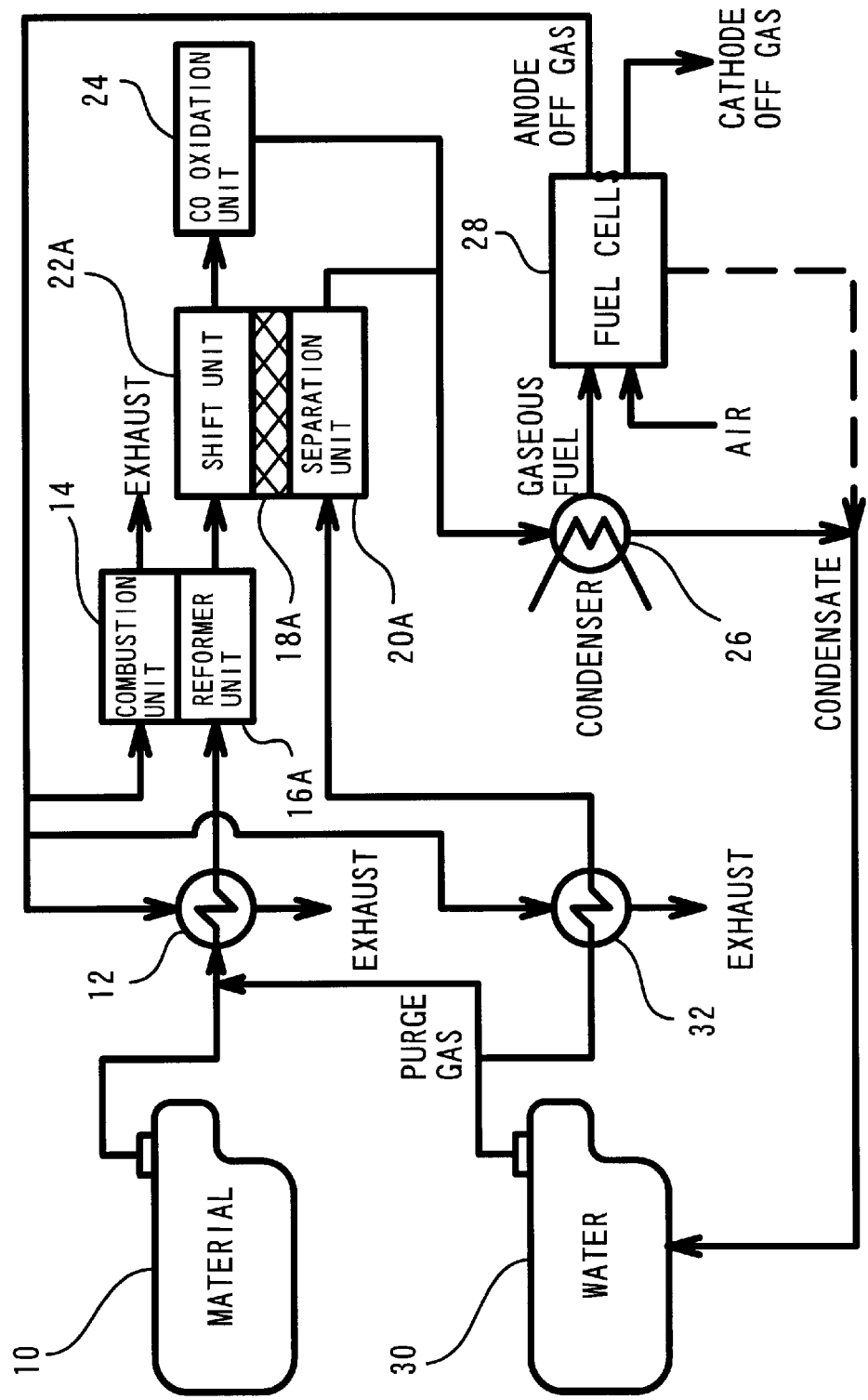
FIG. 5 schematically illustrates the structure of a fuel cells system including a fuel gas production system of the second structure in the table of FIG. 4.

The second structure has a hydrogen separation mechanism integrated with the shift unit. FIG. 5 schematically illustrates the structure of a fuel cells system including a fuel gas production system of the second structure. The constituents of the second structure shown by the same numerals as those in the first embodiment are identical with the constituents of the first embodiment and are not specifically described here. The difference from the first embodiment shown in FIG. 1 is the configuration of a reformer unit 16A, a shift unit 22A, a hydrogen separation membrane 18A, and a separation unit 20A. In the structure of the above embodiment, the hydrogen separation membrane 18 and the separation unit 20 are integrated with the reformer unit 16. In the second structure, on the other hand, the hydrogen separation mechanism is not integrated with the reformer unit 16A. The reformer unit 16A is filled with the catalyst for accelerating the reforming reaction in the same manner as discussed in the first embodiment. Since the reformer unit 16A does not have the hydrogen separation mechanism, the reformed gas that is produced in the reformer unit 16A and contains carbon monoxide and hydrogen as primary components is all led into the shift unit 22A.

In the second structure, the hydrogen separation membrane 18A and the separation unit 20A as the hydrogen separation mechanism are integrated with the shift unit 22A. The configuration of the hydrogen separation mechanism integrated with the shift unit 22A is substantially similar to that of the hydrogen separation mechanism integrated with the reformer unit 16 and shown in FIG. 3. Like the above embodiment, the flow of steam as the purge gas is introduced into the separation unit 20A. The hydrogen produced through the shift reaction proceeding in the shift unit 22A and the hydrogen included in the reformed gas produced by the reforming reaction in the reformer unit 16A permeate the hydrogen separation membrane 18A to the separation unit 20A, based on the same principles as discussed in the embodiment. The residual gas after the separation of hydrogen in the shift unit 22A is led into the CO oxidation unit 24 to undergo the oxidation of carbon monoxide. The resulting gas output from the CO oxidation unit 24 joins with the hydrogen previously separated and output from the separation unit 20A, and is supplied to the fuel cells 28 via the condenser 26. The second structure satisfies all the characteristics (a) through (d) discussed above and accordingly ensures the efficient production of the fuel gas having the high hydrogen partial pressure like the above embodiment.

Figure 6:
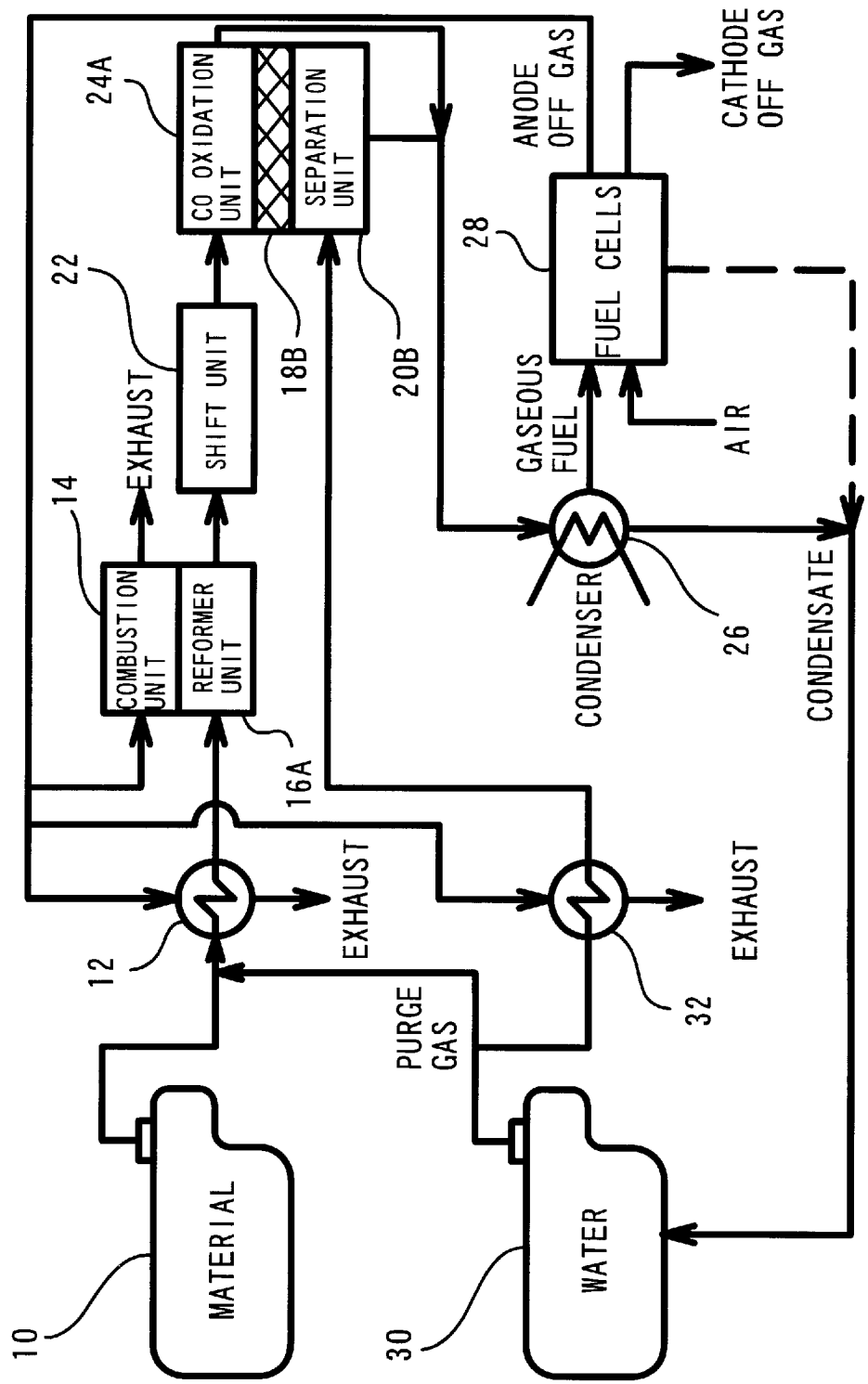
FIG. 6 schematically illustrates the structure of a fuel cells system including a fuel gas production system of the third structure in the table of FIG. 4.

The third structure has a hydrogen separation mechanism integrated with the CO oxidation unit. FIG. 6 schematically illustrates the structure of a fuel cells system including a fuel gas production system of the third structure. The constituents of the third structure shown by the same numerals as those in the first embodiment and the second structure are identical with the constituents of the first embodiment and the second structure and are not specifically described here. The third structure includes the reformer unit 16A of the second structure and the shift unit 22 of the first embodiment, neither of which is integrated with the hydrogen separation mechanism. The resulting gas produced through the chemical processes in the reformer unit 16A and the shift unit 22 is all led into a CO oxidation unit 24A. In the third structure, the hydrogen separation mechanism is integrated with the CO oxidation unit 24A. The configuration of the hydrogen separation mechanism integrated with the CO oxidation unit 24A is substantially similar to that of the hydrogen separation mechanism integrated with the reformer unit 16 and shown in FIG. 3. The hydrogen produced through the chemical processes in the reformer unit 16A and the shift unit 22 permeates a hydrogen separation membrane 18B to a separation unit 20B, based on the same principles as discussed in the above embodiment, and is supplied to the fuel cells 28 via the condenser 26. The residual gas after the separation of the hydrogen is discharged to the outside. The third structure satisfies the characteristics (a) through (c) discussed above. This ensures the efficient production of the fuel gas through the multi-step chemical reactions and enhances the hydrogen partial pressure of the resulting fuel gas by means of the hydrogen separation mechanism.

Figure 7:
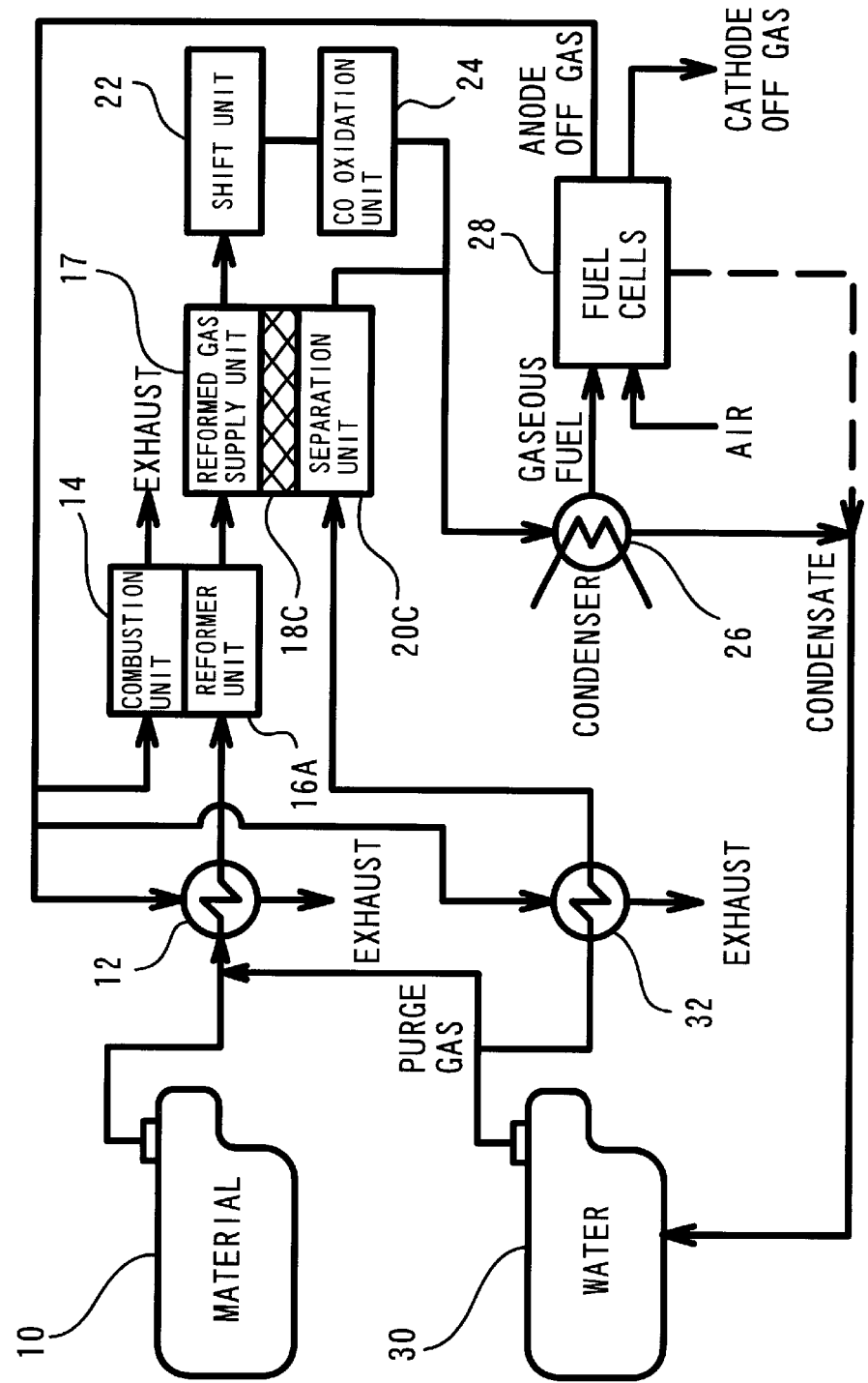
FIG. 7 schematically illustrates the structure of a fuel cells system including a fuel gas production system of the fourth structure in the table of FIG. 4.

The fourth structure has an independent hydrogen separation mechanism interposed between the reformer unit and the shift unit. FIG. 7 schematically illustrates the structure of a fuel cells system including a fuel gas production system of the fourth structure. The constituents of the fourth structure shown by the same numerals as those in the first embodiment and the above structures are identical with the constituents of the first embodiment and the above structures and are not specifically described here. The fourth structure includes the reformer unit 16A of the second structure and the shift unit 22 and the CO oxidation unit 24 of the first embodiment, none of which is integrated with the hydrogen separation mechanism. In the fourth structure, an independent hydrogen separation mechanism is disposed between the reformer unit 16A and the shift unit 22. The configuration of the independent hydrogen separation mechanism is substantially similar to that of the hydrogen separation mechanism integrated with the reformer unit 16 and shown in FIG. 3. The reformed gas produced through the reforming reaction proceeding in the reformer unit 16A is fed to a reformed gas supply unit 17 of the hydrogen separation mechanism. No reaction proceeds in the reformed gas supply unit 17. The flow of the reformed gas passes through the reformed gas supply unit 17 at the rate and the pressure suitable for separation of hydrogen. The hydrogen included in the reformed gas fed to the reformed gas supply unit 17 permeates a hydrogen separation membrane 18C to a separation unit 20C, based on the same principles as discussed in the above embodiment, and is supplied to the fuel cells 28 via the condenser 26. The residual gas after the separation of hydrogen undergoes the chemical reactions proceeding in the shift unit 22 and the CO oxidation unit 24 in the same manner as the embodiment, joins with the flow of the hydrogen output from the separation unit 20C, and is supplied to the fuel cells 28 via the condenser 26. The fourth structure satisfies all the characteristics (a) through (d) discussed above and accordingly ensures the efficient production of the fuel gas having the high hydrogen partial pressure like the above embodiment.

Figure 8:
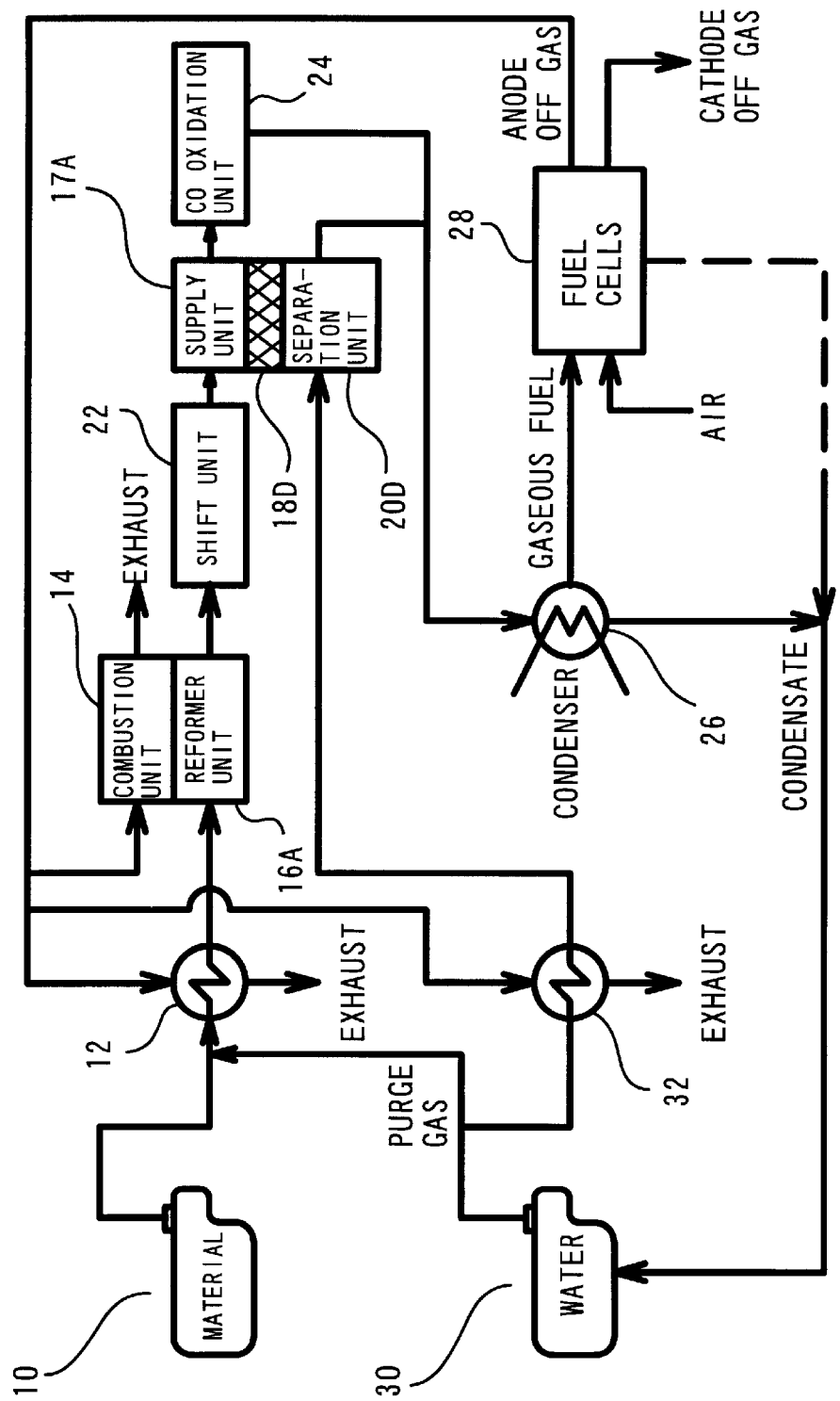
FIG. 8 schematically illustrates the structure of a fuel cells system including a fuel gas production system of the fifth structure in the table of FIG. 4.

The fifth structure has an independent hydrogen separation mechanism interposed between the shift unit and the CO oxidation unit. FIG. 8 schematically illustrates the structure of a fuel cells system including a fuel gas production system of the fifth structure. The constituents of the fifth structure shown by the same numerals as those in the first embodiment and the above structures are identical with the constituents of the first embodiment and the above structures and are not specifically described here. The fifth structure includes the reformer unit 16A of the second structure and the shift unit 22 and the CO oxidation unit 24 of the first embodiment, none of which is integrated with the hydrogen separation mechanism. In the fifth structure, an independent hydrogen separation mechanism is disposed between the shift unit 22 and the CO oxidation unit 24. The configuration of the independent hydrogen separation mechanism is substantially similar to that of the fourth structure. The resulting gas produced through the chemical processes proceeding in the reformer unit 16A and the shift unit 22 is fed to a gas supply unit 17A of the hydrogen separation mechanism. The hydrogen included in the gas fed to the gas supply unit 17A permeates a hydrogen separation membrane 18D to a separation unit 20D, based on the same principles as discussed in the above embodiment, and is supplied to the fuel cells 28 via the condenser 26. The residual gas after the separation of hydrogen undergoes the chemical reaction proceeding in the CO oxidation unit 24, joins with the flow of the hydrogen output from the separation unit 20D, and is supplied to the fuel cells 28 via the condenser 26. The fifth structure satisfies all the characteristics (a) through (d) discussed above and accordingly ensures the efficient production of the fuel gas having the high hydrogen partial pressure like the above embodiment.

The sixth structure has an independent hydrogen separation mechanism disposed after the CO oxidation unit. This structure is readily actualized by shifting the position of the hydrogen separation mechanism in the fifth structure to the lower stream side of the CO oxidation unit and is thus not specifically illustrated. In this structure, the hydrogen included in the resulting gas, which is produced through the chemical processes proceeding in the reformer unit, the shift unit, and the CO oxidation unit, is separated by the hydrogen separation mechanism and supplied to the fuel cells via the condenser. Namely the flow path is formed in a serial manner. The sixth structure satisfies the characteristics (a)

through (c) discussed above. This ensures the efficient production of the fuel gas through the multi-step chemical reactions and enhances the hydrogen partial pressure of the resulting fuel gas by means of the hydrogen separation mechanism.

Figure 9:
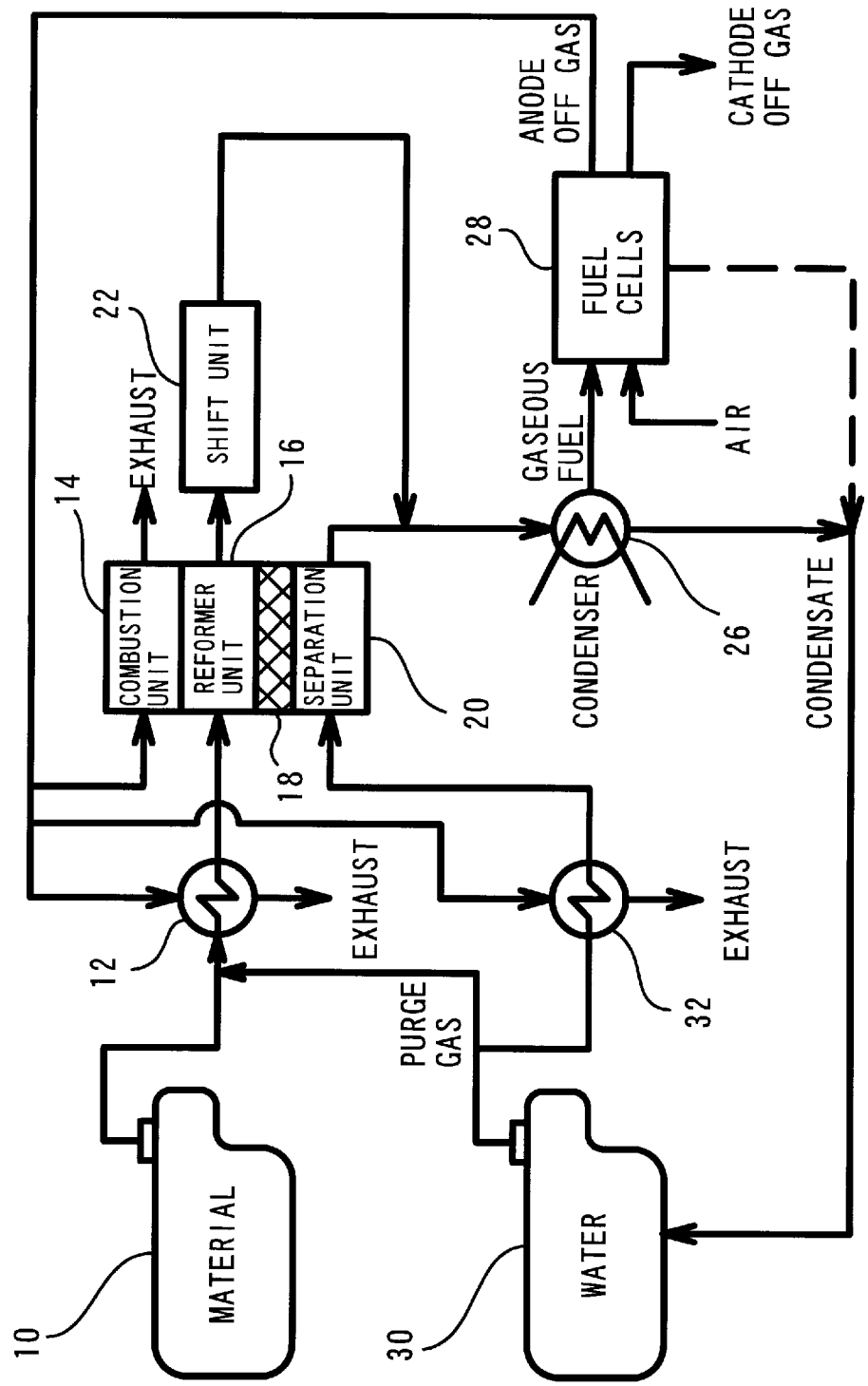
FIG. 9 schematically illustrates the structure of a fuel cells system including a fuel gas production system of the seventh structure in the table of FIG. 4.
Figure 10:
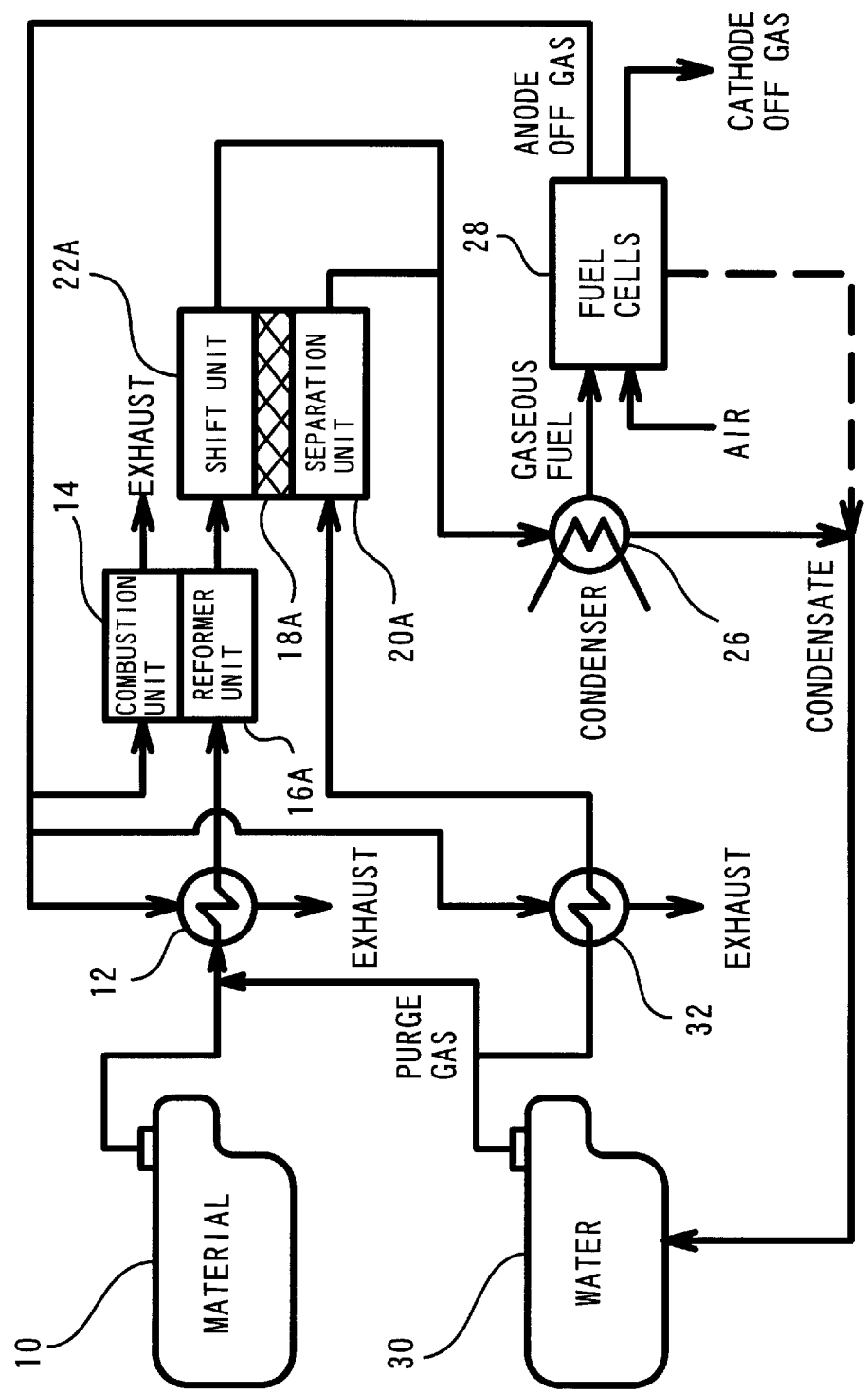
FIG. 10 schematically illustrates the structure of a fuel cells system including a fuel gas production system of the eighth structure in the table of FIG. 4.
Figure 11:
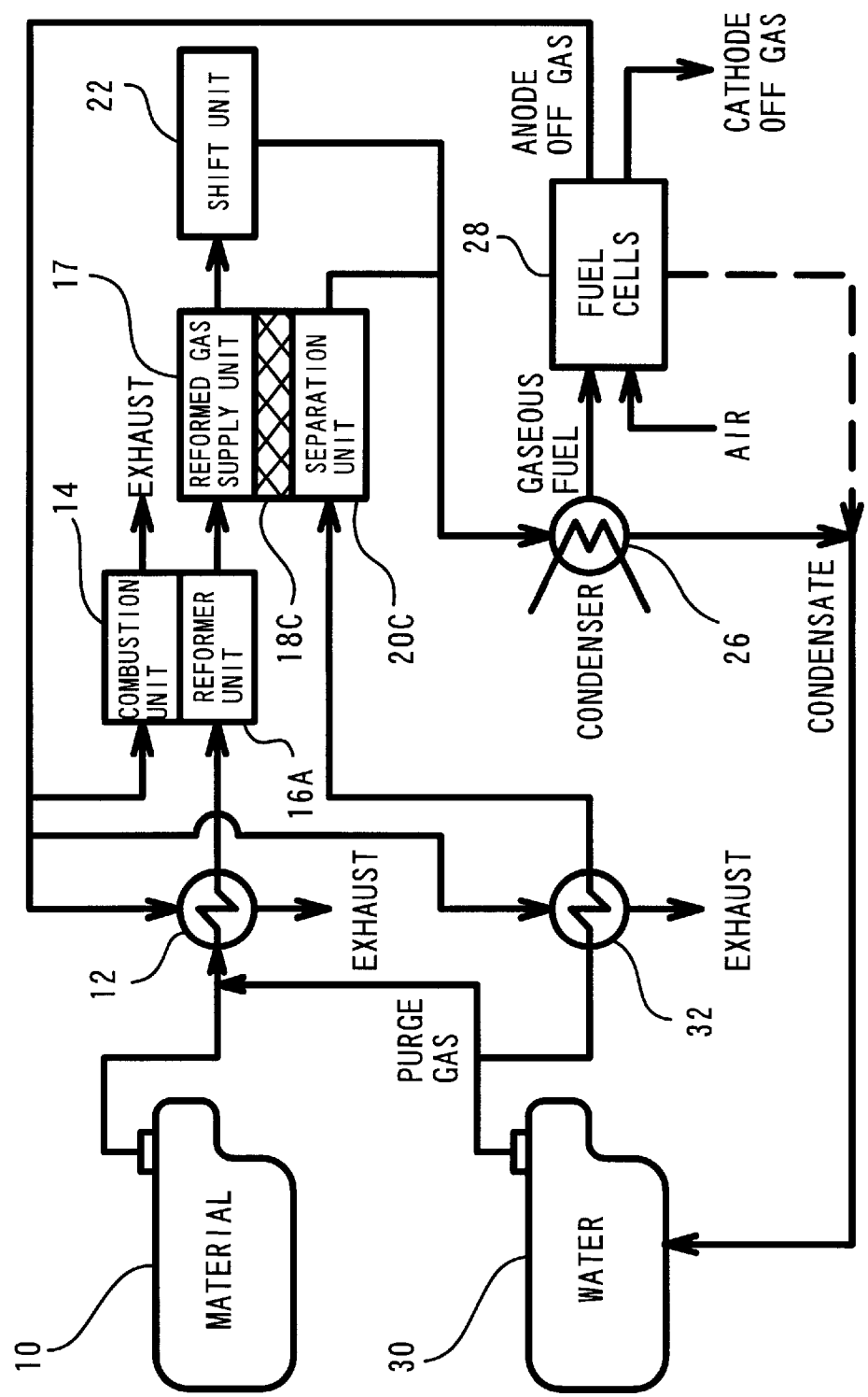
FIG. 11 schematically illustrates the structure of a fuel cells system including a fuel gas production system of the ninth structure in the table of FIG. 4.

The seventh structure is without the CO oxidation unit and has a hydrogen separation mechanism integrated with the reformer unit. The eighth structure is without the CO oxidation unit and has a hydrogen separation mechanism integrated with the shift unit. The ninth structure is without the CO oxidation unit and has an independent hydrogen separation mechanism interposed between the reformer unit and the shift unit. FIG. 9 schematically illustrates the structure of a fuel cells system including a fuel gas production system of the seventh structure. FIG. 10 schematically illustrates the structure of a fuel cells system including a fuel gas production system of the eighth structure. FIG. 11 schematically illustrates the structure of a fuel cells system including a fuel gas production system of the ninth structure.

The constituents of these seventh to ninth structures shown by the same numerals as those in the first embodiment and the above structures are identical with the constituents of the first embodiment and the above structures and are not specifically described here. The seventh through the ninth structures are respectively similar to the first embodiment (see FIG. 1), the second structure (see FIG. 5), and the fourth structure (see FIG. 7), except that the CO oxidation unit is omitted from the lower stream side of the shift unit. The CO oxidation unit may be omitted as long as the concentration of carbon monoxide is sufficiently reduced in the shift unit 22 to a level that is not harmful to the electrodes in the fuel cells 28. The seventh through the ninth structures satisfy all the characteristics (a) through (d) discussed above and accordingly ensure the efficient production of the fuel gas having the high hydrogen partial pressure like the above embodiment.

The tenth structure is without the CO oxidation unit and has an independent hydrogen separation mechanism disposed after the shift unit. This structure is readily actualized by shifting the position of the hydrogen separation mechanism in the ninth structure to the lower stream side of the shift unit and is thus not specifically illustrated. In this structure, the hydrogen included in the resulting gas, which is produced through the chemical processes proceeding in the reformer unit and the shift unit, is separated by the hydrogen separation mechanism and supplied to the fuel cells via the condenser. Namely the flow path is formed in a serial manner. The tenth structure satisfies the characteristics (a) through (c) discussed above. This ensures the efficient production of the fuel gas through the multi-step chemical reactions and enhances the hydrogen partial pressure of the resulting fuel gas by means of the hydrogen separation mechanism.

The technique of the present invention is applicable to a variety of configurations other than those discussed above as the modified examples. In one possible modification, the separation of hydrogen may be carried out at a plurality of different positions. For example, in the case where the chemical reaction device includes the reformer unit and the shift unit, the separation of hydrogen may be performed at both the reformer unit and the shift unit. In the case of the integral hydrogen separation mechanism, this modified arrangement is actualized by the combination of the first structure with the second structure or by the combination of the seventh structure with the eighth structure. In the case of the independent hydrogen separation mechanism, this modified arrangement is actualized by the combination of the fourth structure with the fifth structure or by the combination of the ninth structure with the tenth structure. Any other combinations may also be applicable for the fuel gas production system. All the above embodiment and its modified examples have two or three reaction units as the chemical reaction device, but the chemical reaction device of the fuel gas production system may include a greater number of reaction units.

B. Second Embodiment

Figure 12:
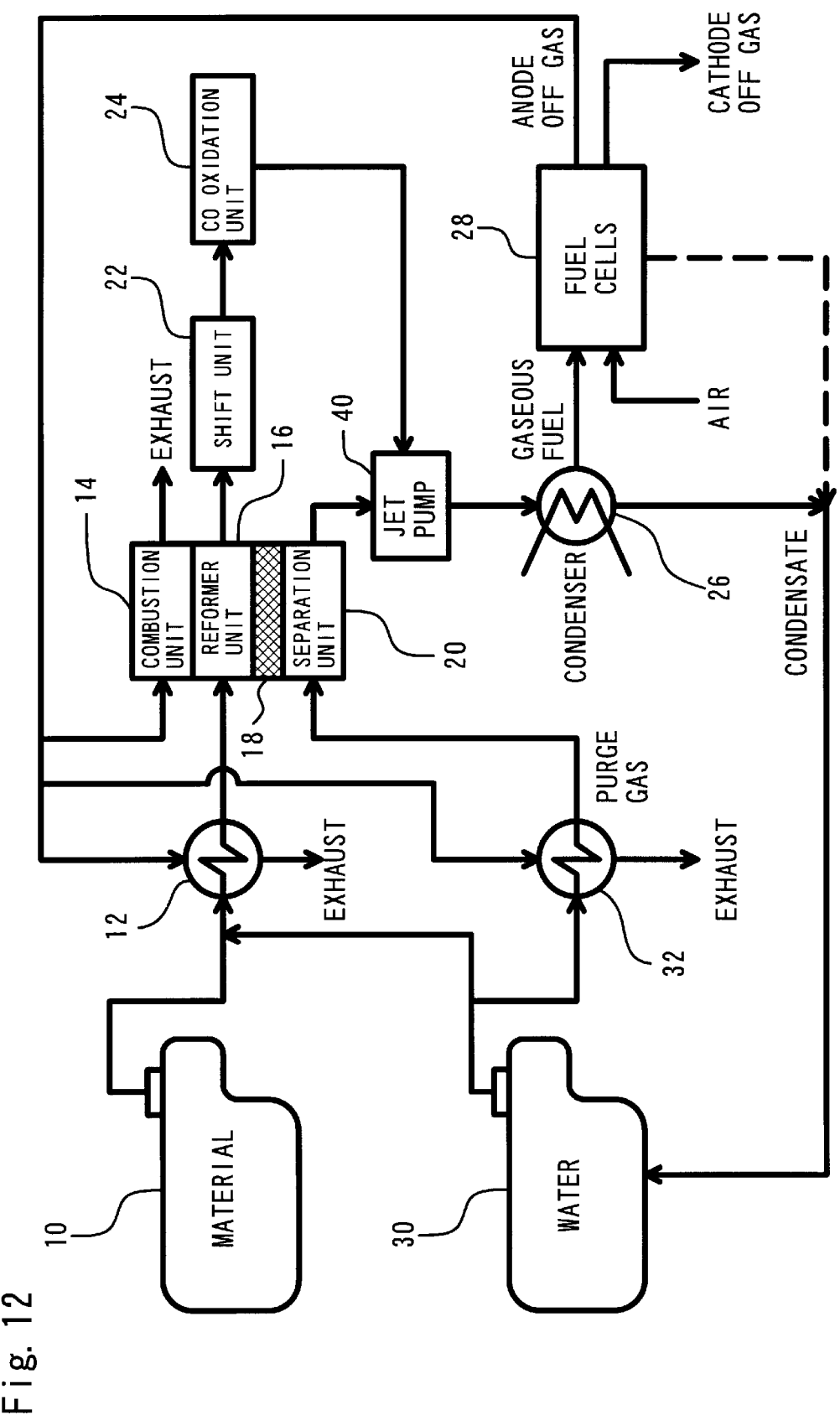
FIG. 12 schematically illustrates the structure of a fuel cells system in a second embodiment of the present invention.

FIG. 12 schematically illustrates the structure of a fuel cells system in a second embodiment of the present invention. The fuel cells system of the second embodiment has a similar structure to that of the fuel cells system of the first embodiment shown in FIG. 1. The primary difference from the first embodiment is a jet pump 40 that is provided at the meeting point of the purge gas, which contains hydrogen permeating to the separation unit 20, and the resulting gas, which is produced through the predetermined chemical reactions proceeding in the chemical reaction device (that is, the reformer unit 16, the shift unit 22, and the CO oxidation unit 24).

The jet pump 40 is driven to reduce the internal pressure by means of a high-pressure fluid jetted from the nozzle and thereby suck other fluids. The fluids of two systems flown into the jet pump 40 flow at a fixed ratio of flow rates and are discharged from one system. In the fuel cells system of the second embodiment, the flow rate of the material gas is regulated according to the electric power required for the fuel cells 28. The jet pump 40 is designed to flow a predetermined quantity of the purge gas, which contains hydrogen permeating to the separation unit 20, according to the flow rate of the residual gas (that is, the remaining gas after separation of hydrogen from the gas produced through the chemical reactions in the chemical reaction device).

For the efficient transmission of hydrogen from the reformer unit 16 to the separation unit 20 via the hydrogen separation membrane 18, it is required to keep the hydrogen partial pressure at low level in the separation unit 20. In the case where a large quantity of the material gas is fed to the reformer unit 16 in order to supply a large quantity of hydrogen to the fuel cells 28, for example, the regulation is required to flow a large quantity of the purge gas. Namely both the flow rates of the material gas and the purge gas should be regulated. The structure of the second embodiment uses the jet pump 40 and accordingly does not require separate flow regulation means for the material gas and the purge gas. This arrangement advantageously reduces the size and the manufacturing cost of the whole fuel cells system. Another advantage is that the jet pump 40 does not have any mechanically movable part and accordingly has a high reliability.

B1. Modification of Second Embodiment

The second embodiment discussed above regards the application of the jet pump 40 to the fuel cells system shown in FIG. 1. The jet pump 40 may also be applicable to the fuel cells systems of the second through the tenth structures described above as the modified examples.

Figure 13:
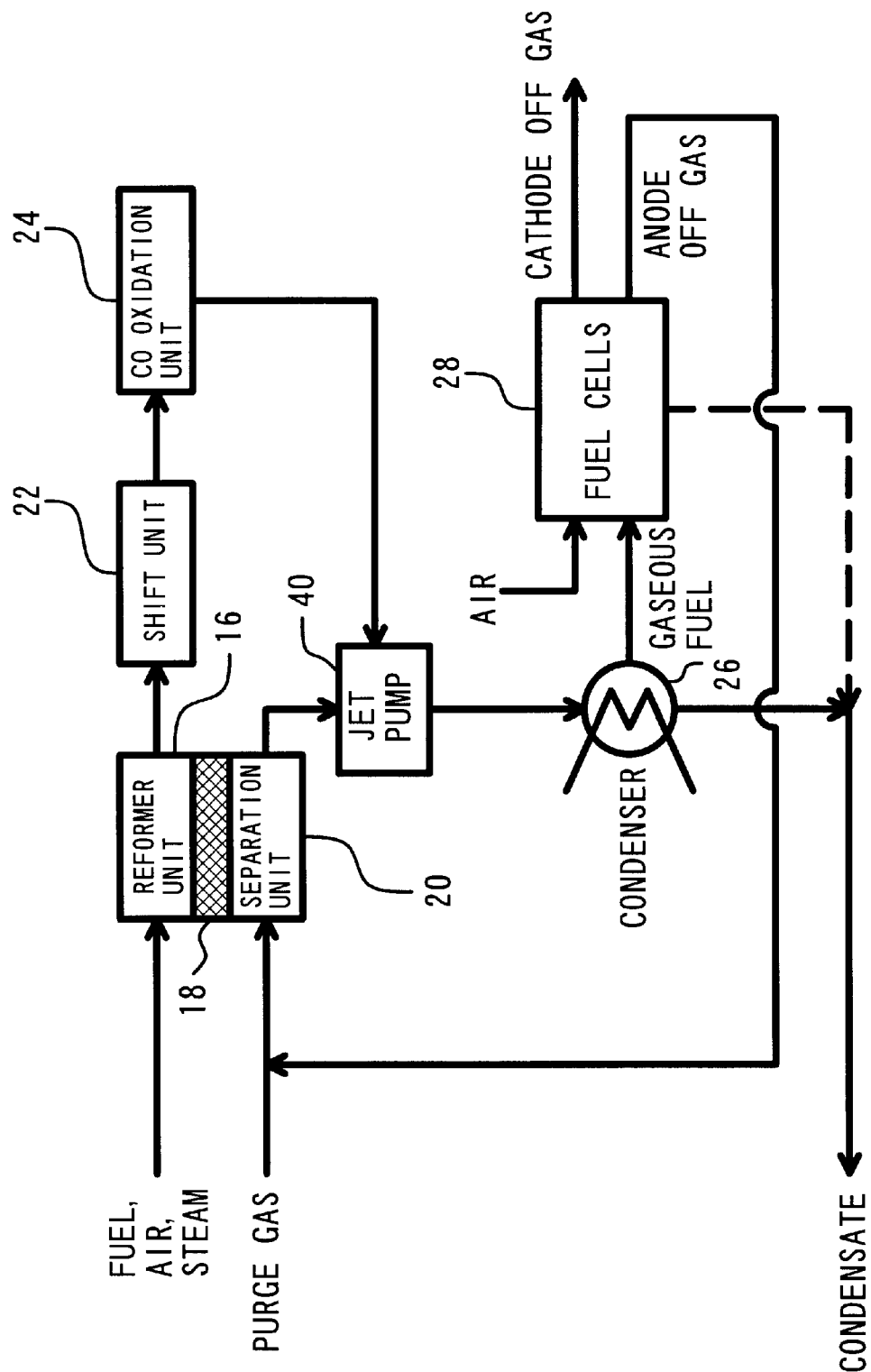
FIG. 13 schematically illustrates the structure of another fuel cells system as a modified example of the second embodiment.

There are other possible modifications of the second embodiment. FIG. 13 schematically illustrates the structure of another fuel cells system as a modified example of the second embodiment. In this modified example, the anode off gas discharged from the anodes of the fuel cells 28 is introduced into the separation unit 20 as the purge gas. The anode off gas contains the residual hydrogen that has not been utilized for the reactions in the fuel cells 28. The arrangement of this modified example utilizes the anode off gas containing the residual hydrogen as the purge gas while enabling the residual hydrogen to be input again into the fuel cells 28, thereby ensuring the efficient use of hydrogen.

C. Third Embodiment

Figure 14:
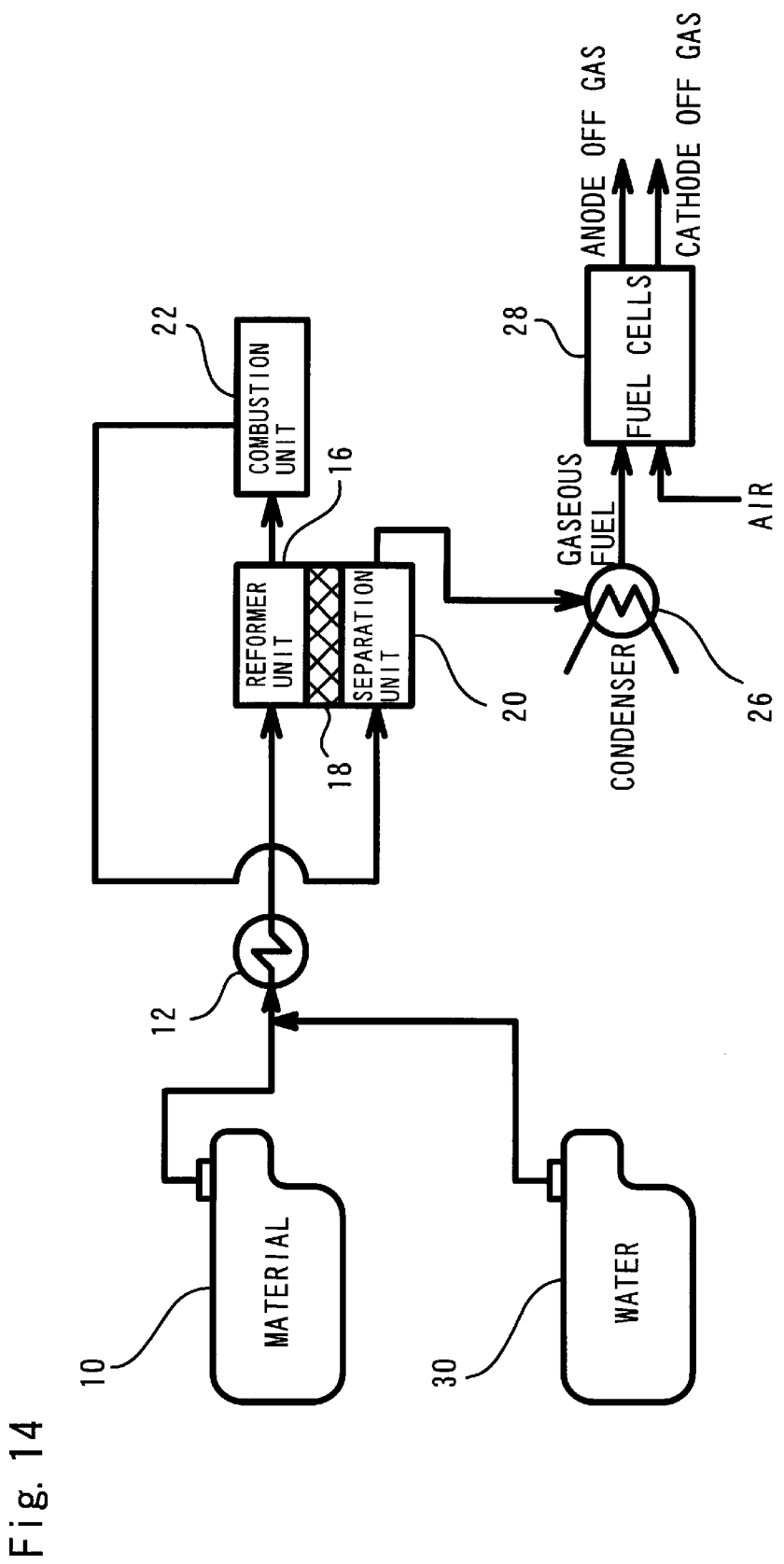
FIG. 14 schematically illustrates the structure of a fuel cells system in a third embodiment of the present invention.

FIG. 14 schematically illustrates the structure of a fuel cells system in a third embodiment of the present invention. The fuel cells system includes a fuel gas production system that decomposes a material stored in the material reservoir 10 to produce a hydrogen-rich fuel gas, and the fuel cell 28 that generate an electromotive force through electrochemical reactions of hydrogen include in the produced fuel gas with oxygen in the air.

Hydrogen produced through the reforming reaction in the reformer unit 16 permeates the hydrogen separation membrane 18 to the separation unit 20, due to the difference in hydrogen partial pressure between the reformer unit 16 and the separation unit 20. Any gas other than hydrogen does not permeate the hydrogen separation membrane 18 but is fed to a combustion unit 23. In the structure of the third embodiment, the gas passing through the combustion unit 23 is introduced into the separation unit 20 as the purge gas to assist extraction of hydrogen. Namely part of the material gas passes through the reformer unit 16, the hydrogen separation membrane 18, and the separation unit 20 in this sequence, while the residual gas passes through the reformer unit 16, the combustion unit 23, and the separation unit 20 in this sequence.

The purge gas is introduced into the separation unit 20 under the condition that the total pressure in the separation unit 20 is higher than or equal to the total pressure in the reformer unit 16. Since the purge gas used here is the residual gas after separation of hydrogen, the hydrogen partial pressure in the separation unit 20 is lower than the hydrogen partial pressure in the reformer unit 16. Even if there is a pinhole in the hydrogen separation membrane 18, the total pressure difference effectively prevents carbon monoxide generated in the reformer unit 16 from leaking into the separation unit 20. In the presence of the pinhole, the total pressure difference also advantageously causes the steam to flow from the separation unit 20 to the reformer unit 16 and undergo the reforming reaction.

For the high efficiency of hydrogen separation, on the contrary, it is desirable that the total pressure in the reformer unit 16 is higher than the total pressure in the separation unit 20. This pressure condition may be adopted when there is little possibility of the presence of any pinhole. All the embodiments discussed below apply the above pressure condition for the hydrogen separation mechanism, unless otherwise specified.

The remaining steam is taken out of the hydrogen, which has been transmitted from the reformer unit 16 to the separation unit 20, in the form of condensate (water) by the condenser 26. After the condensation, the hydrogen is supplied as the fuel gas to the fuel cells 28. The arrangement of supplying the fuel gas to the fuel cells 28 after the removal of steam effectively prevents the electrodes in the fuel cells 28 from sweating and thereby ensures the stable power generation by the fuel cells 28. The residual gas after the separation of hydrogen is led from the reformer unit 16 into the combustion unit 23. As shown in Equations (1) and (2) given previously, the reforming reaction gives carbon monoxide as well as hydrogen. The residual gas accordingly has a high content of carbon monoxide. This residual gas is subjected to combustion in the combustion unit 23, so that carbon monoxide is oxidized to carbon dioxide and the remaining hydrogen in the residual gas is oxidized to steam. The heat resulting from the combustion is utilized to heat the material. In the arrangement of this embodiment, the residual gas after the separation of hydrogen undergoes combustion, while most of the hydrogen produced by the chemical reaction is not oxidized but is utilized as the fuel gas. The resulting gas after the combustion has a sufficiently reduced concentration of carbon monoxide, which is a noxious substance harmful to the electrodes in the fuel cells 28, and contains nitrogen, steam, carbon dioxide, and a trace amount of oxygen. The flow of the resulting gas is introduced into the separation unit 20 as the purge gas, joins with the flow of the extracted hydrogen, and is supplied to the fuel cells 28 via the condenser 26 as discussed previously.

The arrangement of the fuel cells system of the third embodiment transmits the hydrogen produced in the reformer unit 16 to the separation unit 20 for separation, so as to accelerate the reforming reaction in the reformer unit 16. The purge gas is introduced into the separation unit 20 to carry out the extracted hydrogen and thereby keep the hydrogen partial pressure at low level in the separation unit 20. This ensures the efficient separation of hydrogen.

The arrangement of utilizing the residual gas as the purge gas does not require any special mechanism for producing the purge gas, for example, an evaporator. Compared with the structure that utilizes a condensable gas on the premise of the recycle of the purge gas, this structure enables size reduction or even omission of the condenser, thus advantageously reducing the size of the whole fuel cells system.

The arrangement of this embodiment oxidizes carbon monoxide included in the residual gas in the combustion unit before utilizing the residual gas as the purge gas. This effectively reduces the potential harm of carbon monoxide to the electrodes in the fuel cells 28. The relatively small-sized combustion unit 23 is sufficient for oxidation, so that the whole fuel cells system is made favorably compact.

D. Fourth Embodiment

Figure 15:
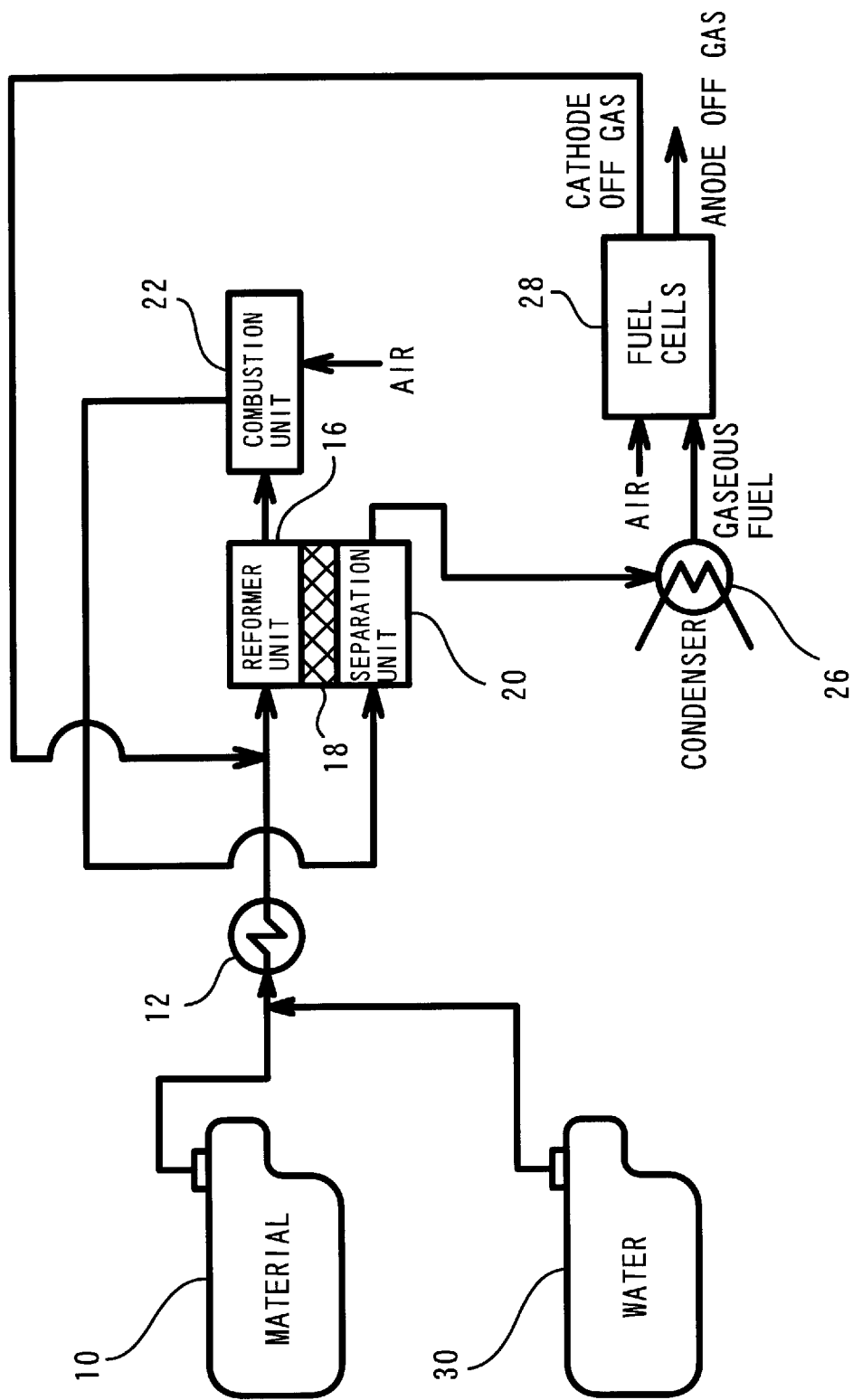
FIG. 15 schematically illustrates the structure of a fuel cells system in a fourth embodiment of the present invention.

FIG. 15 schematically illustrates the structure of a fuel cells system in a fourth embodiment of the present invention. The third embodiment regards the arrangement of utilizing the residual gas, which is not transmitted to the separation unit 20 but remains after separation of hydrogen from the reformed gas produced in the reformer unit 16, as the purge gas. The fourth embodiment utilizes a cathode off gas discharged from the cathodes in the fuel cells 28 in addition to the residual gas as the purge gas.

The difference from the third embodiment is that the fuel cells system of the fourth embodiment has a flow path for leading the flow of the cathode off gas discharged from the fuel cells 28 to the upper stream side of the reformer unit 16. Oxygen in the air is utilized for power generation at the cathodes in the fuel cells 28, so that the cathode off gas includes nitrogen as the primary component and contains a trace amount of oxygen.

The cathode off gas is flown into the reformer unit 16, passes through the combustion unit 23, and is introduced into the separation unit 20 as the purge gas. The arrangement of additionally utilizing the cathode off gas as the purge gas increases the flow of the purge gas and thereby more efficiently lowers the hydrogen partial pressure in the separation unit 20, compared with the structure of utilizing only the residual gas as the purge gas. Another advantage of this arrangement is that oxygen included in the cathode off gas is subjected to the reforming reaction proceeding in the reformer unit 16. The cathode off gas undergoes combustion in the combustion unit 23 for consumption of oxygen, before being utilized as the purge gas. This arrangement effectively prevents the extracted hydrogen from reacting with oxygen contained in the cathode off gas in the separation unit 20.

D1. Modifications of Fourth Embodiment

Figure 16:
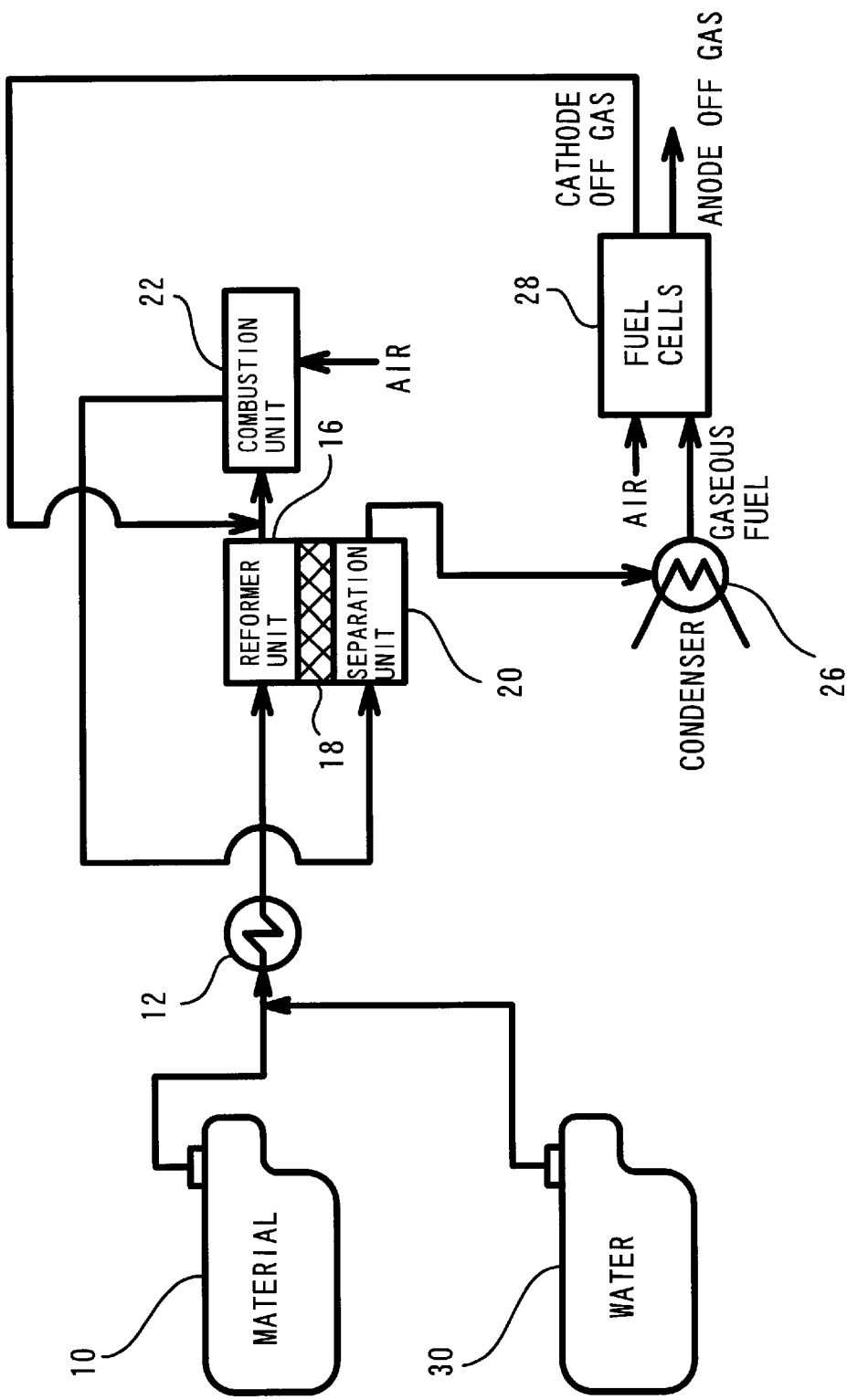
FIG. 16 schematically illustrates the structure of another fuel cells system as a first modified example of the fourth embodiment.

The fourth embodiment regards the structure of leading the flow of the cathode off gas to the upper stream side of the reformer unit 16. The flow side of the cathode off gas is, however, not restricted to this arrangement. FIG. 16 schematically illustrates the structure of another fuel cells system as a first modified example of the fourth embodiment. In the first modified example, the flow of the cathode off gas is led to an intermediate position between the reformer unit 16 and the combustion unit 23. This arrangement has the same advantages as those of the fourth embodiment, except that oxygen in the cathode off gas is not subjected to the reforming reaction.

Figure 17:
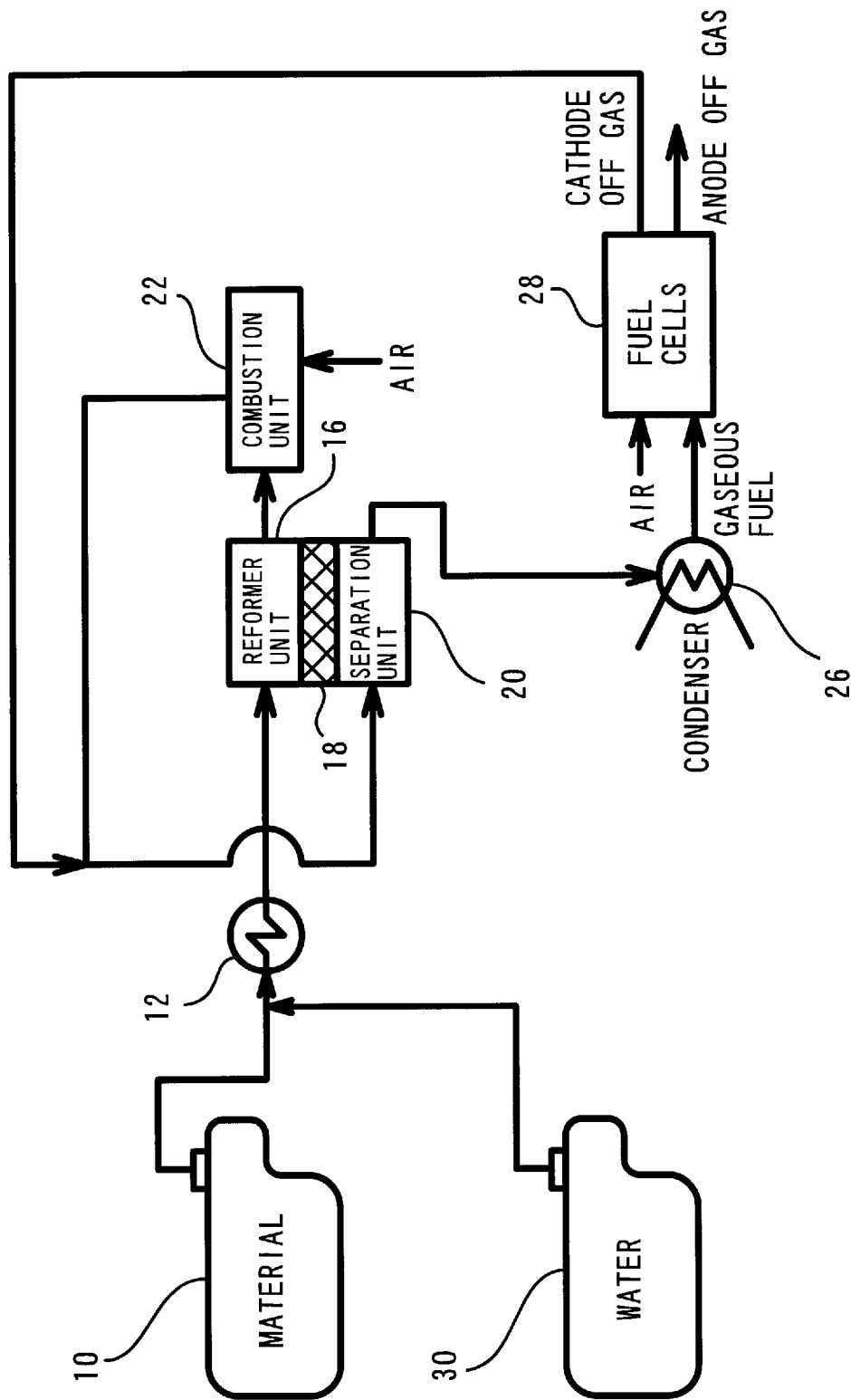
FIG. 17 schematically illustrates the structure of still another fuel cells system as a second modified example of the fourth embodiment.

FIG. 17 schematically illustrates the structure of still another fuel cells system as a second modified example of the fourth embodiment. In the second modified example, the flow of the cathode off gas is led to an intermediate position between the combustion unit 23 and the separation unit 20. This arrangement has the same advantages as those of the fourth embodiment, except that oxygen in the cathode off gas is not subjected to the reforming reaction. Another advantage of the second modified example is that the temperature of the purge gas is sufficiently close to the driving temperature of the fuel cells 28. The reforming reaction proceeds at extremely high temperatures in the reformer unit 16. The temperature of the fuel gas containing the extracted hydrogen should thus be lowered by a heat exchange unit, prior to the supply to the fuel cells 28. The temperature of the cathode off gas is naturally very close to the driving temperature of the fuel cells 28. The arrangement of the second modified example utilizes the cathode off gas for extraction of hydrogen and thereby makes the temperature of the flow of the fuel gas sufficiently close to the driving temperature of the fuel cells 28. This arrangement advantageously enables size reduction or even omission of the heat exchange unit.

The fourth embodiment and its modified examples utilize the cathode off gas as the purge gas. In another possible modification, the anode off gas may be utilized as the purge gas. The structure of the fuel cells system utilizing the anode off gas is readily actualized by replacing the flow path of the cathode off gas with the flow path of the anode off gas and is thus not specifically illustrated here.

Like the fourth embodiment, the arrangement of utilizing the anode off gas favorably increases the flow of the purge gas. The anode off gas includes steam produced through the electrochemical reactions proceeding in the fuel cells. The structure of leading the flow of the anode off gas to the upper stream side of the reformer unit 16 as in the structure of FIG. 15 advantageously enables the steam to be utilized for the reforming reaction. The anode off gas contains the remaining hydrogen that has not been used for the reactions in the fuel cells 28. The arrangement of using the anode off gas as the purge gas inputs the remaining hydrogen again into the fuel cells 28, thus ensuring the efficient use of hydrogen.

E. Fifth Embodiment

Figure 18:
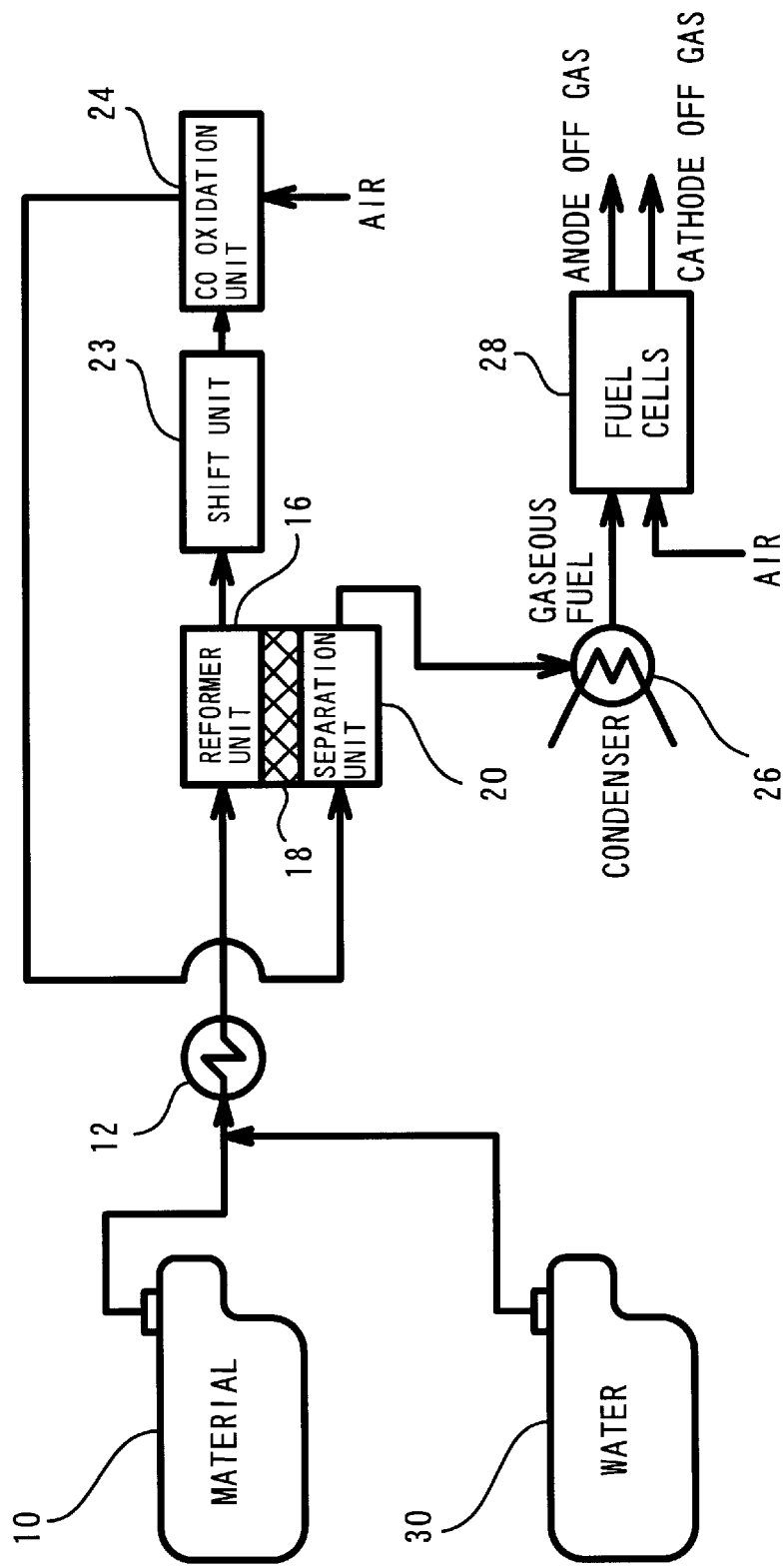
FIG. 18 schematically illustrates the structure of a fuel cells system in a fifth embodiment of the present invention.

FIG. 18 schematically illustrates the structure of a fuel cells system in a fifth embodiment of the present invention. The fuel cells system of the fifth embodiment has a similar structure to that of the third embodiment shown in FIG. 14, except that the combustion unit 23 in the third embodiment is replaced by the shift unit 22 and the CO oxidation unit 24.

The shift reaction expressed by Equation (3) given previously proceeds in the shift unit 22. The shift unit 22 receives a supply of steam and has a catalyst suitable for the shift reaction carried in the flow path of the residual gas output from the reformer unit 16. The CO oxidation unit 24 oxidizes carbon monoxide, which still remains after the shift reaction in the shift unit 22, by the catalytic reaction. The gas discharged from the CO oxidation unit 24 is introduced into the separation unit 20 as the purge gas. In the structure of the fifth embodiment, for the effective separation of hydrogen, the purge gas should be led into the separation unit 20 under the condition that the total pressure in the reformer unit 16 is higher than the total pressure in the separation unit 20.

The fuel cells system of the fifth embodiment does not require any special mechanism for producing the purge gas. The use of the residual gas for the purge gas ensures the efficient use of hydrogen.

The structure of the fifth embodiment has the shift unit 22 and the CO oxidation unit 24 in which the catalytic reactions proceed to reduce the concentration of carbon monoxide contained in the residual gas. This may cause size expansion of the whole fuel cells system, compared with the structure of the third embodiment having the combustion unit 23. The arrangement of the fifth embodiment, however, has the following advantages. The residual gas undergoes the shift reaction and accordingly yields hydrogen. This enhances the production efficiency of hydrogen. The residual gas subjected to the shift reaction has a low hydrogen partial pressure. This ensures the enhanced rate of reaction. The arrangement of the fifth embodiment thus significantly improves the production efficiency of hydrogen from the material.

Figure 19:
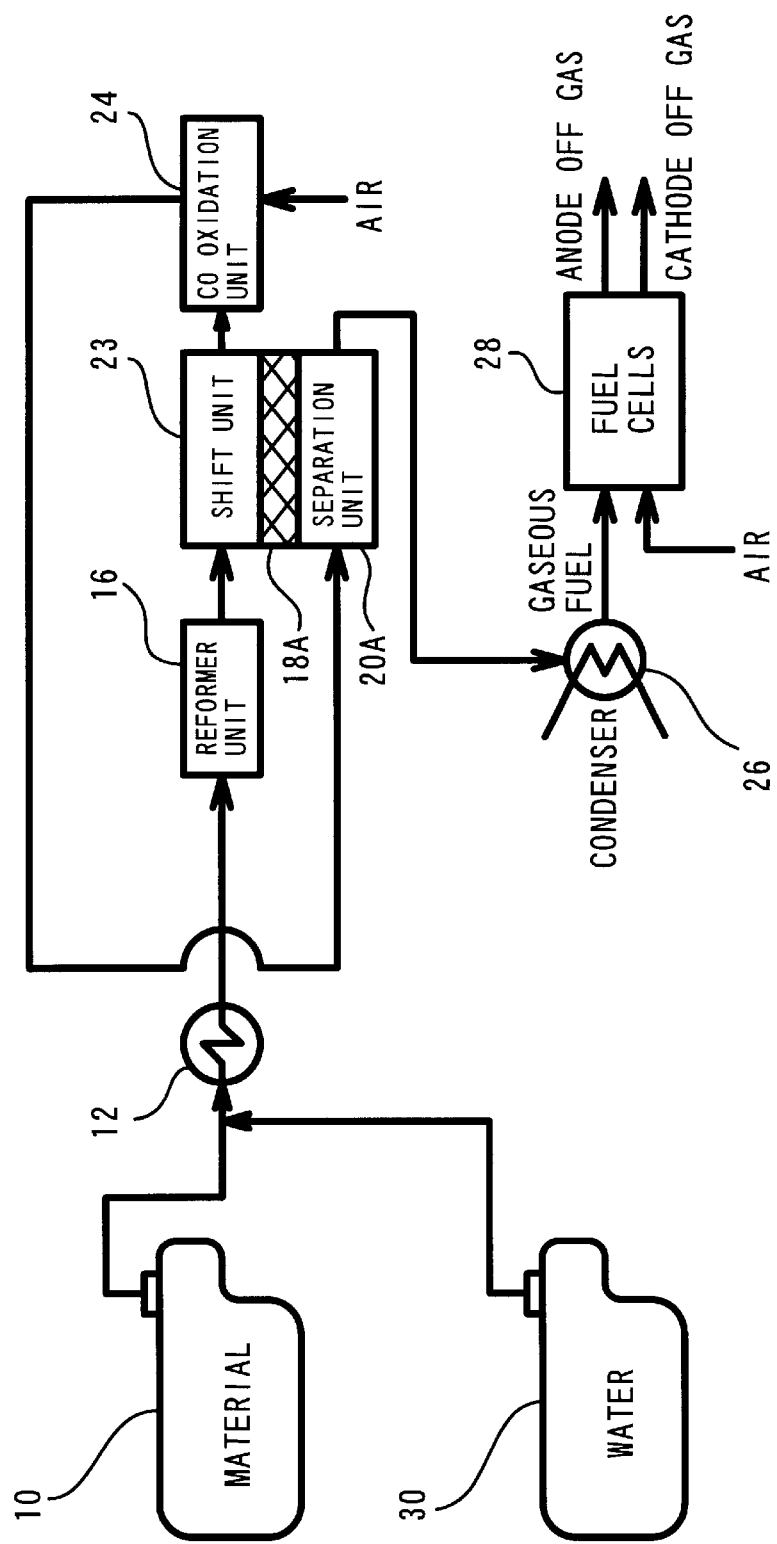
FIG. 19 schematically illustrates the structure of another fuel cells system as a modified example of the fifth embodiment.

FIG. 19 schematically illustrates the structure of another fuel cells system as a modified example of the fifth embodiment. The difference from the fifth embodiment is that the separation unit 20A is integrated not with the reformer unit 16A but with the shift unit 22A in this modified example. The functions of the hydrogen separation membrane 18A and the separation unit 20A are identical with those of the hydrogen separation membrane 18 and the separation unit 20 integrated with the reformer unit 16. In the case where gasoline is used for the material of the reforming reaction, the structure of integrating the hydrogen separation mechanism with the shift unit like this modified example is preferable. In the case where natural gas is used for the material of the reforming reaction, on the other hand, the structure of integrating the hydrogen separation mechanism with the reformer unit like the fifth embodiment is preferable. It is not necessary that the hydrogen separation mechanism is integrated with either the reformer unit or the shift unit. An independent hydrogen separation mechanism may be provided between the reformer unit and the shift unit, in place of the hydrogen separation mechanism integrated with the reformer unit. In a similar manner, an independent hydrogen separation mechanism may be provided between the shift unit and the CO oxidation unit, in place of the hydrogen separation mechanism integrated with the shift unit.

F. Sixth Embodiment

Figure 20:
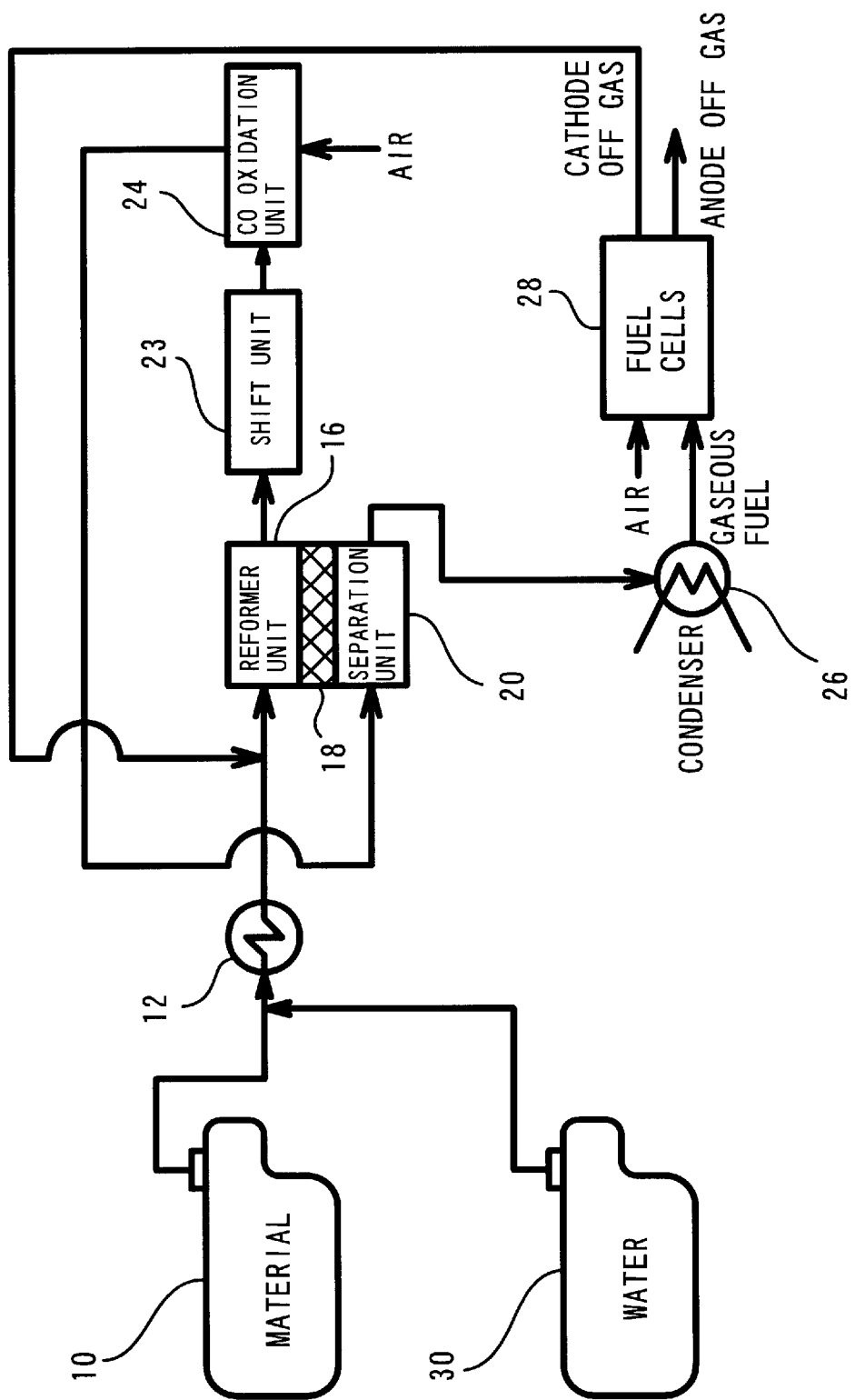
FIG. 20 schematically illustrates the structure of a fuel cells system in a sixth embodiment of the present invention.

The fifth embodiment regards the structure utilizing the residual gas discharged from the reformer unit 16 as the purge gas. In one possible modification, the off gas discharged from the fuel cells 28 may also be utilized as the purge gas. FIG. 20 schematically illustrates the structure of a fuel cells system in a sixth embodiment of the present invention. The fuel cells system of the sixth embodiment utilizes the cathode off gas discharged from the fuel cells 28 as the purge gas, in addition to the structure of the fifth embodiment. The flow of the cathode off gas is led to the upper stream side of the reformer unit 16.

The fuel cells system of the sixth embodiment has a similar structure to that of the fourth embodiment shown in FIG. 15, except that the combustion unit 23 is replaced by the shift unit 22 and the CO oxidation unit 24. The arrangement of the sixth embodiment accordingly has the advantages of the fourth embodiment as well as the advantages of the fifth embodiment.

There are some possible modifications of the fourth embodiment according to the flow side of the cathode off gas; that is, the first modified example (see FIG. 16) and the second modified example (see FIG. 17). The sixth embodiment has similar modifications. For example, the flow of the cathode off gas may be led to an intermediate position between the reformer unit 16 and the shift unit 22. This modification corresponding to the first modified example of the fourth embodiment (see FIG. 16) and accordingly has similar advantages.

Figure 21:
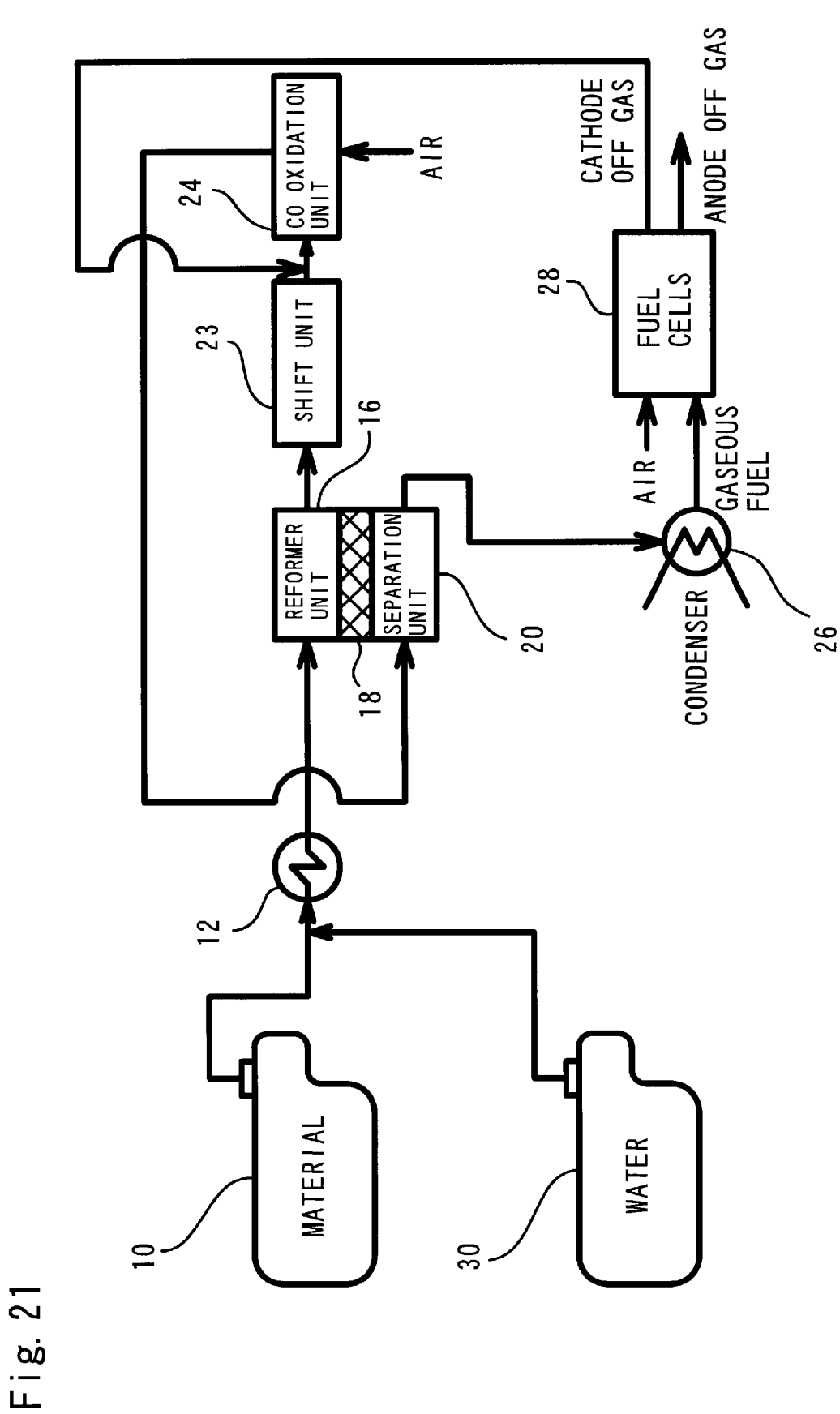
FIG. 21 schematically illustrates the structure of another fuel cells system as a first modified example of the sixth embodiment.

FIG. 21 schematically illustrates the structure of another fuel cells system as a first modified example of the sixth embodiment. In the first modified example, the flow of the cathode off gas is led to an intermediate position between the shift unit 22 and the CO oxidation unit 24. This first modified example utilizes the processed cathode off gas for the purge gas like the first modified example of the fourth embodiment and accordingly has similar advantages.

Figure 22:
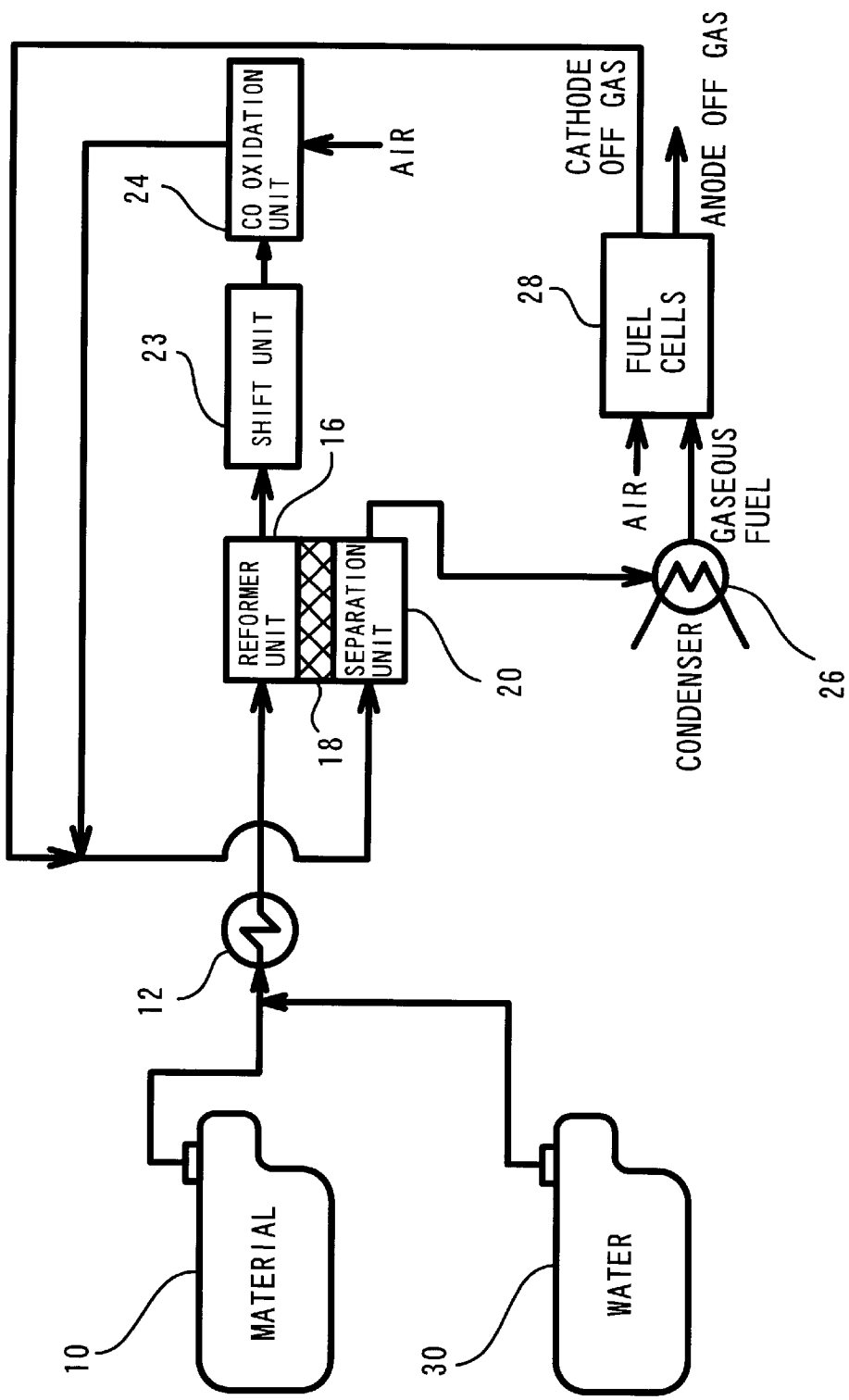
FIG. 22 schematically illustrates the structure of still another fuel cells system as a second modified example of the sixth embodiment.

FIG. 22 schematically illustrates the structure of still another fuel cells system as a second modified example of the sixth embodiment. In the second modified example, the flow of the cathode off gas is led to an intermediate position between the CO oxidation unit 24 and the separation unit 20. This second modified example corresponds to the second modified example of the fourth embodiment (see FIG. 17) and accordingly has similar advantages.

The sixth embodiment and its modified examples regard the arrangement utilizing the cathode off gas for the purge gas. As discussed in the fourth embodiment and its modified examples, another possible modification of the sixth embodiment utilizes the anode off gas for the purge gas. The use of the anode off gas in any of the sixth embodiment and its modified examples ensures the similar effects as those discussed previously. In the case where gasoline is used for the material of the reforming reaction in the sixth embodiment, it is desirable to provide a hydrogen separation mechanism integrated with the shift unit 22 or to provide an independent hydrogen separation mechanism interposed between the shift unit 22 and the CO oxidation unit 24.

G. Seventh Embodiment

Figure 23:
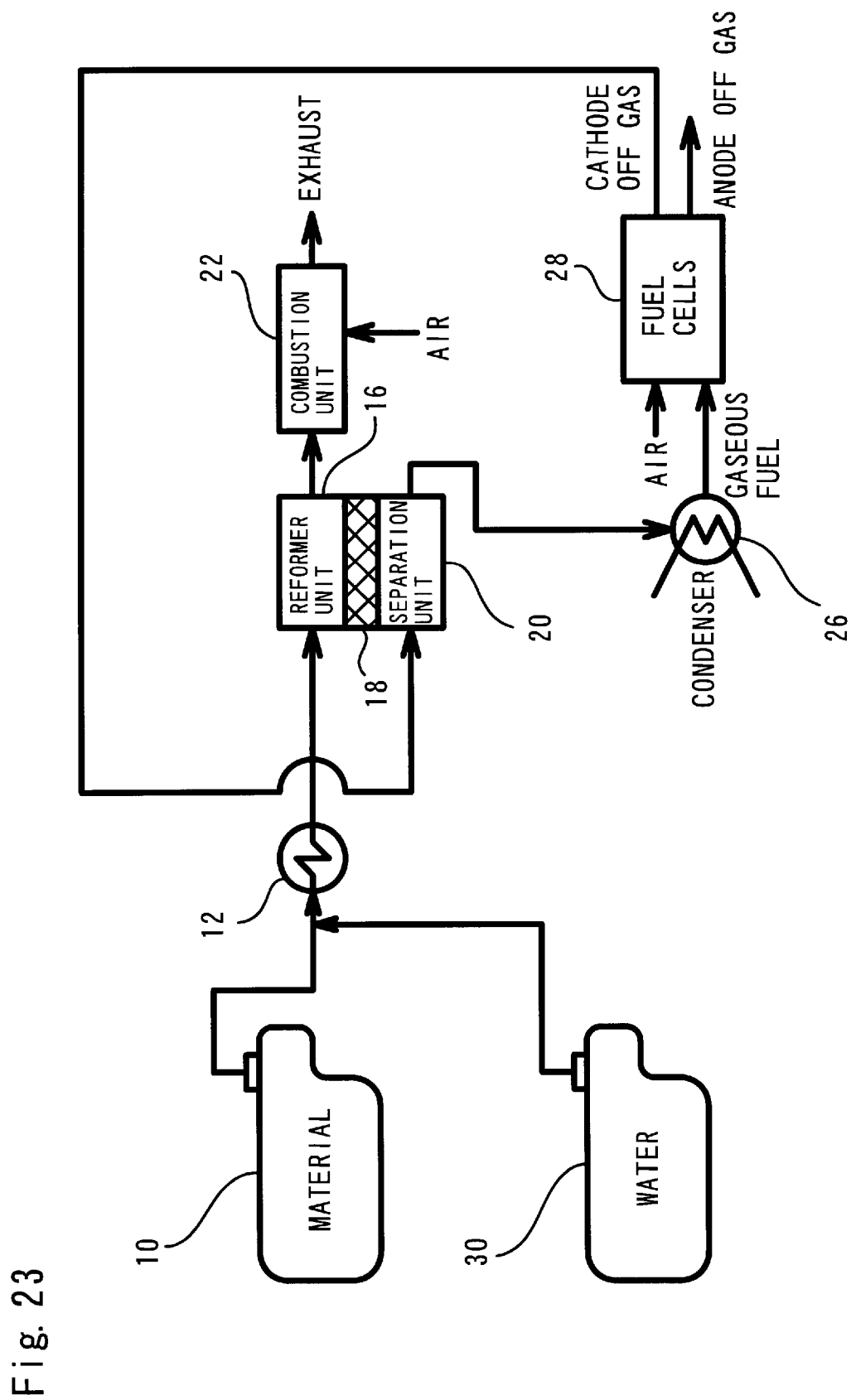
FIG. 23 schematically illustrates the structure of a fuel cells system in a seventh embodiment of the present invention.

FIG. 23 schematically illustrates the structure of a fuel cells system in a seventh embodiment of the present invention. The structure of the seventh embodiment does not utilize the residual gas for the purge gas but uses only the cathode off gas as the purge gas.

The respective constituents of the fuel cells system of the seventh embodiment are identical with those of the third embodiment and are thus not specifically described here. In the structure of the seventh embodiment, the gas output from the combustion unit 23 is not fed into the separation unit 20 but is discharged to the outside. The flow of the cathode off gas is introduced into the separation unit 20 as the purge gas.

The primary advantages of the seventh embodiment include that no special mechanism is required for producing the purge gas, that the whole fuel cells system is made relatively compact, and that the use of the purge gas enhances the efficiency of hydrogen separation.

The arrangement of the seventh embodiment has additional advantages. The cathode off gas having the low hydrogen partial pressure is suitable for the purge gas and enhances the efficiency of hydrogen extraction in the separation unit 20. The cathode off gas contains only a trace amount of oxygen, so that the reaction hardly arises with the separated hydrogen in the separation unit 20. The cathode off gas can thus be utilized as the purge gas without any additional oxidation process. Still another advantage is that the temperature of the purge gas is sufficiently close to the driving temperature of the fuel cells 28.

Figure 24:
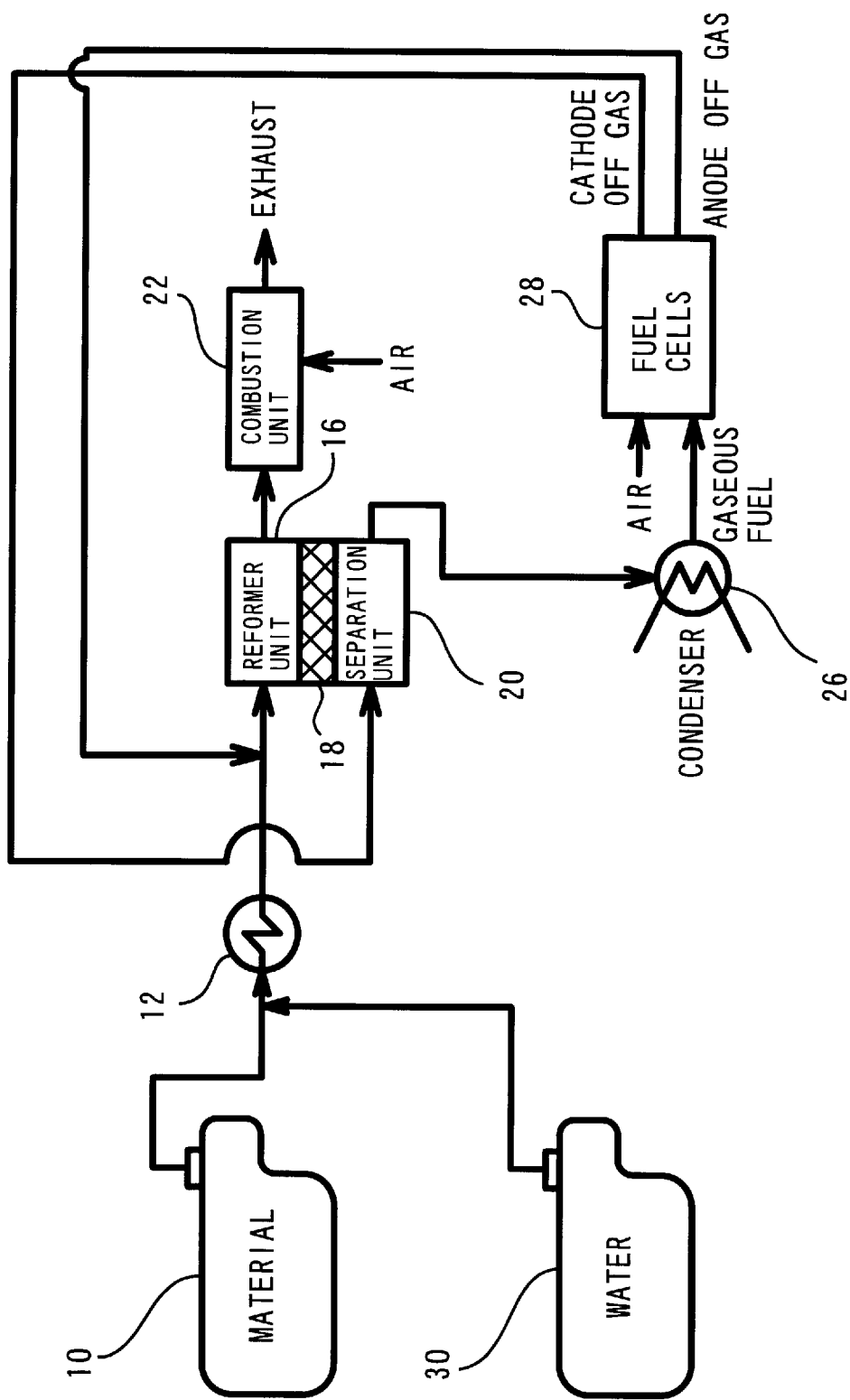
FIG. 24 schematically illustrates the structure of another fuel cells system as a first modified example of the seventh embodiment.

In the fuel cells system of the seventh embodiment, the flow of the off gas discharged from the fuel cells 28 may further be led to the upper stream side of either the reformer unit 16 or the combustion unit 23. FIG. 24 schematically illustrates the structure of another fuel cells system as a first modified example of the seventh embodiment. In the first modified example, the flow of the anode off gas is led to the upper stream side of the reformer unit 16. This arrangement enables the component of the anode off gas, for example, steam, to be subjected to the reforming reaction. This arrangement also enables the remaining hydrogen included in the anode off gas to be separated through the hydrogen separation membrane 18 and input again into the fuel cells 28 for power generation.

Figure 25:
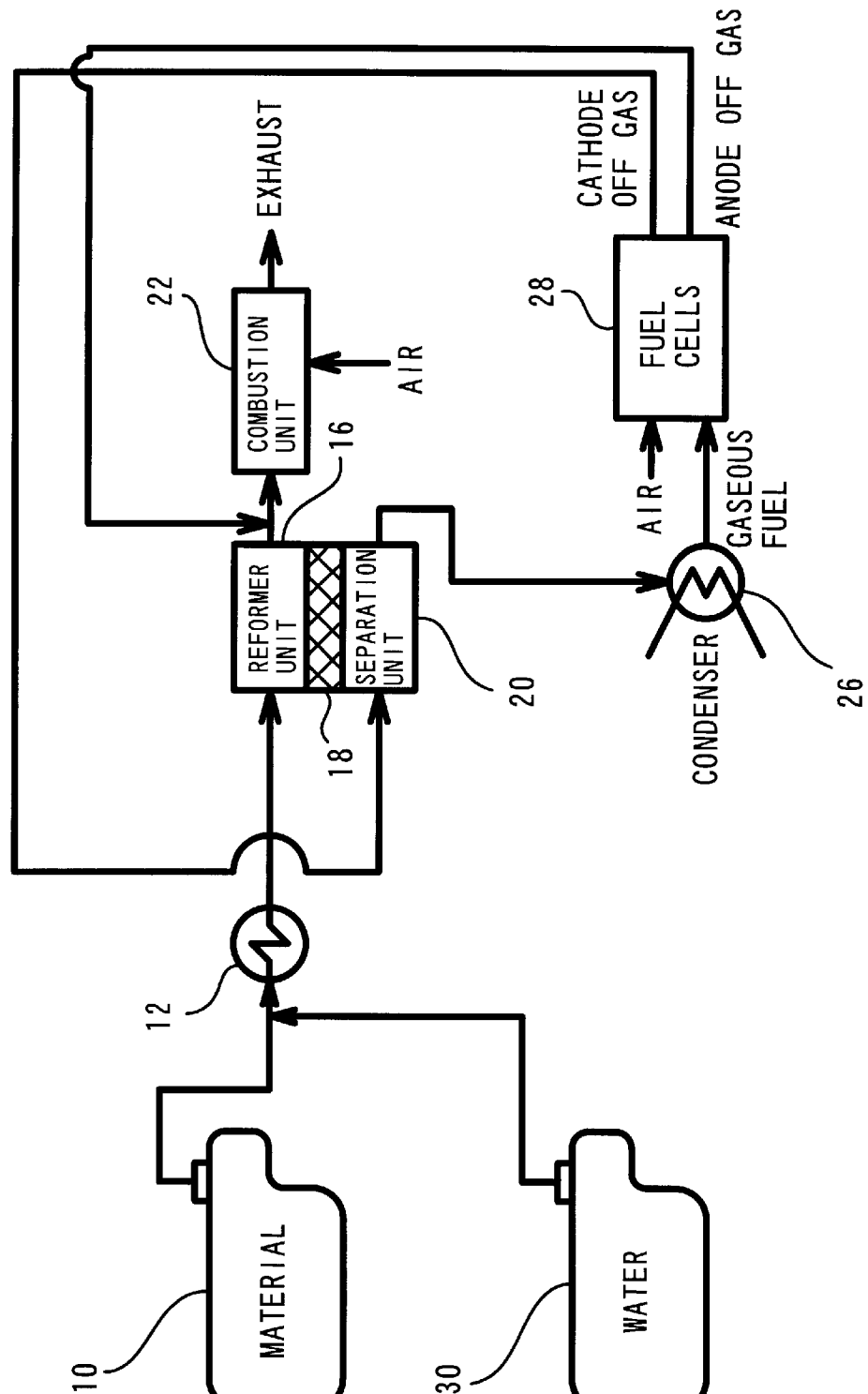
FIG. 25 schematically illustrates the structure of still another fuel cells system as a second modified example of the seventh embodiment.

FIG. 25 schematically illustrates the structure of still another fuel cells system as a second modified example of the seventh embodiment. In the second modified example, the flow of the anode off gas is led to the upper stream side of the combustion unit 23. This arrangement enables the remaining hydrogen included in the anode off gas to be discharged to the outside after the oxidation in the combustion unit 23.

The first modified example and the second modified example regard the structures of leading the flow of the anode off gas to the upper stream side of the reformer unit 16 and to the upper stream side of the combustion unit 23. Another possible modification leads the flow of the cathode off gas to the separation unit 20 as well as either to the upper stream side of the reformer unit 16 or to the upper stream side of the combustion unit 23.

H. Eighth Embodiment

Figure 26:
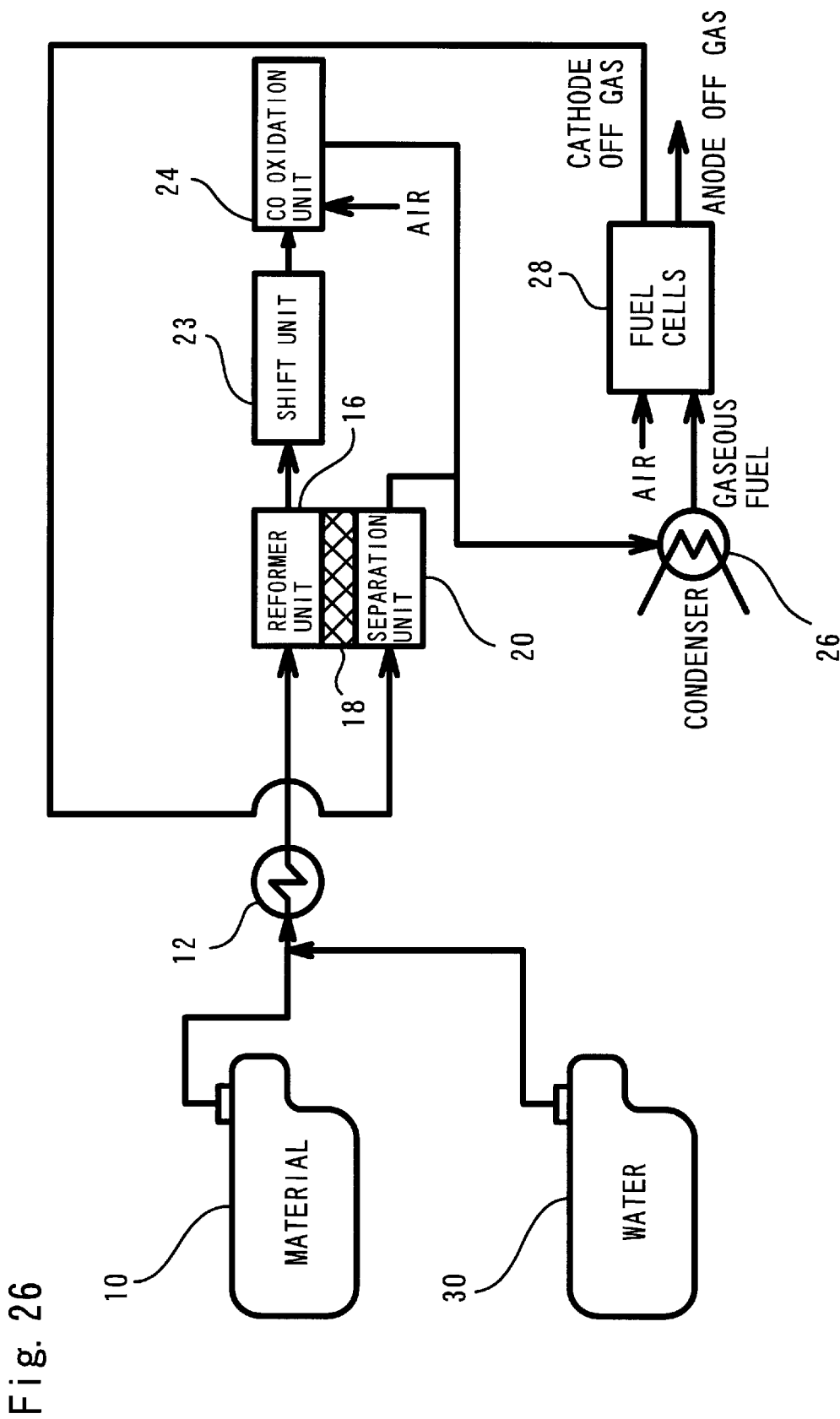
FIG. 26 schematically illustrates the structure of a fuel cells system in an eighth embodiment of the present invention.

FIG. 26 schematically illustrates the structure of a fuel cells system in an eighth embodiment of the present invention. The fuel cells system of the eighth embodiment has a similar structure to that of the seventh embodiment including the flow of the cathode off gas introduced into the separation unit 20. The difference from the seventh embodiment is that the combustion unit 23 of the seventh embodiment is replaced by the shift unit 22 and the CO oxidation unit 24 and that the flow of the resulting processed gas passing through the shift unit 22 and the CO oxidation unit 24 is supplied together with the flow of the hydrogen output from the separation unit 20 to the fuel cells 28.

The structure of the eighth embodiment utilizes the cathode off gas as the purge gas and accordingly has similar advantages to those of the seventh embodiment. The shift unit 22 and the CO oxidation unit 24 of the eighth embodiment provided in place of the combustion unit 23 exert the following advantages. The residual gas output from the reformer unit 16 undergoes the shift reaction proceeding in the shift unit 22, so as to give additional hydrogen. The residual gas is subjected to the shift reaction after separation of hydrogen produced in the reformer unit 16 and accordingly has a low hydrogen partial pressure. This ensures the extremely high rate of reaction. The hydrogen produced by the shift reaction is joined with the flow of the hydrogen output from the separation unit 20. This arrangement thus enhances the production efficiency of hydrogen from the material.

Figure 27:
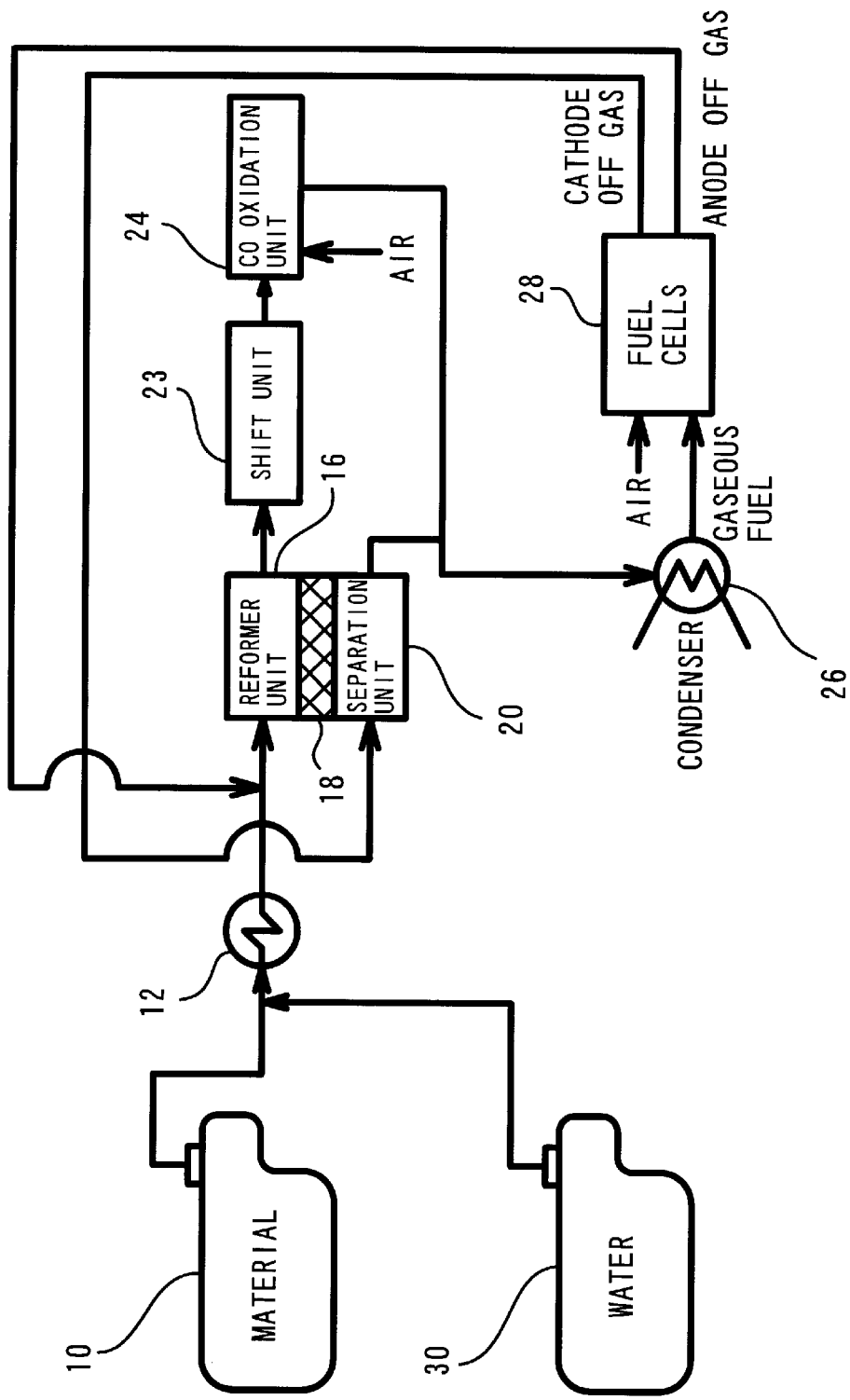
FIG. 27 schematically illustrates the structure of another fuel cells system as a first modified example of the eighth embodiment.

The eighth embodiment has some possible modifications where the off gas discharged from the fuel cells 28 is flown to a variety of sides. FIG. 27 schematically illustrates the structure of another fuel cells system as a first modified example of the eighth embodiment. In the first modified example, the flow of the anode off gas is led to the upper stream side of the reformer unit 16. This arrangement advantageously makes the component of the anode off gas subjected to the reforming reaction and enables the remaining hydrogen included in the anode off gas to be input again into the fuel cells 28 for power generation.

Figure 28:
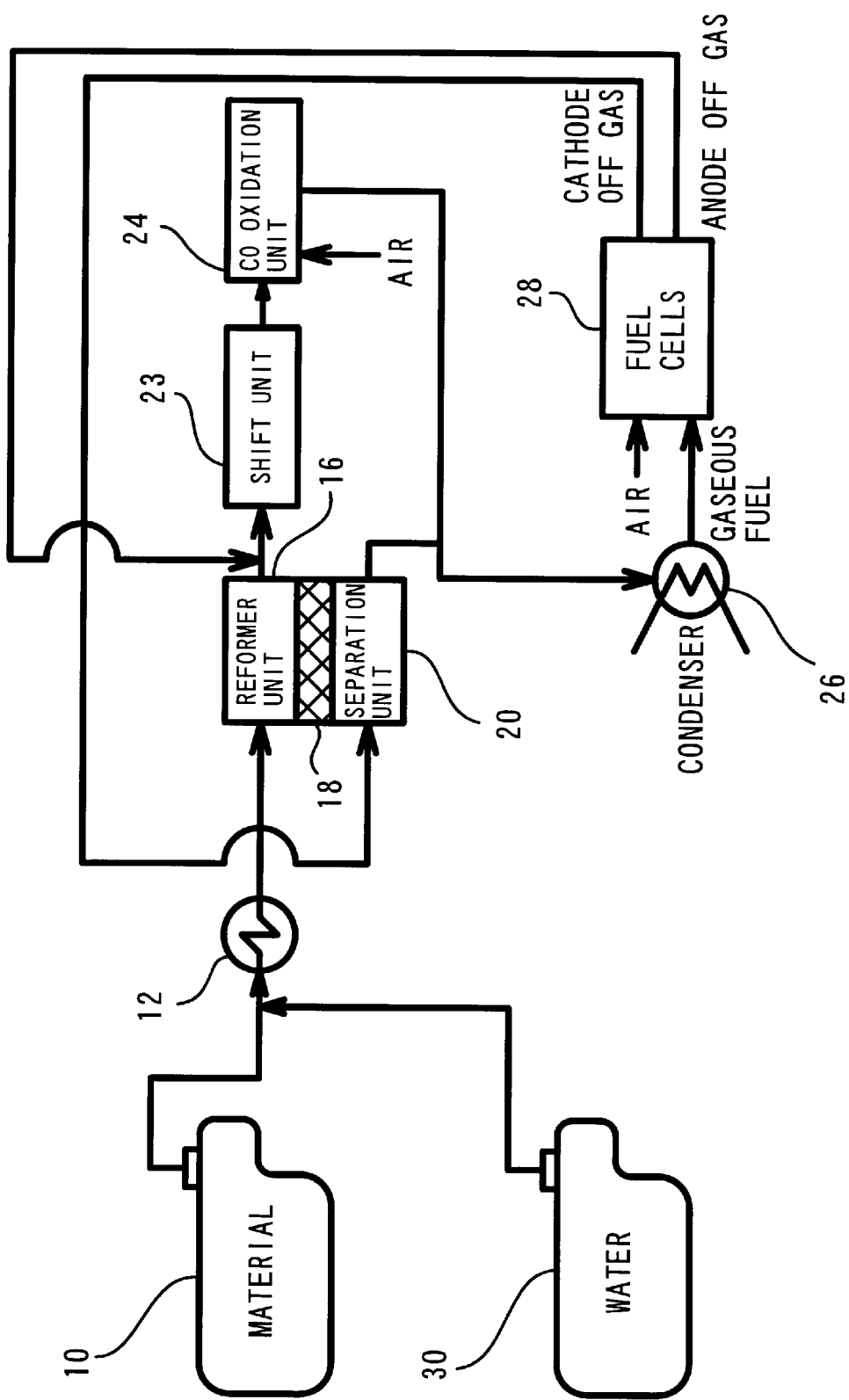
FIG. 28 schematically illustrates the structure of still another fuel cells system as a second modified example of the eighth embodiment.

FIG. 28 schematically illustrates the structure of still another fuel cells system as a second modified example of the eighth embodiment. In the third modified example, the flow of the anode off gas is led to an intermediate position between the reformer unit 16 and the shift unit 22. This arrangement advantageously makes the component of the anode off gas, for example, steam, subjected to the shift reaction. The resulting gas after the shift reaction is supplied to the fuel cells 28. This arrangement thus enables the remaining hydrogen included in the anode off gas to be input again into the fuel cells 28 for power generation.

Figure 29:
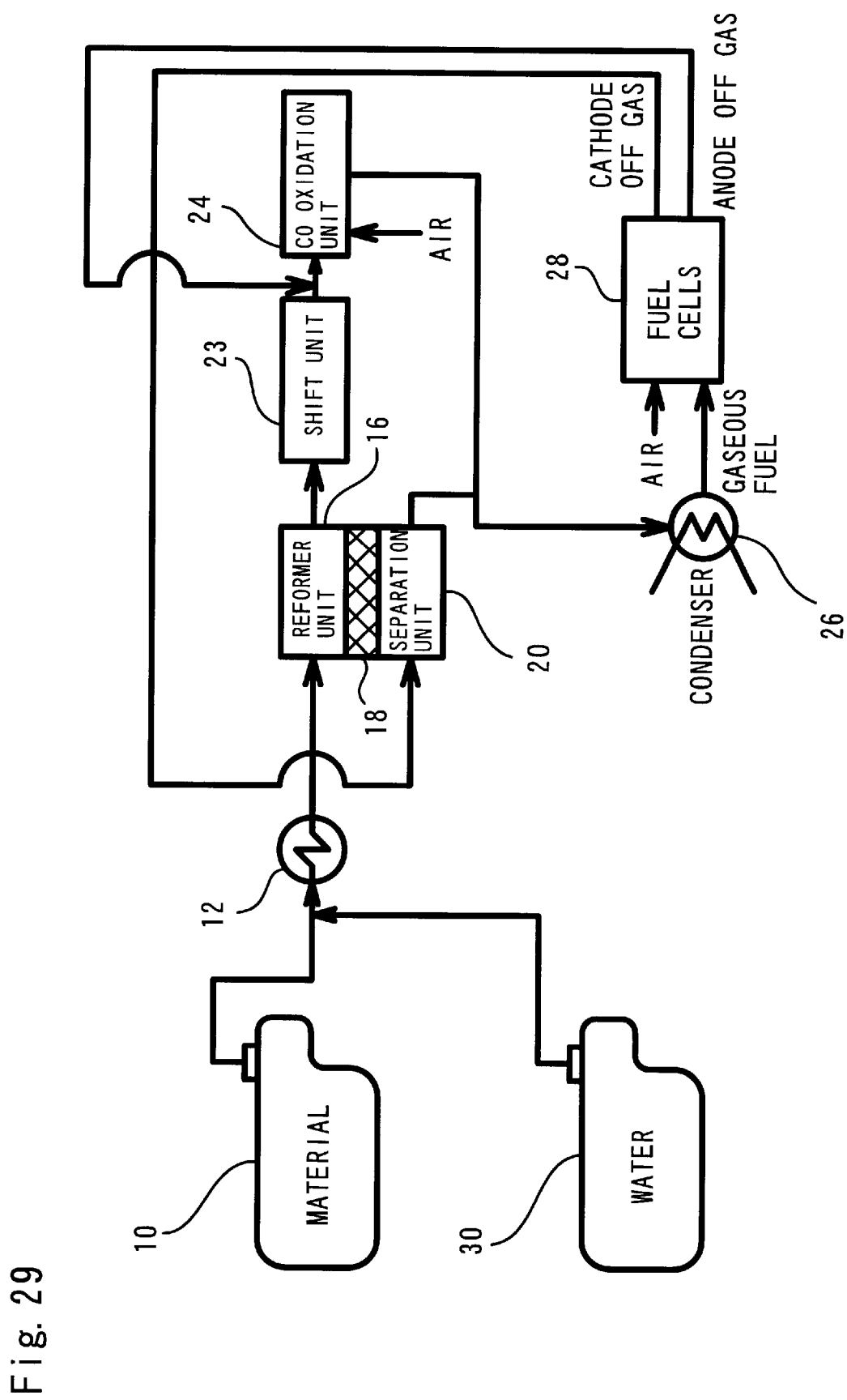
FIG. 29 schematically illustrates the structure of another fuel cells system as a third modified example of the eighth embodiment.
Figure 30:
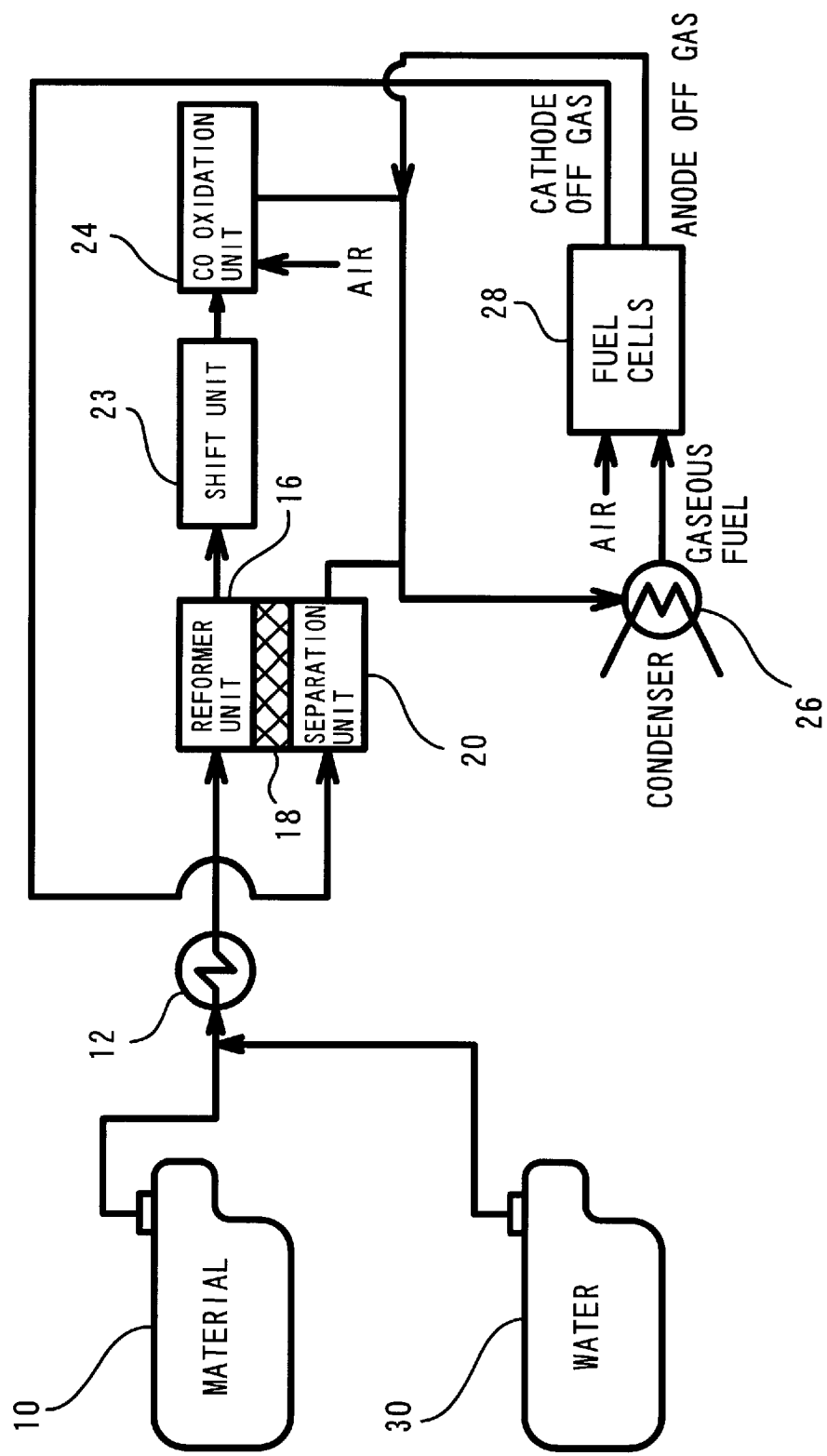
FIG. 30 schematically illustrates the structure of still another fuel cells system as a fourth modified example of the eighth embodiment.

FIG. 29 schematically illustrates the structure of another fuel cells system as a third modified example of the eighth embodiment. In the third modified example, the flow of the anode off gas is led to an intermediate position between the shift unit 22 and the CO oxidation unit 24. FIG. 30 schematically illustrates the structure of still another fuel cells system as a fourth modified example of the eighth embodiment. In the fourth modified example, the flow of the anode off gas is led to the lower stream side of the CO oxidation unit 24. Substantially no components of the anode off gas are effectively utilized in the reaction of CO oxidation. The third and the fourth modified examples do not make the effective use of the components of the anode off gas for any reactions, but advantageously enable the anode off gas to be input again to the fuel cells 28 without interfering with the reactions proceeding in the reformer unit 16 and the shift unit 22. The anode off gas includes the remaining hydrogen. The flow of the anode off gas into the reformer unit 16 and the shift unit 22 lower the rates of the reforming reaction and the shift reaction. In the structures of the third modified example and the fourth modified example, the flow of the anode off gas does not pass through the reformer unit 16 or the shift unit 22, so that the remaining hydrogen does not interfere with the progress of the reforming reaction and the shift reaction.

The first through the fourth modified examples regard the structures of leading the flow of the anode off gas to the various sides. Another possible modification leads the flow of the cathode off gas to the separation unit 20 as well as any one of the various sides discussed above. In the structure of the eighth embodiment, in the case where gasoline is used for the material of the reforming reaction, it is desirable to provide a hydrogen separation mechanism integrated with the shift unit 22 or to provide an independent hydrogen separation mechanism interposed between the shift unit 22 and the CO oxidation unit 24.

I. Ninth Embodiment

In the fuel gas production systems of the respective embodiments discussed above, the production efficiency of the fuel gas as well as the driving efficiency and the response of the fuel cells are improved by regulating the flow rate of the purge gas. A ninth embodiment of the present invention regards the structure of regulating the flow rate of the purge gas.

Figure 31:
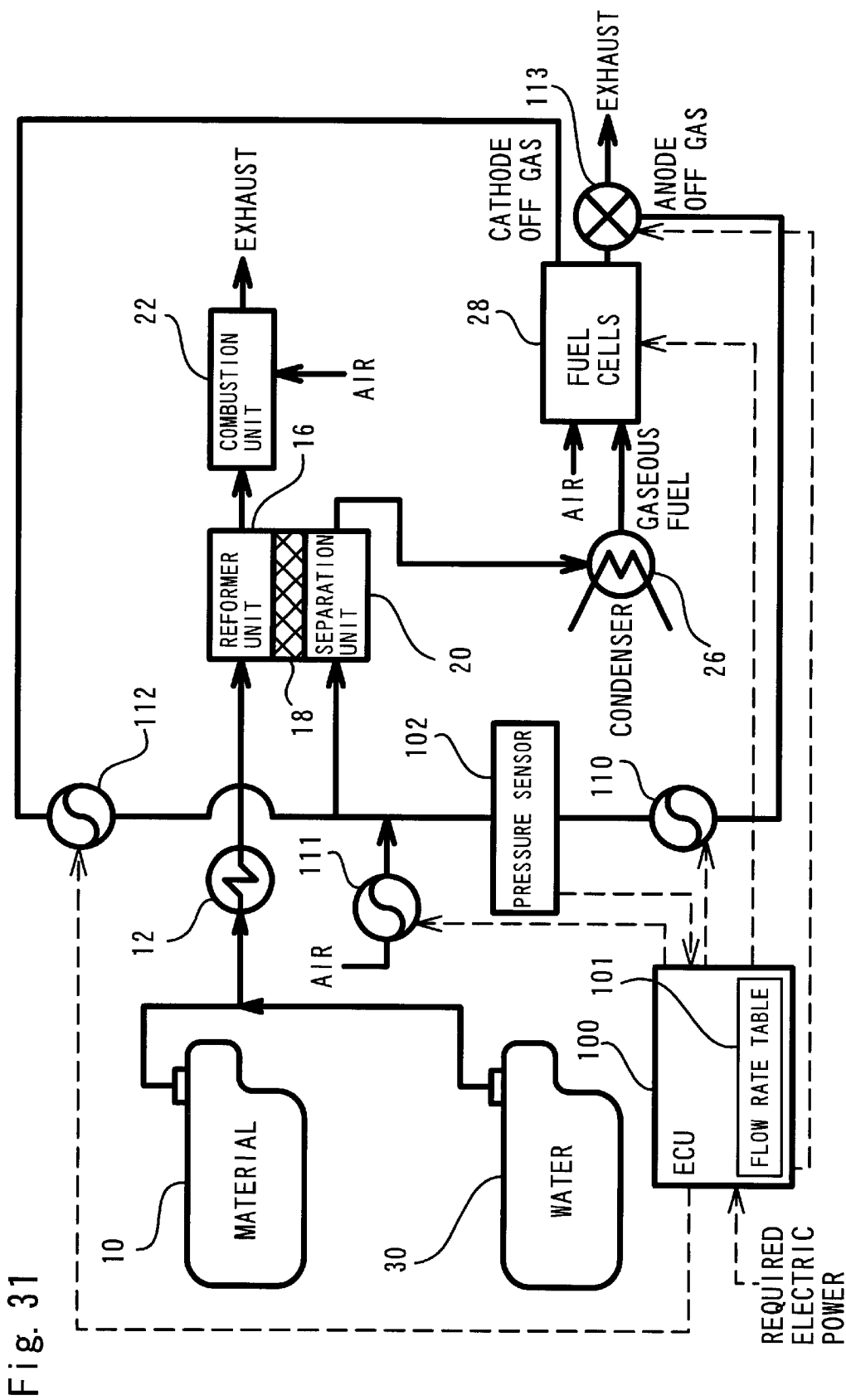
FIG. 31 schematically illustrates the structure of a fuel cells system in a ninth embodiment of the present invention.

FIG. 31 schematically illustrates the structure of a fuel cells system in the ninth embodiment. The fuel cells system of the ninth embodiment has a similar structure to that of the seventh embodiment, except some differences discussed below. In the structure of the ninth embodiment, a flow conduit is provided to lead the flow of the anode off gas from the outlet of the anodes in the fuel cells 28 to the separation unit 20, in order to use the anode off gas for the purge gas. Another flow conduit is provided to introduce the air into the separation unit 20 as part of the purge gas.

The structure of the ninth embodiment further has the following constituents to regulate the flow rate of the purge gas. Pumps 110, 111, and 112 functioning as a flow rate regulation mechanism are disposed in the respective flow conduits to individually regulate the flow rates of the anode off gas, the air, and the cathode off gas, all of which are used as the purge gas. A changeover valve 13 is also provided in the flow conduit of the anode off gas to change over the working flow between the circulation to the separation unit 20 and the discharge to the outside. The flow rate of the purge gas is controlled by an ECU 100. The ECU 100 is a microcomputer including a CPU, a ROM, and a RAM. The value of a pressure sensor 102 and a required electric power are input into the ECU 100 as pieces of information required for regulation of the flow rate. The pressure sensor 102 measures the flow rate of the anode off gas in the form of the pressure. As described later, the structure of the ninth embodiment mainly uses the anode off gas for the purge gas and thus disposes the pressure sensor 102 at the illustrated side. The side of the pressure sensor may be varied according to the main component of the purge gas; for example, in the vicinity of the inlet of the separation unit 20, in the middle of the flow conduit of the cathode off gas, and in the middle of the flow conduit of the air. The ECU 100 refers to a flow rate table 101 and controls the operations of the fuel cells 28, the pumps 110, 111, and 112, and the changeover valve 113 to regulate the flow rate of the purge gas according to the observed value of the pressure sensor 102 and the required electric power. The ECU 100 also controls the operations of the other constituents including the reformer unit 16 and the combustion unit 23. The illustration of FIG. 31 only regards the part closely relating to the regulation of the flow rate of the purge gas.

The flow rate of the purge gas is regulated according to the following concept. The structure of the ninth embodiment regulates the flow rate of the anode off gas to a preset optimum value according to the required electric power for the fuel cells 28. With an abrupt increase in required electric power, the flow rate of the anode off gas is temporarily raised to be greater than the optimum value for the enhanced response. In the case where the fuel cells 28 have not yet been warmed up, the flow of the air is introduced into the purge gas to assist the warm-up operation. In the case where the flow of the anode off gas is not sufficient for a desired flow rate, the flow of the cathode off gas is introduced into the purge gas.

Figure 32:
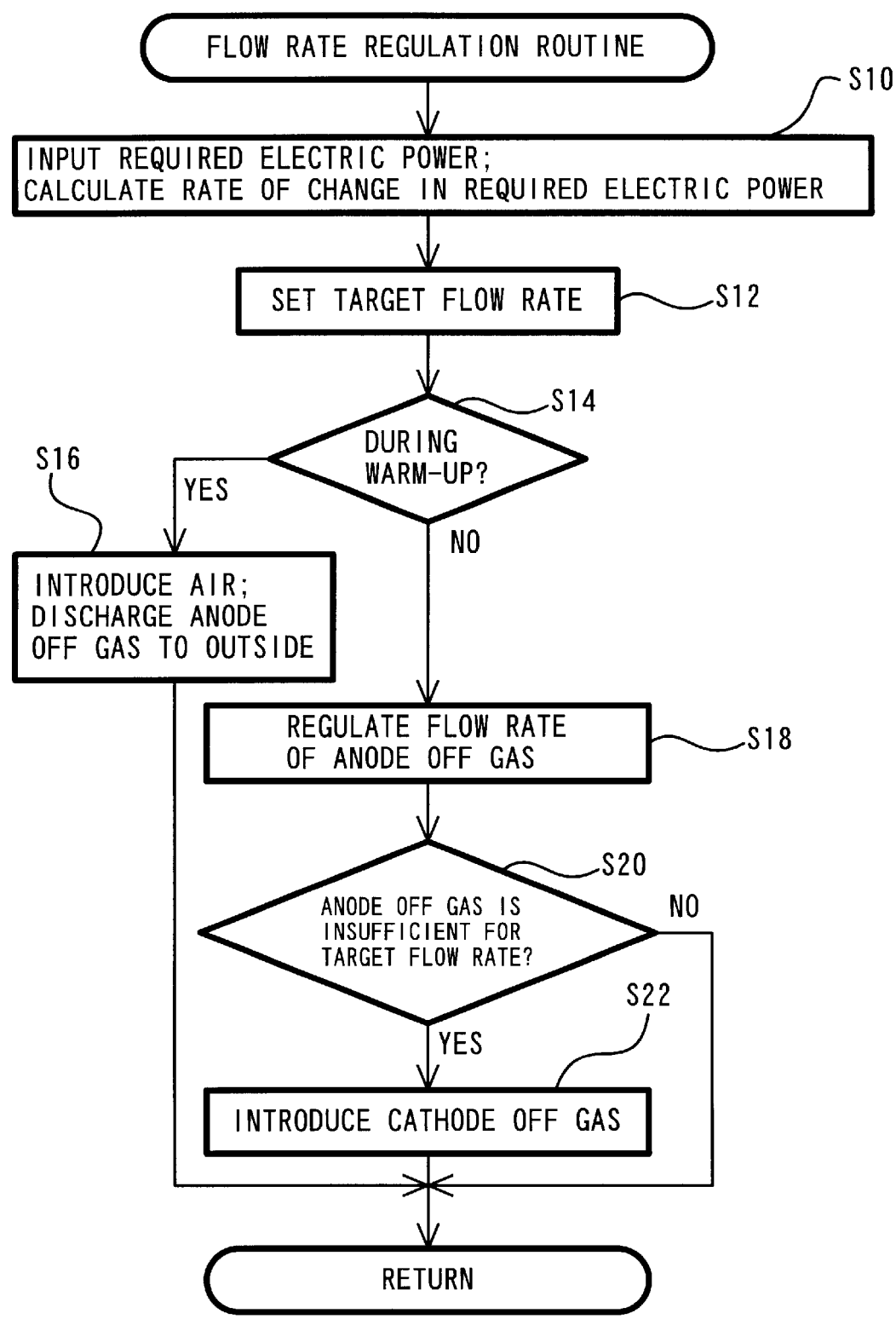
FIG. 32 is a flowchart showing a flow rate regulation routine executed in the ninth embodiment.

The series of processing discussed below is executed in the ninth embodiment to regulate the flow rate of the purge gas. FIG. 32 is a flowchart showing a flow rate regulation routine, which is repeatedly executed by the EC 100 with other series of control processing. When the program enters the flow rate regulation routine, the ECU 100 first receives the required electric power for the fuel cells 28 and calculates the rate of change of the required electric power at step S10. The ECU 100 then sets a target flow rate of the purge gas based on the required electric power and the calculated rate of change at step S12. The target flow rate is read from a map provided in advance.

Figure 33A:
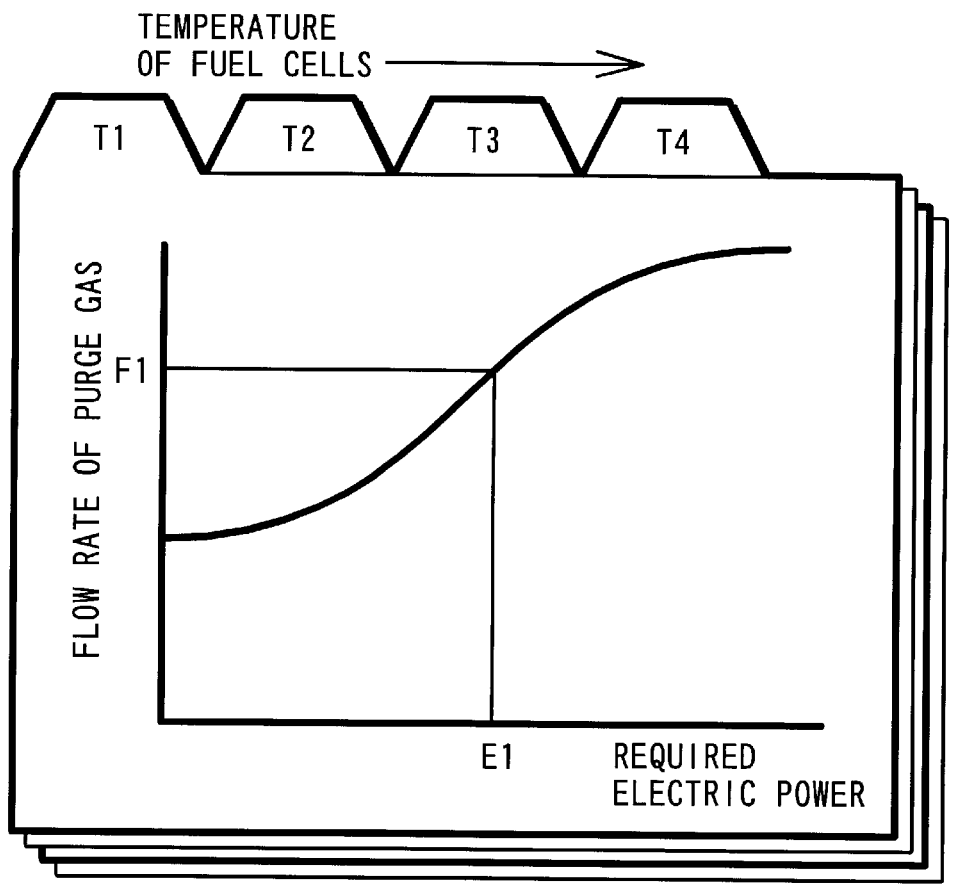
FIGS. 33A and 33B show maps used to specify a target flow rate.
Figure 33B:
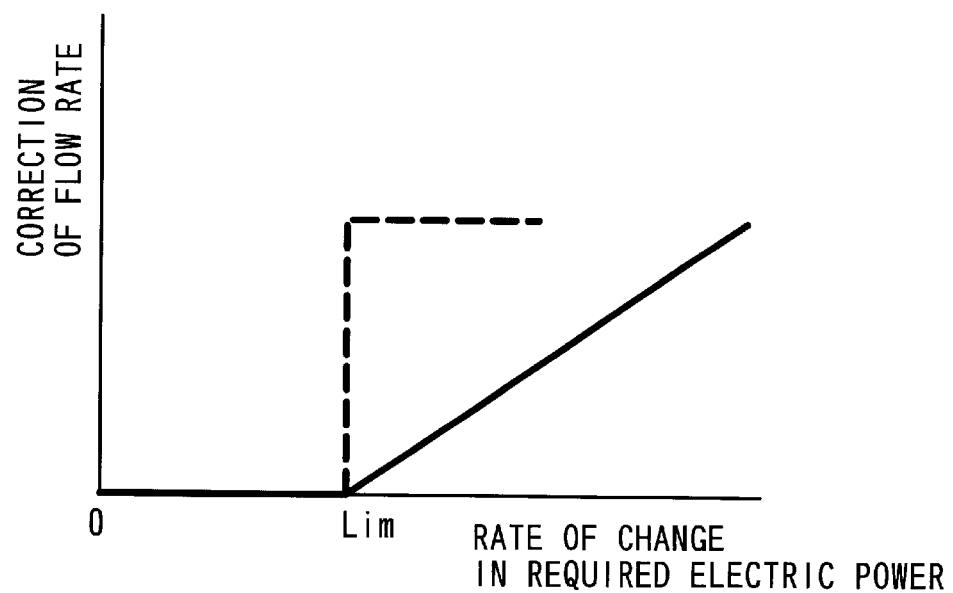

FIGS. 33A and 33B show maps used to specify the target flow rate. The map of FIG. 33 gives the flow rate of the purge gas according to the required electric power. For example, a value F1 is set to the target flow rate of the purge gas against a required electric power E1. The method of setting the target value will be discussed later. The target flow rate of the purge gas is affected by the driving conditions of the fuel cells 28. In the ninth embodiment, separate maps are provided with regard to respective temperatures of the fuel cells 28. Consideration may also be given to other parameters affecting the target flow rate of the purge gas. One possible modification uses a single map regardless of such parameters. Another possible modification stores the relationship between the required electric power and the target flow rate in the form of a function.

The procedure of this embodiment refers to the table of FIG. 33A to read the flow rate of the purge gas against the required electric power and subsequently corrects the flow rate according to the rate of change in required electric power to determine the final target flow rate of the purge gas. FIG. 33B is a map showing the correction of the target flow rate against the rate of change in required electric power. As shown in the map of FIG. 33B, a positive correction of the flow rate is set in the case of an abrupt increase in required electric power, that is, when the rate of change in required electric power exceeds a critical value Lim. The final target flow rate of the purge gas is set by adding the correction of the flow rate set in this manner to the flow rate read from the map of FIG. 33A. The procedure of this embodiment increases the correction of the flow rate with an increase in rate of change of the required electric power as shown by the solid line. A modified procedure may vary the correction of the flow rate in a discontinuous manner as shown by the broken line or may set a fixed correction of the flow rate regardless of the variation in rate of change of the required electric power. The correction of the flow rate may be given as a coefficient by which the flow rate read from the map of FIG. 33A is multiplied.

Figure 34:
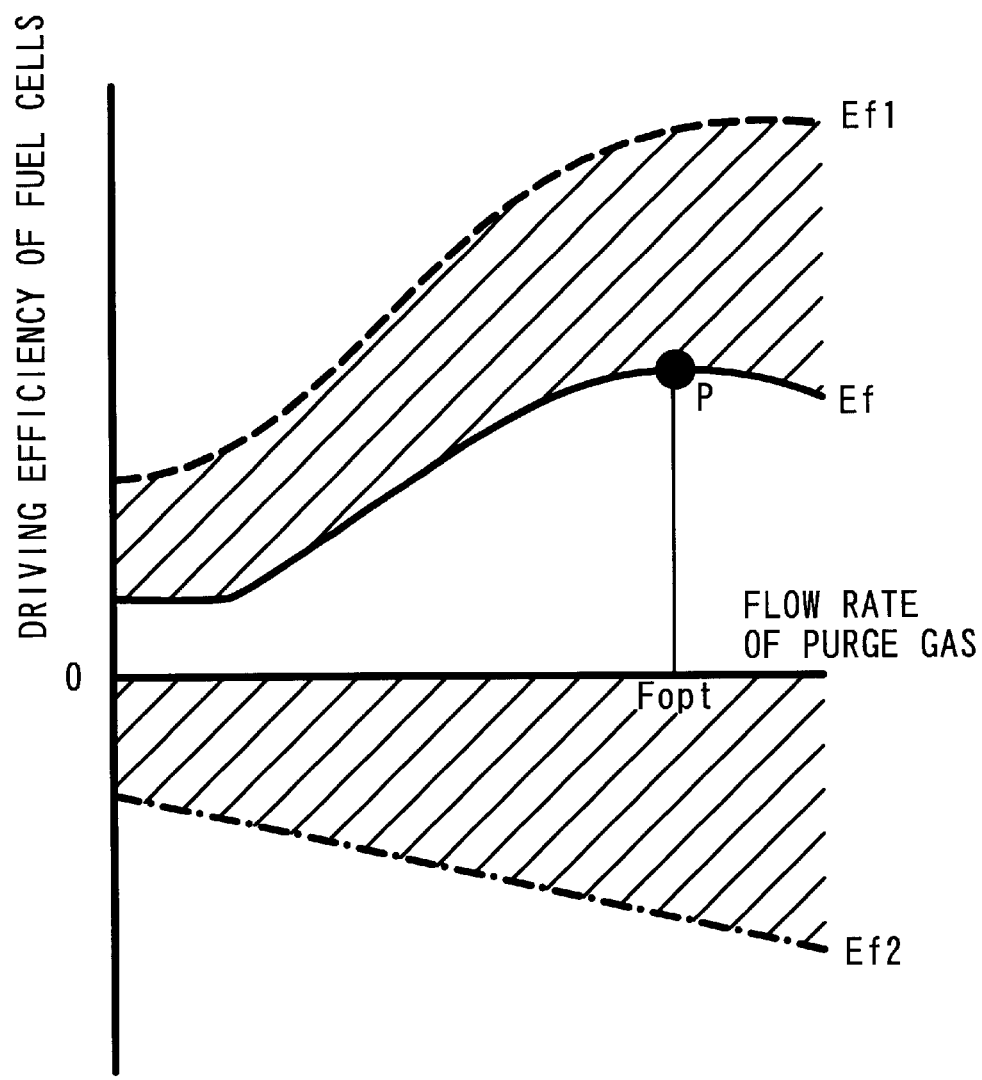
FIG. 34 shows a method of setting the target flow rate.

The following describes the method of setting the target flow rate of the purge gas corresponding to the required electric power (FIG. 33A). FIG. 34 shows a method of setting the target flow rate. The graph of FIG. 34 shows the relationship between the flow rate of the purge gas and the driving efficiency of the fuel cells. An increase in flow rate of the purge gas results in enhancing the separation efficiency of hydrogen in the separation unit 20. This enables the efficient supply of hydrogen to the fuel cells 28, so as to enhance the driving efficiency of the fuel cells 28. A curve Ef1 shown in FIG. 34 represents an enhanced driving efficiency due to such functions with regard to a specific required electric power. Under the condition of the increased flow rate of the purge gas, the greater power is required to drive the pumps 110, 111, and 112. This results in lowering the driving efficiency of the fuel cells 28. A curve Ef2 represents the loss due to the flow of the purge gas. These curves Ef1 and Ef2 are obtained by experiments or by analyses.

The actual driving efficiency of the fuel cells 28 is obtained by subtracting the loss due to the flow of the purge gas (the curve Ef2) from the enhanced driving efficiency due to the increased flow rate of the purge gas (the curve Ef1) and is given as a curve Ef. The hatched area represents the loss due to the flow of the purge gas. The flow rate of the purge gas has an optimum value that maximizes the driving efficiency of the fuel cells 28. In the example of FIG. 34, a point P represents the optimum point, and a corresponding flow rate Fopt is an optimum flow rate of the purge gas. The maps of FIG. 33A set the optimum value corresponding to each required electric power as the target flow rate, based on this idea. In this typical example shown in FIG. 34, the curve of the actual driving efficiency Ef has the maximum. The curve of the actual driving efficiency Ef may, however, increase or decrease monotonously according to the structure of the fuel cells 28 and the required electric power. In such cases, the target flow rate is set to attain the highest possible driving efficiency by taking into account the restrictions on the operations of the fuel cells 28 and the upper limit of the flow rate of the purge gas.

Referring back to the flowchart of FIG. 32, the description continues on the procedure of regulating the flow rate. After setting the target flow rate at step S12, the ECU 100 determines whether or not the fuel cells 28 are being warmed up at step S14. In the course of the warm-up operation, the pump 112 is driven to introduce the air into the flow of the purge gas at step S16. When the fuel cells 28 have already been warmed up, on the other hand, no air is introduced into the flow of the purge gas. Introduction of the air into the purge gas causes oxygen included in the air to be added to the flow of the purge gas. Oxygen introduced into the purge gas reacts with hydrogen present in the flow path of the fuel gas and generates heat. The heat accelerates the warm-up of the fuel cells 28. In this state, substantially no hydrogen remains in the anode off gas. Circulation of the anode off gas to the separation unit 20 accordingly does not lead to the effective use of hydrogen. The ECU 100 thus controls the changeover valve 113 to discharge the anode off gas to the outside at step S16. The flow of the anode off gas may alternatively be circulated to the separation unit 20.

The ECU 100 subsequently regulates the flow rate of the anode off gas at step S18. As mentioned previously, the structure of this embodiment mainly uses the flow of the anode off gas as the purge gas. The ECU 100 accordingly controls the pump 110 to regulate the flow rate of the anode off gas to attain the target flow rate set at step S12. This regulation is carried out by a known technique of feedback control, such as proportional control. A concrete procedure controls the driving state of the pump 110 to attain a pressure level measured by the pressure sensor 102 corresponding to the target flow rate.

When the target flow rate is attained by regulating the flow rate of the anode off gas at step S20, the ECU 100 exits from the flow rate regulation routine. When the regulated flow rate of the anode off gas is not sufficient for the target flow rate, on the other hand, the ECU 100 drives the pump 111 to introduce the cathode off gas into the purge gas at step S22. The ECU 100 repeatedly carries out the above series of the processing to regulate the flow rate of the purge gas.

Figure 35:
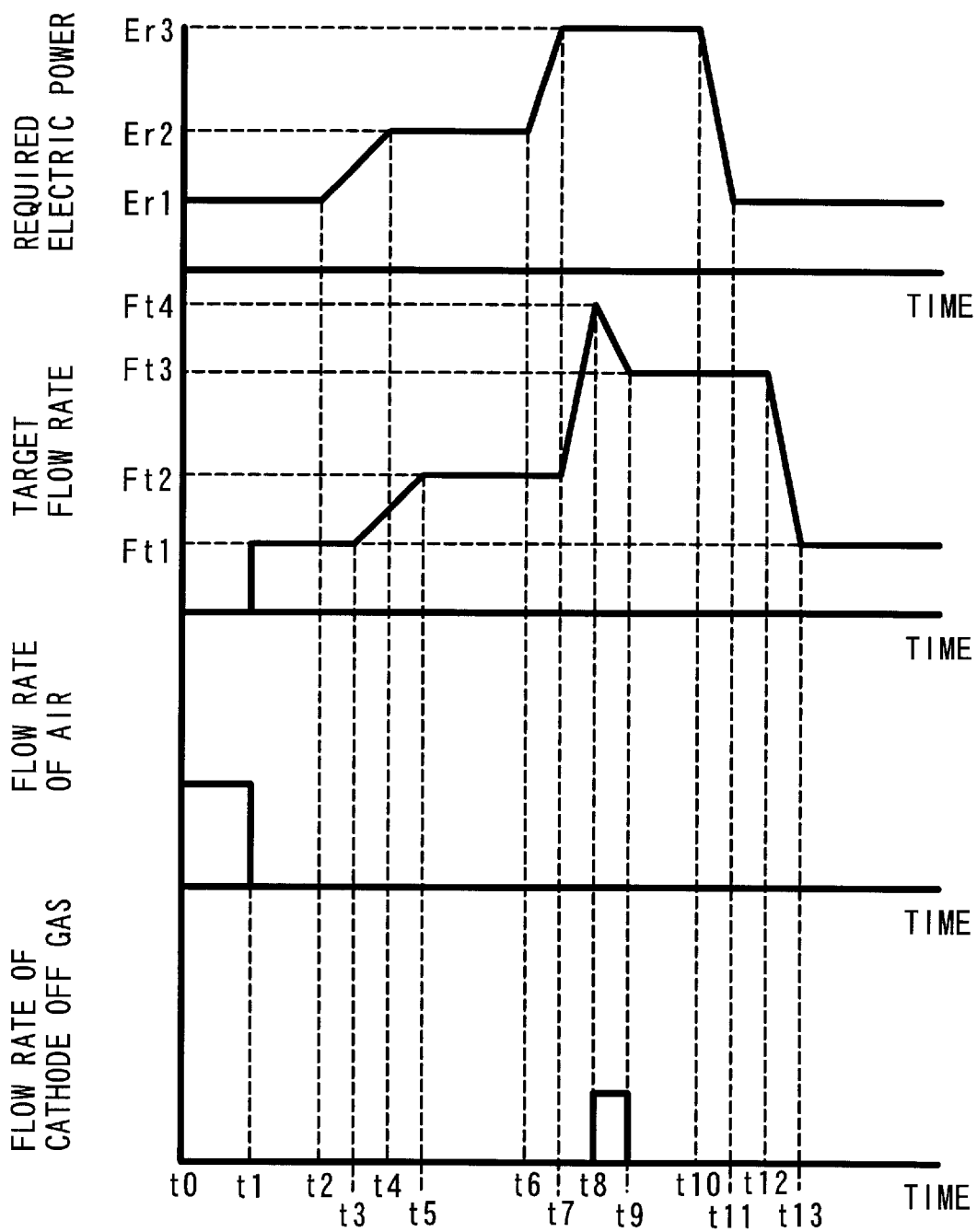
FIG. 35 shows a process of flow rate regulation carried out in the ninth embodiment.
Figure 36:
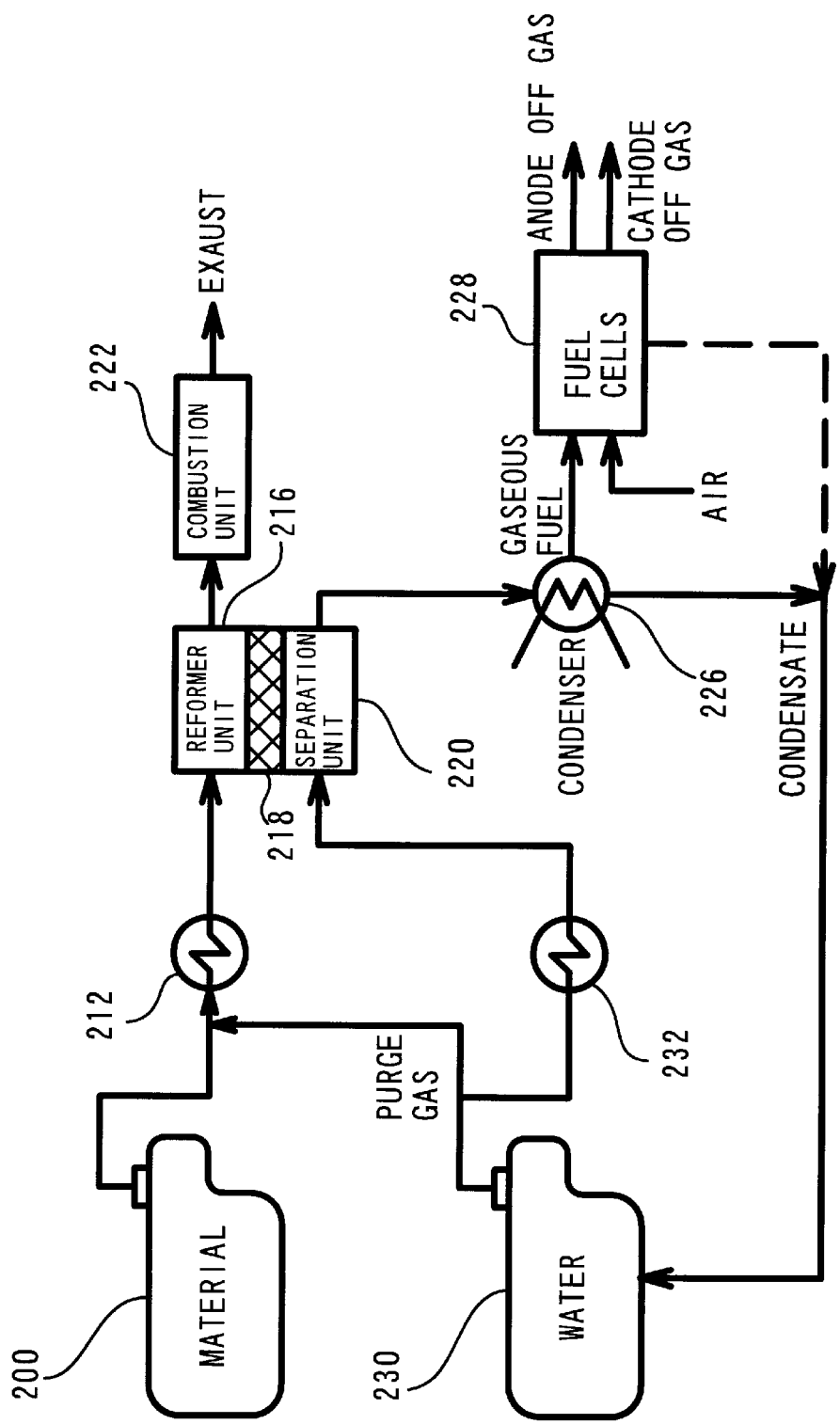
FIG. 36 schematically illustrates the structure of a prior art fuel cells system.
Figure 37:
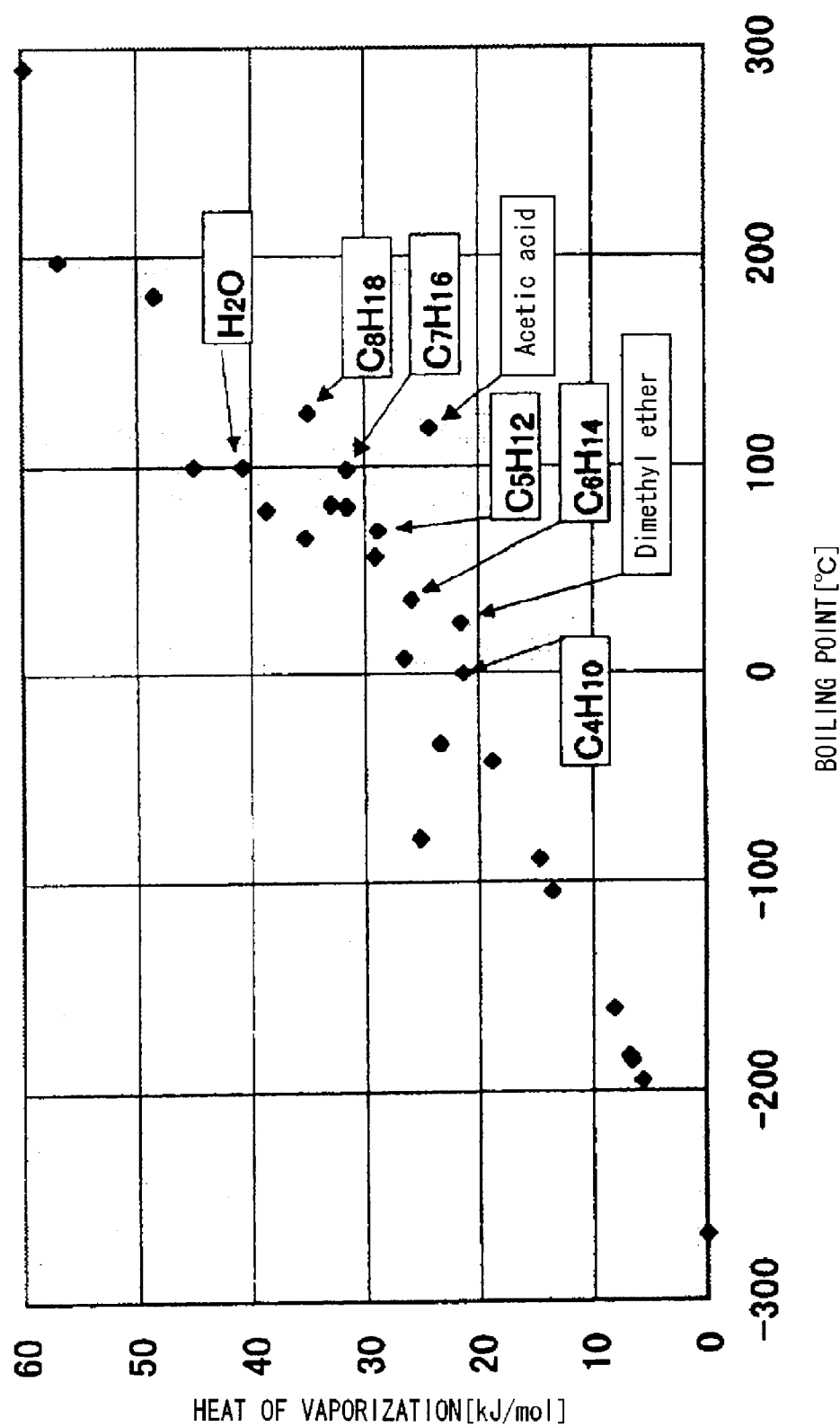
FIG. 37 is a graph showing the relationship between the heat of vaporization and the boiling point.

FIG. 35 shows the process of flow rate regulation executed in the ninth embodiment. The graph of FIG. 35 shows time variations of the required electric power, the target flow rate, the flow rate of the air, and the flow rate of the cathode off gas. In this example, the required electric power is Er1 in a time period between time points t0 and t2, Er2 in a time period between time points t4 and t6, Er3 in a time period between time points t7 and t10, and again Er1 after a time pint t11. It is here assumed that the rate of change of the required electric power is sufficiently smaller than the critical value Lim shown in FIG. 33B in the time period between the time points t2 and t4 and significantly greater than the critical value Lim in the time period between the time points t6 and t7. The fuel cells 28 have not yet been warmed up in the time period between the time points t0 and t1.

The flow rate regulation process shown in the flowchart of FIG. 32 varies the target flow rate, the flow rate of the air, and the flow rate of the cathode off gas in the following manner with the variation in required electric power. In the time period between the time points t0 and t1, the fuel cells 28 have not yet been warmed up, so that the air is introduced into the flow of the purge gas (step S16 in FIG. 32). After the time pint t1 when the warm-up of the fuel cells 28 has been completed, no air is introduced into the flow of the purge gas. During the warm-up operation of the fuel cells 28, the target flow rate of the anode off gas is not set. At the time point t1 when the warm-up of the fuel cells 28 has been completed, the process stops the introduction of the air and sets the target flow rate of the purge gas. At this moment, a flow rate Ft1 corresponding to a required electric power Er1 is set as the target value, based on the maps of FIG. 33A. The target flow rate Ft1 is sufficiently attained only by the flow of the anode off gas, so that the cathode off gas is not introduced into the flow of the purge gas.

In response to an increase in required electric power from Er1 at the time point t2 to Er2 at the time point t4, the target flow rate increases with some time delay from Ft1 at the time point t3 to Ft2 at the time point t5. These target flow rates are read from the map of FIG. 33A. The required electric power has a sufficiently small rate of change in this time period, so that no correction based on the map of FIG. 33B is added to the target flow rate.

In response to a further increase in required electric power from Er2 at the time point t6 to Er3 at the time point t7, the target flow rate increases with some time delay in the time period between the time points t7 and t8. The required electric power has a significantly large rate of change in this time period. The target flow rate is accordingly set to Ft4 by adding the correction based on the map of FIG. 33B to the value read from the map of FIG. 33A. This target flow rate Ft4 is not attained by the flow of the anode off gas, so that the cathode off gas is introduced to supplement the insufficiency.

In the time period between the time points t7 and t10, the required electric power is kept at the fixed value Er3 and has the rate of change equal to zero. In this state, the correction based on the map of FIG. 33B is equal to zero. The target flow rate is accordingly equal to the value read from the map of FIG. 33A and decreases from the value Ft4 to Ft3. This target flow rate Ft3 is sufficiently attained only by the flow of the anode off gas, so that the introduction of the cathode off gas is stopped. In response to a decrease in required electric power from Er3 at the time point t10 to Er1 at the time point t11, the target flow rate decreases to Ft1, which corresponds to Er1, with some time delay. Although the required electric power has a large rate of change in the time period between the time points t10 and t11, no correction based on the map of FIG. 33B is added to the target flow rate in the case of a descending variation.

The fuel cells system of the ninth embodiment regulates the flow rate of the purge gas in the above manner and accordingly has advantages discussed below. Regulation of the flow rate of the purge gas to an optimum value corresponding to the required electric power as shown in FIG. 34 enhances the driving efficiency of the fuel cells 28. Introduction of the air into the flow of the purge gas accelerates the warm-up of the fuel cells 28. The heat of the reaction of hydrogen included in the fuel gas with oxygen included in the air is used for the warm-up.

When the required electric power has a large rate of change, the flow rate of the purge gas is increased from the optimum value read from the map (see FIG. 33B). The increased flow rate of the purge gas enhances the flow velocity of the fuel gas and thereby improves the dispersibility of the fuel gas in the fuel cells 28. This enables the fuel gas to be quickly supplied to each unit cell of the fuel cells 28, while raising the utilization rate of hydrogen in the fuel gas. The increased flow rate of the purge gas enhances the separation efficiency of hydrogen in the separation unit 20 and ensures the efficient supply of hydrogen to the fuel cells 28. The efficient separation of hydrogen results in increasing the quantity of hydrogen present in the flow path between the lower stream side of the separation unit 20 and the fuel cells 28, thus ensuring the adequate supply of the fuel gas against the variation in a load on the fuel cells 28. The fuel cells 28 are accordingly driven with a high response.

In the case where the flow of the anode off gas is insufficient for the target flow rate of the purge gas, the cathode off gas is additionally introduced to supplement the insufficiency and attain the target flow rate of the purge gas. This ensures the stable supply of the fuel gas and thereby the stable operations of the fuel cells 28. Especially when there is a possibility that the purge gas is reversely diffused from the extraction face to the feeding face of the hydrogen separation membrane 18 or that a leakage occurs from the electrolyte membrane or another part of the fuel cells 28, the supply of the purge gas from a plurality of different gas flow sources ensures the stable operations of the fuel cells 28. Although the structure of the ninth embodiment additionally uses the cathode off gas for the purpose of supplement, the air or steam may be used instead. In the structure that mainly uses the flow of the cathode off gas for the purge gas, the anode off gas may additionally be used for the purpose of supplement.

The ninth embodiment regards the arrangement of regulating the flow rate of the purge gas in the structure that mainly uses the flow of the anode off gas for the purge gas. The regulation of the flow rate of the purge gas is, however, not restricted to this structure that mainly uses the anode off gas for the purge gas, but may be applicable to any of the embodiments and their modifications discussed above. The arrangement of regulating the flow rate of the purge gas may be adopted in the structure that mainly uses the flow of the cathode off gas for the purge gas, in the structure that uses the mixture of the anode off gas and the cathode off gas for the purge gas, in the structure that uses only the anode off gas for the purge gas, and in the structure that changes over the source of the purge gas.

In the structure of circulating the flow of the anode off gas, the flow conduit for the circulation may be filled in advance with an inert dry gas, for example, nitrogen. In this case, the inert dry gas is used as the purge gas. The inert dry gas is not consumed by the reactions proceeding in the fuel cells. The circulation accordingly ensures the fixed flow rate of the purge gas. The structure of the ninth embodiment introduces the air as the purge gas into the system at the start of the operation of the fuel cells 28, while discharging the flow of the anode off gas to the outside by means of the changeover valve 113. In the case of circulating the inert dry gas, it is desirable to prohibit the discharge of the anode off gas in principle.

Compared with the structure that utilizes the residual gas for the purge gas, the structure of circulating the inert dry gas enables the purge gas to be supplied immediately after the start of the operation of the fuel cells 28, thus ensuring the efficient separation of hydrogen from the initial stage. The inert dry gas used as the purge gas does not generally cause the electrodes of the fuel cells 28 to sweat. The condenser 26 disposed before the supply of the fuel gas to the fuel cells 28 may thus be omitted from the system. This advantageously reduces the size of the whole fuel cells system. The quantity of the inert gas may gradually decrease, for example, due to a leakage of the inert gas from the separation unit 20 to the reformer unit 16 through the hydrogen separation membrane 18. In this case, it is preferable to additionally introduce the air, the cathode off gas, the residual gas, or the anode off gas, in order to supplement the insufficiency. The introduction of the air or the cathode off gas is attained by modifying the structure of the ninth embodiment. The introduction of the residual gas is attained by combining the variety of structures discussed above.

In the flow rate regulation of the purge gas executed in the ninth embodiment, the processing during the warm-up operation of the fuel cells 28 (see step S16 in the flowchart of FIG. 32), the correction according to the rate of change in required electric power (see the map of FIG. 33B), and the use of the auxiliary purge gas source under the condition of the insufficient flow rate (see step S22 in FIG. 32) may arbitrarily be chosen.

The above embodiments regard the structure that utilizes the residual gas and the anode off gas and the cathode off gas of the fuel cells 28 alone or in combination for the purge gas. One possible modification additionally uses the steam or another condensable gas or an inert gas for the purge gas. In another possible modification, the source of the purge gas may be switched over among the residual gas, the off gas, and the condensable gas, according to the driving conditions of the fuel cells. The principle of the present invention is attained in a variety of applications and embodiments including the basic structure that utilizes the residual gas and the off gas alone or in combination for the purge gas.

The present invention is not restricted to the above embodiments or their modifications, but there may be many other modifications, changes, and alterations without departing from the scope or spirit of the main characteristics of the present invention.

The scope and spirit of the present invention are limited only by the terms of the appended claims.

What is claimed is:

1. A fuel gas production system that produces a hydrogen-rich fuel gas, which is to be supplied to fuel cells, from a raw material, said fuel gas production system comprising:

a chemical reaction device that produces a gaseous mixture containing hydrogen from the raw material through a plurality of chemical processes;

a hydrogen separation mechanism that separates hydrogen from the gaseous mixture in said chemical reaction device; and a flow path that feeds both the hydrogen separated by said hydrogen separation mechanism and a residual gas after the separation of hydrogen from the gaseous mixture to said fuel cells, so as to supply hydrogen obtained in the chemical processes in said chemical reaction device to said fuel cells.

2. A fuel gas production system in accordance with claim 1, wherein said chemical reaction device includes a plurality of reaction units connected in series, and said hydrogen separation mechanism is disposed at a specific position in said chemical reaction device to allow separation of hydrogen produced in one of the plurality of reaction units except a last reaction unit.

3. A hydrogen production system in accordance with claim 2, wherein said chemical reaction device includes a reformer unit for reforming reaction and a shift unit for shift reaction, and said hydrogen separation mechanism is located in an upstream side of said shift unit.

4. A hydrogen production system in accordance with claim 1, wherein said hydrogen separation mechanism comprises:

a hydrogen separation membrane that has selective permeability to hydrogen and have a feeding face and an extraction face, the feeding face receiving a supply of the gaseous mixture, the extraction face extracting selectively permeating hydrogen from the gaseous mixture; and a purge gas supply unit that introduces a purge gas to the extraction face, so as to carry the hydrogen.

5. A hydrogen production system in accordance with claim 4, wherein the purge gas is introduced under conditions that a first hydrogen partial pressure on the feeding face is higher than on the extraction face and that a first total pressure on the feeding face is even or lower than a second total pressure on the extraction face.

6. A hydrogen production system in accordance with claim 4, said hydrogen production system further comprising a gas flow rate regulation mechanism that is provided in said flow path to automatically vary a flow rate of the purge gas such that the flow rate of the purge gas is maintained in a predetermined correlation with a flow rate of the residual gas.

7. A hydrogen production system in accordance with claim 6, wherein said gas flow rate regulation mechanism comprises a jet pump, said jet pump including s drive flow-in port, a sucked flow-in port and a flow-out port, the residual gas flowing into said drive flow-in port, the purge gas flowing into said sucked flow-in port, thereby maintaining said predetermined correlation.

8. A fuel cells system, comprising:

a fuel gas production system that produces a hydrogen-rich fuel gas from a raw material; and fuel cells that receive a supply of the fuel gas from said fuel gas production system to generate electric power, said fuel gas production system including:

a chemical reaction device that produces a gaseous mixture containing hydrogen from the raw material through a plurality of chemical processes;

a hydrogen separation mechanism that separates hydrogen from the gaseous mixture in at least one place of said chemical reaction device; and a flow path that feeds both the hydrogen separated by said hydrogen separation mechanism and a residual gas after the separation of hydrogen from the gaseous mixture to said fuel cells, so as to ensure a supply of all hydrogen obtained in all the chemical processes in said chemical reaction device to said fuel cells.

9. A fuel gas production system that produces a hydrogen-rich fuel gas, which is to be supplied to fuel cells, from a raw material, said fuel gas production system comprising:

a chemical reaction device that produces a gaseous mixture containing hydrogen from the raw material through a chemical process;

a hydrogen separation membrane that has selective permeability to hydrogen and have a feeding face and an extraction face, the feeding face receiving a supply of the gaseous mixture, the extraction face extracting selectively permeating hydrogen from the gaseous mixture;

a noxious component reduction unit which reduces concentration of a noxious component, that is harmful to said fuel cells, in a residual gas after the separation of hydrogen from the gaseous mixture through said hydrogen separation membrane; and a purge gas supply unit that introduces the residual gas after the reduction process, as a purge gas for carrying the hydrogen, to the extraction face.

10. A fuel gas production system in accordance with claim 9, wherein the reduction process includes an oxidation of the residual gas.

11. A fuel gas production system in accordance with claim 9, wherein the reduction process includes a catalytic reaction of the residual gas.

12. A fuel gas production system in accordance with claim 9, wherein said purge gas supply unit introduces a flow of an off gas discharged from said fuel cells as part of the purge gas.

13. A fuel gas production system in accordance with claim 12, wherein said purge gas supply unit leads the flow of the off gas to an upper stream side of said chemical reaction device.

14. A fuel gas production system in accordance with claim 12, wherein said purge gas supply unit leads the off gas to an intermediate position between the feeding face and said noxious component reduction unit.

15. A fuel gas production system in accordance with claim 12, wherein said purge gas supply unit leads the off gas to an intermediate position between said noxious component reduction unit and the extraction face.

16. A fuel gas production system in accordance with claim 9, wherein said purge gas supply unit comprises a circulation mechanism that circulates an anode off gas discharged from anodes of said fuel cells as part of the purge gas to the extraction face.

17. A fuel gas production system in accordance with claim 9, said fuel gas production system further comprising:
a memory configured to store a predetermined relationship between a load on said fuel cells and a flow rate of the purge gas;
a measuring unit configured to measure the load on said fuel cells; and
a flow rate regulation unit that regulates a flow rate of the purge gas according to the load.

18. A fuel gas production system in accordance with claim 17, wherein said measuring unit also measures a rate of change in the load on said fuel cells, and
said flow rate regulation unit raises the flow rate to a specific level that is significantly greater than the flow rate specified by the relationship when the observed rate of change is not less than a predetermined level.

19. A fuel gas production system in accordance with claim 17, wherein said purge gas supply unit comprises an additional gas source to supplement the flow of the purge gas, and
said flow rate regulation unit utilizes said additional gas source when the flow rate of the purge gas is insufficient.

20. A fuel gas production system in accordance with claim 9, wherein said purge gas supply unit introduces an oxygen-containing gas into the flow of the purge gas,
said fuel gas production system further comprising:
a warm-up determination unit that determines whether or not said fuel cells have already been warmed up; and
a control unit that controls said purge gas supply unit to increase a quantity of the oxygen-containing gas introduced into the flow of the purge gas when it is determined that said fuel cells have not yet been warmed up.

21. A fuel gas production system in accordance with claim 9, said fuel gas production system further comprising:
a steam separation mechanism that separates steam from the fuel gas prior to its supply to said fuel cells.

22. A fuel cells system, comprising:
a fuel gas production system that produces a hydrogen-rich fuel gas from a raw material; and
said fuel cells that receive a supply of the fuel gas from said fuel gas production system to generate electric power,
said fuel gas production system comprising:
a chemical reaction device that produces a gaseous mixture containing hydrogen from the raw material through a chemical process;
a hydrogen separation membrane that has selective permeability to hydrogen and have a feeding face and an extraction face, the feeding face receiving a supply of the gaseous mixture, the extraction face extracting selectively permeating hydrogen from the gaseous mixture;
a noxious component reduction unit which reduces concentration of a noxious component, that is harmful to said fuel cells, in a residual gas after separation of hydrogen from the gaseous mixture through said hydrogen separation membrane; and
a purge gas supply unit that introduces the residual gas after the reduction process, as a flow of a purge gas for carrying out the hydrogen, to the extraction face.

23. A fuel gas production system that produces a hydrogen-rich fuel gas, which is to be supplied to fuel cells, from a raw material, said fuel gas production system comprising:
a chemical reaction device that produces a gaseous mixture containing hydrogen from the raw material through a chemical process;
a hydrogen separation membrane that has selective permeability to hydrogen and have a feeding face and an extraction face, the feeding face receiving a supply of the gaseous mixture, the extraction face extracting selectively permeating hydrogen from the gaseous mixture; and
a purge gas supply unit that introduces a cathode off gas discharged from cathodes of said fuel cells as a purge gas for carrying out the hydrogen to the extraction face.

24. A fuel gas production system in accordance with claim 23, wherein said purge gas supply unit comprises a circulation mechanism that circulates an anode off gas discharged from anodes of said fuel cells as part of the purge gas to the extraction face.

25. A fuel gas production system in accordance with claim 23, said fuel gas production system further comprising:
a memory configured to store a predetermined relationship between a load on said fuel cells and flow rate of the purge gas;
a measuring unit configured to measure a load on said fuel cells; and
a flow rate regulation unit that regulates a flow rate of the purge gas according to the a load on.

26. A fuel gas production system in accordance with claim 25, wherein said measuring unit also measures a rate of change in a load on said fuel cells, and
said flow rate regulation unit raises the flow rate to a specific level that is significantly greater than the flow rate specified by the relationship when the observed rate of change is not less than a predetermined level.

27. A fuel gas production system in accordance with claim 25, wherein said purge gas supply unit comprises an additional gas source to supplement the flow of the purge gas, and said flow rate regulation unit utilizes said additional gas source when the flow rate of the purge gas is insufficient.

28. A fuel gas production system in accordance with claim 23, wherein said purge gas supply unit is a mechanism that introduces an oxygen-containing gas into the flow of the purge gas, said fuel gas production system further comprising:
a warm-up determination unit that determines whether or not said fuel cells have already been warmed up; and
a control unit that controls said purge gas supply unit to increase a quantity of the oxygen-containing gas introduced into the flow of the purge gas when it is determined that said fuel cells have not yet been warmed up.

29. A fuel gas production system in accordance with claim 23, said fuel gas production system further comprising:
a steam separation mechanism that separates steam from the fuel gas prior to supply of the fuel gas to said fuel cells.

30. A fuel cells system, comprising:
a fuel gas production system that produces a hydrogen-rich fuel gas from a raw material; and
said fuel cells that receive a supply of the fuel gas from said fuel gas production system to generate electric power,
said fuel gas production system comprising:
a chemical reaction device that produces a gaseous mixture containing hydrogen from the raw material through a chemical process;
a hydrogen separation membrane that has selective permeability to hydrogen and have a feeding face and an extraction face, the feeding face receiving a supply of the gaseous mixture, the extraction face extracting selectively permeating hydrogen from the gaseous mixture;
a purge gas supply unit that introduces a cathode off gas, which is discharged from cathodes of said fuel cells, as a flow of a purge gas for carrying out the hydrogen, to the extraction face.

31. A fuel gas production system that produces a hydrogen-rich fuel gas, which is to be supplied to fuel cells, from a raw material, said fuel gas production system comprising:
a chemical reaction device that produces a gaseous mixture containing hydrogen from the raw material through a chemical process;
a hydrogen separation membrane that has selective permeability to hydrogen and have a feeding face and an extraction face, the feeding face receiving a supply of the gaseous mixture, the extraction face extracting selectively permeating hydrogen from the gaseous mixture;
a reduction unit where a reduction process proceeds to reduce concentration of at least one of hydrogen and a specific component, which has high reactivity to hydrogen, included in a gas prior to supply to said fuel cells; and
a purge gas supply unit that introduces a processed gas after the reduction process, as a flow of a purge gas for carrying out the hydrogen, to the extraction face.

32. A fuel gas production system in accordance with claim 31, said fuel gas production system further comprising:
a memory configured to store a predetermined relationship between a load on said fuel cells and flow rate of the purge gas;
a measuring unit configured to measure a load on said fuel cells; and
a flow rate regulation unit that regulates a flow rate of the purge gas according to the a load on.

33. A fuel gas production system in accordance with claim 32, wherein said measuring unit also measures a rate of change in a load on said fuel cells, and
said flow rate regulation unit raises the flow rate to a specific level that is significantly greater than the flow rate specified by the relationship when the observed rate of change is not less than a predetermined level.

34. A fuel gas production system in accordance with claim 32, wherein said purge gas supply unit comprises an additional gas source to supplement the flow of the purge gas, and
said flow rate regulation unit utilizes said additional gas source when the flow rate of the purge gas is insufficient.

35. A fuel gas production system in accordance with claim 31, wherein said purge gas supply unit is a mechanism that introduces an oxygen-containing gas into the flow of the purge gas,
said fuel gas production system further including:
a warm-up determination unit that determines whether or not said fuel cells have already been warmed up; and
a control unit that controls said purge gas supply unit to increase a quantity of the oxygen-containing gas introduced into the flow of the purge gas when it is determined that said fuel cells have not yet been warmed up.

36. A fuel gas production system in accordance with claim 31, said fuel gas production system further comprising:
a steam separation mechanism that separates steam from the fuel gas prior to its supply to said fuel cells.

37. A fuel cells system, comprising:
a fuel gas production system that produces a hydrogen-rich fuel gas from a raw material; and
said fuel cells that receive a supply of the fuel gas from said fuel gas production system to generate electric power,
said fuel gas production system comprising:
a chemical reaction device that produces a gaseous mixture containing hydrogen from the raw material through a chemical process;
a hydrogen separation membrane that has selective permeability to hydrogen and have a feeding face and an extraction face, the feeding face receiving a supply of the gaseous mixture, the extraction face extracting selectively permeating hydrogen from the gaseous mixture;
a reduction unit where a reduction process proceeds to reduce concentration of at least one of hydrogen and a specific component, which has high reactivity to hydrogen, included in a gas prior to supply to said fuel cells; and
a purge gas supply unit that introduces a processed gas after the reduction process, as a flow of a purge gas for carrying out the hydrogen, to the extraction face.

38. A fuel gas production system that produces a hydrogen-rich fuel gas, which is to be supplied to fuel cells, from a raw material, said fuel gas production system comprising:
a chemical reaction device that produces a gaseous mixture containing hydrogen from the raw material through a chemical process;

a hydrogen separation membrane that has selective permeability to hydrogen and have a feeding face and an extraction face, the feeding face receiving a supply of the gaseous mixture, the extraction face extracting selectively permeating hydrogen from the gaseous mixture;

a purge gas supply unit that introduces an anode off gas, which is discharged from anodes of said fuel cells, as a flow of a purge gas for carrying out the hydrogen, to the extraction face;

a memory configured to store a predetermined relationship between a load on said fuel cells and flow rate of the purge gas;

a measuring unit that measures a load on said fuel cells; and a flow rate regulation unit that regulates a flow rate of the purge gas according to the observed a load on.

39. A fuel gas production system in accordance with claim 38, wherein said measuring unit also measures a rate of change in a load on said fuel cells, and said flow rate regulation unit raises the flow rate to a specific level that is significantly greater than the flow rate specified by the relationship when the observed rate of change is not less than a predetermined level.

40. A fuel gas production system in accordance with claim 38, wherein said purge gas supply unit comprises an additional gas source to supplement the flow of the purge gas, and said flow rate regulation unit utilizes said additional gas source when the flow rate of the purge gas is insufficient.

41. A fuel gas production system in accordance with claim 38, wherein said purge gas supply unit is a mechanism that introduces an oxygen-containing gas into the flow of the purge gas, said fuel gas production system further including:
a warm-up determination unit that determines whether or not said fuel cells have already been warmed up; and a control unit that controls said purge gas supply unit to increase a quantity of the oxygen-containing gas introduced into the flow of the purge gas when it is determined that said fuel cells have not yet been warmed up.

42. A fuel gas production system in accordance with claim 38, said fuel gas production system further including:
a steam separation mechanism that separates steam from the fuel gas prior to its supply to said fuel cells.

43. A fuel cells system, comprising:
a fuel gas production system that produces a hydrogen-rich fuel gas from a raw material; and said fuel cells that receive a supply of the fuel gas from said fuel gas production system to generate electric power, said fuel gas production system comprising:
a chemical reaction device that produces a gaseous mixture containing hydrogen from the raw material through a chemical process;

a hydrogen separation membrane that has selective permeability to hydrogen and have a feeding face and an extraction face, the feeding face receiving a supply of the gaseous mixture, the extraction face extracting selectively permeating hydrogen from the gaseous mixture;

a purge gas supply unit that introduces an anode off gas, which is discharged from anodes of said fuel cells, as a flow of a purge gas for carrying out the hydrogen, to the extraction face of said hydrogen separation membrane;

a memory configured to store a predetermined relationship between a load on said fuel cells and flow rate of the purge gas;

a measuring unit that measures a load on said fuel cells; and a flow rate regulation unit that regulates a flow rate of the purge gas according to the observed a load on said fuel cells.

* * * * *